United States Patent
Hamamoto et al.

(10) Patent No.: US 7,219,855 B2
(45) Date of Patent: May 22, 2007

(54) RISING AND MOVING APPARATUS AND MANUFACTURING METHOD THEREOF

(75) Inventors: Masaki Hamamoto, Sakurai (JP); Yoshiji Ohta, Kashiwara (JP); Keita Hara, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/618,301

(22) Filed: Jul. 11, 2003

(65) Prior Publication Data
US 2004/0195439 A1   Oct. 7, 2004

(30) Foreign Application Priority Data

Jul. 12, 2002 (JP) .............................. 2002-204428
Jul. 7, 2003 (JP) .............................. 2003-192944

(51) Int. Cl.
  *B64C 33/02* (2006.01)
(52) U.S. Cl. ....................................... 244/72
(58) Field of Classification Search ................ 244/72, 244/123.1, 133, 17.11–22, 39, 200
  See application file for complete search history.

(56) References Cited

U.S. PATENT DOCUMENTS

| | | | | |
|---|---|---|---|---|
| 920,064 A | * | 4/1909 | Jamintzky | ..................... 244/22 |
| 1,273,267 A | * | 7/1918 | Peterson | ..................... 244/22 |
| 1,694,602 A | * | 12/1928 | Nuttall | ..................... 244/70 |
| 1,701,762 A | * | 2/1929 | Pitcairn | ..................... 244/17.19 |
| 1,879,142 A | * | 9/1932 | Egan | ..................... 416/129 |
| 1,967,487 A | * | 7/1934 | Waisner | ..................... 72/64 |
| 2,021,627 A | * | 11/1935 | Gilpin | ..................... 244/22 |
| 2,054,876 A | * | 9/1936 | De Tryon-Montalembert | ..................... 416/110 |
| 2,086,883 A | * | 7/1937 | Shanley | ..................... 244/22 |
| 2,213,538 A | * | 9/1940 | Whitehead | ..................... 416/74 |

(Continued)

FOREIGN PATENT DOCUMENTS

JP        05-169567        7/1993

OTHER PUBLICATIONS www.answers.com "Flexible" pp. 1-5.*

(Continued)

*Primary Examiner*—Teri Pham Luu
*Assistant Examiner*—Stephen A Holzen
(74) *Attorney, Agent, or Firm*—David G. Conlin; David A. Tucker; Edwards Angell Palmer & Dodge LLP

(57) ABSTRACT

A fluid-structure interactive analysis is performed while n types of wing structure models are caused to flap in accordance with a prescribed model of flapping manner. Based on an analysis, data 1, data 2, ... data n of physical values related to fluid behavior and physical values related to structural behavior are calculated. Among data 1, data 2, ... data n, a data having a prescribed parameter such as the lift force optimized is extracted. A prototype of a wing portion is formed, which has such a structure that is specified by various parameter values of the numerical model of wing structure corresponding to the extracted data. A driving unit 905 drives the prototype of the wing portion in a manner of flapping that is represented by the flapping motion model equivalent to the manner of flapping of an insect. At this time, the wing has a stiffness that is suitable for flapping flight so that prescribed parameters come to have optimal values.

30 Claims, 49 Drawing Sheets

U.S. PATENT DOCUMENTS

| | | | | |
|---|---|---|---|---|
| 2,961,053 | A * | 11/1960 | Prewitt et al. | 416/226 |
| 3,028,128 | A * | 4/1962 | Friedrich | 244/117 A |
| 3,161,376 | A * | 12/1964 | Lyle | 244/20 |
| 3,167,129 | A * | 1/1965 | Shultz | 416/226 |
| 3,167,130 | A * | 1/1965 | Day | 416/83 |
| 3,356,153 | A * | 12/1967 | Schramm et al. | 416/226 |
| 3,398,883 | A * | 8/1968 | Ariewitz | 416/224 |
| 3,578,875 | A * | 5/1971 | Oguri | 416/109 |
| 3,950,115 | A * | 4/1976 | Euler | 416/226 |
| 3,987,984 | A * | 10/1976 | Fischer | 244/219 |
| 3,999,886 | A * | 12/1976 | Ormiston et al. | 416/104 |
| 4,749,149 | A * | 6/1988 | Gruich | 244/22 |
| 5,163,861 | A * | 11/1992 | Van Ruymbeke | 446/35 |
| 5,181,678 | A * | 1/1993 | Widnall et al. | 244/219 |
| 5,342,004 | A * | 8/1994 | Bobbitt | 244/212 |
| 5,634,613 | A * | 6/1997 | McCarthy | 244/199.1 |
| 5,725,355 | A * | 3/1998 | Crall et al. | 416/229 A |
| 5,832,605 | A * | 11/1998 | Leahy et al. | 29/889.6 |
| 5,879,131 | A * | 3/1999 | Arlton et al. | 416/223 R |
| 6,082,671 | A * | 7/2000 | Michelson | 244/72 |
| 6,206,324 | B1 * | 3/2001 | Smith | 244/72 |
| 6,227,483 | B1 * | 5/2001 | Therriault | 244/20 |
| 6,341,747 | B1 * | 1/2002 | Schmidt et al. | 244/123.1 |
| 6,540,177 | B2 * | 4/2003 | Woo et al. | 244/11 |
| 6,550,716 | B1 * | 4/2003 | Kim et al. | 244/11 |
| 6,554,666 | B2 * | 4/2003 | Kabakov | 440/93 |
| 6,565,039 | B2 * | 5/2003 | Smith | 244/72 |
| 6,568,634 | B2 * | 5/2003 | Smith | 244/72 |
| 6,769,949 | B2 * | 8/2004 | Kim et al. | 446/35 |
| 6,824,094 | B2 * | 11/2004 | Richard | 244/11 |
| 6,938,853 | B2 * | 9/2005 | Pines et al. | 244/11 |
| 2002/0117583 | A1 * | 8/2002 | Hamamoto et al. | 244/72 |
| 2005/0169763 | A1 * | 8/2005 | Anning | 416/224 |

OTHER PUBLICATIONS www. answers.com "Elastic", pp. 1-6.*

M. Dickinson, et al., *Wing Rotation and the Aerodynamic Basis of Insect Flight*, Science, vol. 284, Jun. 18, 1999, pp. 1954-1960.

Qun Zhang, et al., *Analysis of fluid-structure interaction problems with structural buckling and large domain changes by ALE finite element method*, Elsevier Science, 2001—Abstract page only.

Que Zhang, *Analysis of Structure-Fluid Interaction Problems with Structural Buckling and Large Domain Changes by ALE Finite Element Method*, pp. 1-8, 21-22.

* cited by examiner

▨ 0.35 mm
▧ 0.18 mm
▨ 0.15 mm
■ 0.12 mm
▨ 0.1 mm
□ 0.05 mm

FIXATION    LOAD

FIXATION

FIG.44
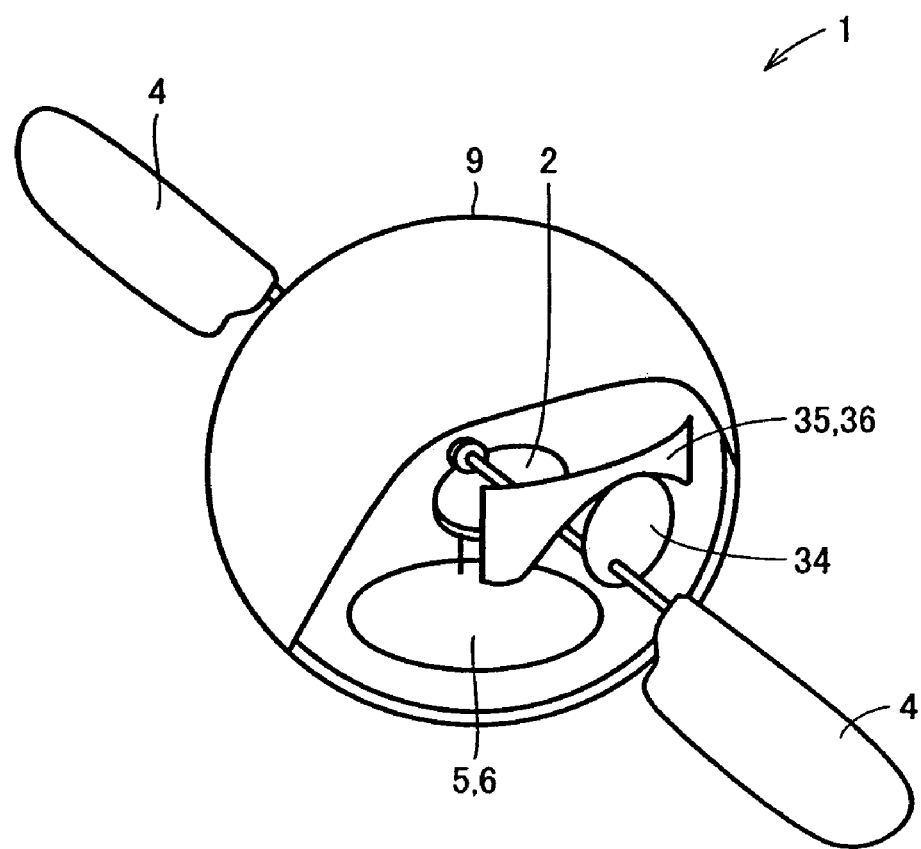
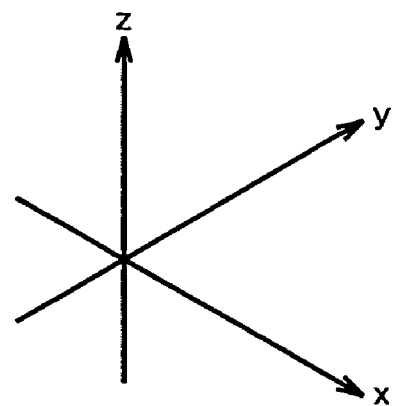

FIG.58
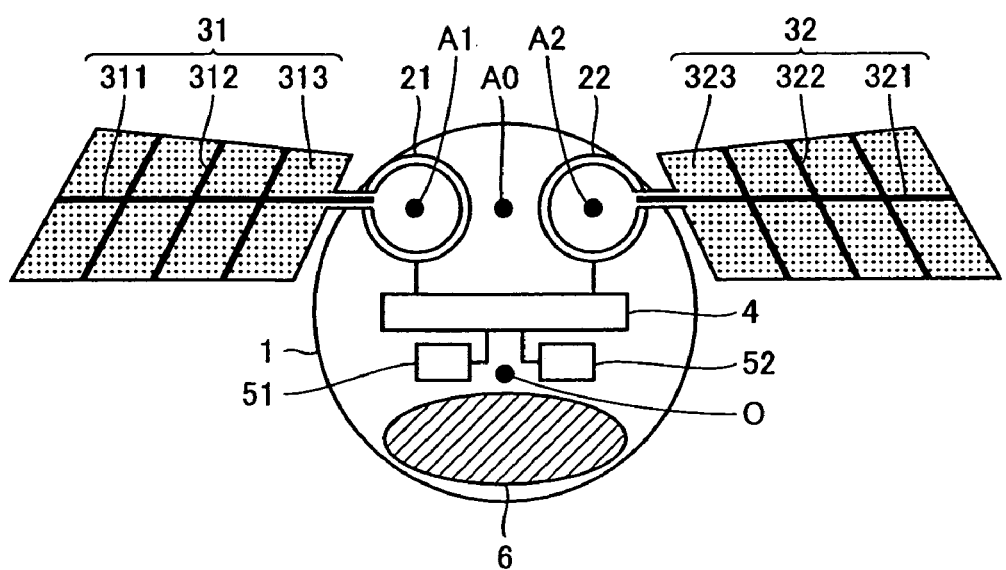
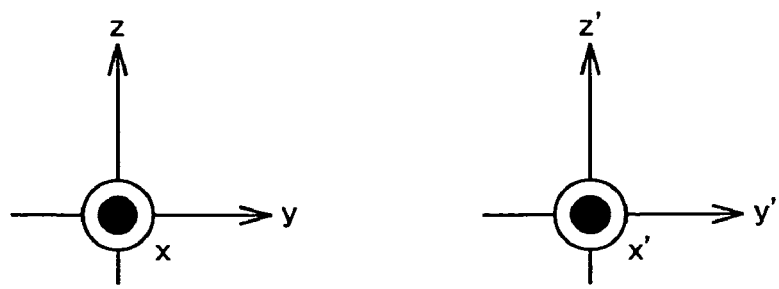

FIG.79

|  |  | x"+ | x"- | z"+ | z"- | θy"+ | θy"- |
|---|---|---|---|---|---|---|---|
| S1 | θ amplitude large |  |  | ● |  |  |  |
|  | θ amplitude small |  |  |  | ● |  |  |
|  | -dθ/dt large |  |  | ● |  |  |  |
|  | -dθ/dt small |  |  |  | ● |  |  |
|  | -dα/dθ > dαth | ● |  |  |  |  |  |
|  | -dα/dθ < dαth |  | ● |  |  |  |  |
|  | β is vertical to down stroke direction |  |  | ● |  |  |  |
|  | β is not vertical to down stroke direction |  |  |  | ● |  |  |
|  | β > 0 | ● |  |  |  |  |  |
|  | β < 0 |  | ● |  |  |  |  |
| S2 | -dβ/dt large | ● |  | ● |  | ● |  |
|  | -dβ/dt small |  | ● |  | ● |  | ● |
| S3 | θ amplitude large |  |  |  | ● |  |  |
|  | θ amplitude small |  |  | ● |  |  |  |
|  | dθ/dt large |  |  |  | ● |  |  |
|  | dθ/dt small |  |  | ● |  |  |  |
|  | dα/dθ > dαth |  | ● |  |  |  |  |
|  | dα/dθ < dαth | ● |  |  |  |  |  |
|  | β is vertical to up stroke direction |  |  |  | ● |  |  |
|  | β is not vertical to up stroke direction |  |  | ● |  |  |  |
| S4 | dβ/dt large | ● |  |  | ● |  | ● |
|  | dβ/dt small |  | ● | ● |  | ● |  |

FIG.80

|  | RIGHT ACTUATOR | | LEFT ACTUATOR | |
|---|---|---|---|---|
|  | DRIVING FRQ. | FLAPPING | DRIVING FRQ. | FLAPPING |
| UP | 35 Hz | B | 35 Hz | B |
| DOWN | 25 HZ | B | 25 Hz | B |
| GO FORWARD | 30 HZ | A | 30 Hz | A |
| HOVER | 30 HZ | B | 30 Hz | B |
| TURN RIGHT | 30 HZ | B | 30 Hz | A |
| TURN LEFT | 30 HZ | A | 30 Hz | B |

RISING AND MOVING APPARATUS AND MANUFACTURING METHOD THEREOF

BACKGROUND OF THE INVENTION

1. Field of the Invention

The present invention relates to a rising and moving apparatus that is capable of rising and moving by flapping motion of wings, and to a method of manufacturing the same.

2. Description of the Background Art

Recently, studies have been made vigorously to realize technical implementation of flapping flight that is superior in maneuverability to ordinary flight of a conventional airplane. This largely depends on development in methods of analysis in the field of unsteady aerodynamics. Further, it has become possible, by using an enlarged scale model measuring technique, to analyze behavior of a fluid caused by a very quick motion such as flapping motion of an insect, as the motion of a frequency as high as several tens Hz to 1 kHz can be replaced by a motion of a frequency as low as several mHz. This much contributes to the methods of analysis in the field of unsteady aerodynamics.

In an article entitled "Wing Rotation and the Aerodynamic Basis of Insect Flight" (SCIENCE 1999 June VOL 284 pp. 1954–1960), M. Dickinson et al. reported the following experiment.

M. Dickinson et al. first prepared an enlarged scale model of wings of a fly. Then, in a fluid including floating particles, the enlarged scale model of the fly wings was moved in a flapping motion similar to the flapping motion of the fly. Here, the flapping motion similar to the flapping motion of the fly refers to a motion represented by a graph time-sequentially representing the flapping motion of the fly with only the time axis enlarged or reduced.

From the observation of the motion, particle motion when the enlarged scale model was flapped in the fluid is extracted as images. Further, by a force sensor provided at a root of the wing, a lift force was measured. Here, the Reynolds number in a situation that the enlarged scale model flaps in the fluid is equivalent to the Reynolds number in a situation that the fly flaps in the air. From the measurements of the enlarged scale model flapping in the fluid, the behavior of the air and the stress exerted by the air on the wings of the fly when the fly conduct a flapping flight and flies were clarified.

The article mentioned above describes that, as a result of analysis of interaction between the fluid and the structure at the time of hovering, at which it is most difficult to attain lift force, it was clarified that three principles related to generation of lift force, that is, 1. delayed stall, 2. rotational lift and 3. wake capture were to be well utilized in flapping flight, as will be described in the following.

1: Delayed Stall

A vortex referred to as a leading edge vortex generates around the wing of an ordinary airplane. The leading edge vortex may sometimes be separated from the wing, possibly resulting in a stall. In the flapping flight of a fly, the wings are moved reciprocally forward and backward, and the wing stroke is reversed before occurrence of a stall in the reciprocal motion. Therefore, it is possible to prevent the stall of the wing resulting from the leading edge vortex. Further, in the flapping flight of the fly, the lift force can be increased by utilizing the leading edge vortex.

2: Rotational Lift

The directions of motion of the wing before and after the stroke reversal of the flapping motion are opposite to each other. Therefore, immediately before and immediately after the stroke reversal, the velocity of motion of the wing decreases considerably. At this time, the wing rotates (is twisted) about an axis that extends along the longitudinal direction (direction of the wing span) as the central axis of rotation and makes a translational motion (motion in the forward/backward direction). Thus, the absolute velocity of the fluid flowing above the wing along the surface of the wing becomes larger than that of the fluid flowing below the wing along the surface of the wing.

Therefore, the pressure exerted from above to the wing surface becomes lower than the pressure exerted from below to the wing surface. As a result, a lift force acts on the wing. The lift force is referred to as rotational lift. The rotational lift compensates for the decrease in velocity of the wing immediately before and immediately after the stroke reversal in the flapping motion. Even when the direction of motion in the forward/backward direction of the wing is reversed by the twist of the wing in timing of the stroke reversal, the angle of attack of the wing can assume an appropriate angle with respect to the flow of the fluid.

3: Wake Capture

After the stroke reversal of the wing in the flapping motion, the flow of the fluid that is generated by the flapping motion before the reversal, that is, the wake, collides against the wing surface at a prescribed angle of attack. Specifically, after the stroke reversal, the wing collides against the fluid flowing in a direction opposite to the direction of motion of the wing. Accordingly, the wing after stroke reversal can obtain the lift force that is equivalent to the lift force generated when the wing is moved at a velocity equal to the sum of the velocity of motion of the wing and the velocity of the wake mentioned above. The collision of the wake and the wing surface as such is referred to as wake capture. The wake capture compensates for the decrease in lift force before and after the stroke reversal in the flapping motion.

The authors of the article above propose a method of obtaining an almost uniform lift force in flapping flight, utilizing the three mechanisms for generating the lift force described above.

In the study by M. Dickinson et al., interaction between the fluid and the structure is analyzed, assuming that the wing is a rigid body that does not substantially deform. The wing as a rigid body, however, has an aerodynamically adverse effect on the flapping flight of the rising and moving apparatus. This will be specifically described in the following.

In the following, "fluid velocity" means the relative velocity of the fluid between the wing and the fluid, unless specified otherwise. Namely, the fluid velocity refers to the relative fluid velocity. In this respect, the velocity of the fluid with respect to a coordinate system fixed in the space will be referred to as an absolute velocity.

1: Decrease in Efficiency in Utilizing the Delayed Stall when a Wing as a Rigid Body is Used.

The wing makes a rotational motion about the root of the wing as a center. Thus, the velocity of motion at the root of the wing is different from the velocity of motion at the tip end of the wing. Generally, when the angle of attack is constant, the velocity at which stall occurs is also constant. Further, the angle of attack is constant over the entire region of the wing, if the wing is flat.

Therefore, when the delayed stall is to be effectively utilized at the tip end portion of the wing, the delayed stall cannot be effectively utilized at the root of the wing. It may be possible to change the angle of attack portion by portion of the wing, in order to effectively utilize the delayed stall at the root of the wing. The wing having different angles of attack portion by portion, however, is suitable for a motion in one direction of progress of the forward/backward reciprocal motion of the wing but not at all suitable for a motion in the other direction of the forward/backward reciprocal motion of the wing.

2: Instability of Flapping Motion Caused by Reaction Generated at the Wing when Wing as a Rigid Body is Used In the flapping motion, it is necessary to attain a lift force for supporting the weight of the rising and moving apparatus itself. Therefore, a force approximately the same or larger than the weight of itself acts on the wing. According to the article mentioned above, as the direction of motion of the wing changes and the angle of attack of the wing with respect to the fluid changes, the direction of the force exerted on the wing changes from the vertical direction to the horizontal direction.

Further, the force exerted to the wing as a rigid body is directly propagated from the driving unit to the wing. Therefore, the phase of the force applied to the wing is the same as the phase of the force applied to the driving unit. As a result, the rising and moving apparatus has its attitude or position changed considerably, because of the reaction of the force exerted on the wing.

At this time, the driving unit (actuator) must realize such a manner of flapping that compensates for the change in attitude of the rising and moving apparatus. Further, as the attitude of the rising and moving apparatus changes, the behavior of the fluid changes. Accordingly, it may also be necessary to change the manner of flapping itself. This makes the state of rising more instable, and the manner of flight would be complicated.

In order to solve the above described problems, a control unit is necessary that can exactly detect the change in attitude of the rising and moving apparatus caused in association with the flapping motion and that can perform high-speed information processing for calculating the new manner of flapping of the wing reflecting the change in attitude of the driving unit.

3: Increase in Mass and Cost of the Wing Resulting from the use of the Wing as a Rigid Body Even when the adverse effects associated with the problems above are negligible, it is necessary to increase the thickness of the wing or to use a material having a very high stiffness for the wing, in order to manufacture a wing that is not much deformed by the flapping motion. This poses a new problem that the mass or the manufacturing cost of the wing increases.

On the contrary, when the wing is too soft, the following problems arise.

1: Decrease of Lift Force Caused by Decreased Angle of Attack

When the wing is too soft, the wing excessively turns aside the fluid that collides against the wing, and hence, the lift force generated at the wing decreases.

2: Decrease of Efficiency in Generating Rotational Lift

In order to generate rotational lift, it is necessary to generate a large difference between the absolute velocity of the fluid flowing above the wing along the wing surface and the absolute velocity of the fluid flowing below the wing along the wing surface. The wing having low stiffness, however, is easily deformed by the flow of the fluid. Therefore, when the wing having a low stiffness is used, the difference between the absolute velocity above the wing and the absolute velocity below the wing mentioned above becomes small. Accordingly, when the wing has a low stiffness, the rotational force of the wing decreases as compared with the wing having a high stiffness.

3: Timing Mismatch Among Motions of Various Portions of the Wing in Wake Capture Wake capture occurs when the direction of translational motion of the wing is reversed. When the stiffness of the wing is excessively low, the amount of deformation of the wing becomes large. Thus, the timing of motion at the tip end of the wing lags behind the timing of motion of the root portion of the wing. Because of this timing delay, the timing of wake capture at the tip end portion of the wing lags behind the timing of wake capture at the root of the wing. Consequently, when the stiffness of the wing is too low, the efficiency of wake capture lowers.

The considerations above lead to the following.

There is an optimal value of stiffness of the wing. Therefore, different from the conventional example in which the wing is assumed to be a rigid body, it is necessary to analyze the manner of motion of the wing assuming that the wing passively deforms because of the fluid force. For the analysis including the interaction of the fluid and the structure using a wing that passively deforms, a technique of estimating stiffness of the wing suitable for flapping flight becomes necessary. The dynamical equivalent model of M. Dickinson et al. above, however, does not establish the technique.

The study discussed above is based on a principle that when two states are compared that structures which are similar are placed in different types of fluids and the Reynolds numbers of these two state are the same, behaviors of the fluids generated in these two states are similar. It is noted, however, that the governing rule of a structure such as a wing and the governing rule of a fluid such as the air differ, and hence the principle described above that governs the behavior of the fluid does not apply to the structure such as the wing.

By way of example, let us consider a corrugated plate or a wave plate used as a member of the wing. It is assumed that the plate has a tetragonal shape.

First, it is assumed that the wave plate is cantilevered, with a prescribed cross section along the direction orthogonal to the extension of ridges or valleys being a fixed end. Namely, the wave plate is assumed to be a cantilever extending in a direction parallel the direction of extension of the ridges or valleys. When there is an equally distributed vertical load on one side of the wave plate constituting the free end of the assumed cantilever, the amount of displacement of the free end of the cantilever is in inverse proportion to the thickness of the wave plate.

In contrast, assume that the wave plate is cantilevered with a prescribed cross section along the direction parallel to the direction of extension of the ridges of valleys being a fixed end. Namely, the wave plate is a cantilever extending in a direction orthogonal to the direction of extension of ridges or valleys. When there is an equally distributed vertical load on one side of the wave plate constituting the free end of the assumed cantilever, the amount of displacement of the free end of the cantilever is in inverse proportion to the cube of the thickness of the wave plate.

From the assumptions above, it is understood that even a structure having a very simple shape such as a wave plate has different stiffness to resist fluid force dependent on the manner how the fluid force acts on the structure. Therefore, it is not possible, by simply considering the manner of deformation of the wing when a fluid force is exerted on the wing in one prescribed manner, to determine the stiffness of every portion of the wing. Thus, it is difficult to produce an enlarged scale model of a wing that is similar to the wing of an actual insect and deforms in a manner similar to that of the actual wing of the insect.

When the enlarged scale model of the wing of an insect is not used, it is necessary to measure fluid flow behavior that is smaller than the order of mm (millimeter), while a wing model of the same size as the actual wing of the insect is in motion at a frequency as high as several tens Hz or higher. It is difficult, however, to form a wing model that is smaller than the mm order and experiences deformation similar to that of the wing of an insect, and to form a mechanism that drives such a wing model. Further, a sensor for measuring the lift force and pressure distribution on the wing model has the size of about a few millimeters, and the presence of the sensor itself causes variations in the behavior of the fluid. Thus, exact measurement of the fluid behavior is practically impossible by the method described above.

Numerical calculation employed for designing airplanes is also based on a precondition that the wing is a rigid body. There has been no method of calculation that can handle passive deformation of the wing.

In short, the wing as a rigid body that has been conventionally used for analyzing the behavior of the wing is not suitable for flapping flight as compared with a wing having an appropriate softness. Conventional studies of rising and moving apparatuses have not provided any method of manufacturing the wing having an appropriate softness for the flapping flight.

SUMMARY OF THE INVENTION

The present invention was made in view of the problems described above, and its object is to provide a rising and moving apparatus having a wing of such a stiffness that is suitable for flapping flight and to provide a method of manufacturing the same.

The present invention provides a rising and moving apparatus including a wing portion elastically deformed by force exerted by surrounding fluid, to an extent that allows a body to hover and move, a driving unit driving the wing portion, and a control unit controlling the manner of driving by the driving unit.

By the arrangement described above, the inefficiency of flapping motion and instability in control of the flapping motion that are the disadvantages of the wing portion as a rigid body can be improved.

Desirably, the wing portion mentioned above has torsional rigidity or flexural rigidity at an upstream side of the fluid higher than the torsional rigidity or flexural rigidity at the downstream side of the fluid.

By this arrangement, buckling of the wing portion at the upstream side of the fluid, caused by the fluid force in the compressing direction exerted on the wing portion at the upstream portion of the fluid, can be suppressed.

Desirably, the wing portion has torsional rigidity or flexural rigidity on the side of the leading edge higher than the torsional rigidity or flexural rigidity on the side of the trailing edge.

By this arrangement, buckling of the wing portion at the leading edge side, caused by the fluid force in the compressing direction exerted on the wing portion at the leading edge side, can be suppressed.

Desirably, a wave plate structure having ridge lines or valley lines extending along the direction of wing span is provided at the upstream side of the fluid or at the leading edge portion of the wing. Further, desirably, thickness of the wing portion on the upstream side of the fluid is larger as compared with the thickness on the downstream side of the fluid. Desirably, support structure of the wing portion at the upstream side of the fluid is thicker (having larger cross section) as compared with the support structure at the downstream side of the fluid. Desirably, thickness of the wing portion on the side of the leading edge is larger as compared with the thickness on the side of the trailing edge. Further, desirably, the support structure of the wing portion on the side of the leading edge is thicker as compared with the support structure on the side of the trailing edge.

By such an arrangement, a wing can be realized that has such a stiffness distribution that efficiently suppresses buckling at the portion of the wing on the upstream side of the fluid or the leading edge side of the wing as described above, without much increasing the mass of the wing portion.

Desirably, the angle of attack of the wing portion where the fluid velocity is relatively high is smaller as compared with the angle of attack of the wing portion where the fluid velocity is relatively low. Further, the angle of attack of the wing portion at the tip end is smaller as compared with the angle of attack of the wing portion at the root.

By this structure, lift force can be improved at a portion where the fluid velocity colliding against the wing portion is low, while stall can be prevented at a portion where the fluid velocity colliding against the wing is high.

Desirably, the wing portion is rotatable about a prescribed center of rotation, and flexural rigidity of the portion relatively closer to the center of rotation is higher than the flexural rigidity of the portion relatively far from the center of rotation.

By the above described arrangement, the portion of the wing having small radius of rotation can be moved more quickly than the portion of the wing having larger radius of rotation. More specifically, by the above described arrangement, as compared with the portion far from the center of rotation where the motion velocity is high, the portion closer to the center of rotation where the motion velocity is lower can be moved more quickly.

Desirably, the wing portion is rotatable about a prescribed center of rotation, and torsional rigidity of the portion relatively closer to the center of rotation is higher than the torsional rigidity of the portion relatively far from the center of rotation.

By the above described arrangement, the portion of the wing where the fluid velocity colliding against the wing is high assumes an attitude closer along the direction of the fluid flow, and hence, the portion comes to have smaller angle of attack. Therefore, a wing can be realized that has angles of attack distribution conforming to the fluid velocity.

Desirably, thickness of the wing at a portion closer to the center of rotation is larger than the thickness of the wing at a portion far from the center of rotation. Further, desirably, the support structure closer to the center of rotation is thicker (having larger cross section) than the support structure far from the center of rotation.

By this arrangement, the stiffness on the side closer to the center of rotation and the stiffness on the side far from the center of rotation can be made different from each other by a simple method.

Desirably, the wing portion is provided such that the axis of rotation along the direction of the wing span is positioned approximately in the middle between the leading edge and the trailing edge of the wing portion.

By this arrangement, as compared with a wing portion of which axis of rotation along the direction of wing span is biased to the side of the leading edge or the trailing edge, the difference between pressure generated above the wing and pressure generated below the wing can be increased.

Desirably, during stroke reversals, the control unit controls the driving unit such that the lower surface of the wing portion comes into contact with an upper portion of the vortex generated by the flapping motion of the wing portion immediately before the stroke reversal. Here, the stroke reversal is limited to the one that occurs at the opposite ends of the flapping motion of the wing portion.

By this arrangement, the decrease in the lift force during stroke reversal can be compensated for, and the deformation of the wing portion can be reversed before and after the stroke reversal.

Desirably, during stroke reversal, the control unit controls the driving unit such that the direction of extension of the axis of rotation of the vortex generated by the stroke reversal matches the direction of extension of the axis connecting the centers of radii of curvature of the wing portion (central axis of radius of curvature). Here, the radius of curvature of the wing portion means the radius of curvature at a portion where the plane vertical to the direction of wing span and the wing portion intersect with each other. Further, the central axis of radius of curvature refers to a line provided by connecting central points of radii of curvature defining the radius of curvature of the wing along the direction of the wing span.

By this arrangement, the force in the vertically downward direction generated at the time of stroke reversal of the wing portion can be minimized, and hence, decrease in lift force of the rising and moving apparatus can be minimized.

Desirably, when the wing portion is driven by the driving unit, the root of the wing portion moves periodically, and the wing portion elastically deforms such that it has a portion having a phase of periodic motion different from the phase of the periodic motion at the root. By way of example, it is desirable that the wing portion elastically deforms (subjected to bending deformation and torsion deformation) such that the timing of motion of the wing gradually delays from the root portion to the tip end of the wing. Specifically, it is desirable that the tip end portion of the wing follows the change in attitude of the fulcrum with a higher degree of difficulty as compared with the root of the wing portion. For example, it is preferred that the wing portion elastically deforms (subjected to bending deformation and torsion deformation) such that the timing of motion of the wing gradually delays from the root to the tip end portion of the wing. Further, it is preferred that the wing portion elastically deforms (subjected to bending deformation and torsion deformation) such that the timing of motion of the wing gradually delays from the central axis of rotation in the direction of the wing span to the side of the leading edge or the trailing edge.

By this arrangement, the timing at which the lift force peaks at various portions of the wing will be dispersed, and hence, generation of abrupt acceleration at the wing portion can be suppressed.

Further, desirably, the wing portion elastically deforms (subjected to bending deformation and torsion deformation) such that the phase of the periodic motion of a portion where a relatively large fluid force is exerted is delayed as compared with a portion where a relatively small fluid force is exerted. Further, it is desirable that the wing portion elastically deforms (subjected to bending deformation and torsion deformation) such that the phase of periodic motion of the tip end portion is delayed from that of the root portion.

By this arrangement, the difference in acceleration among various portions of the wing caused by the difference in force exerted by the fluid colliding against various portions of the wing can be made smaller.

Further, preferably the delay in phase mentioned above is at most ½ of one phase of the flapping motion. As the direction of flapping motion of the wing is reversed at one half the flapping period, such setting enables maintenance of a state where the sign of the phase of the force exerted on the tip end portion of the wing that periodically changes is the same as the sign of the phase of the force exerted on the root portion of the wing that also periodically changes.

Desirably, the manner of control of the control unit controlling the driving unit and the manner of elastic deformation of the wing portion are related such that a prescribed parameter related to the flapping rise and movement has the optimal value in accordance with the result of fluid-structure interactive analysis.

In this manner, a rising and moving apparatus is realized in which the prescribed parameter related to flapping rise and movement is optimized.

Further, the prescribed parameter related to flapping rise and movement may be the lift force generated by the flapping motion of the wing portion.

Accordingly, a rising and moving apparatus is realized, which has the wing portion that can generate the largest lift force by the flapping motion.

Further, the prescribed parameter related to flapping rise and movement may be a value obtained by dividing the lift force generated by the flapping motion of the wing portion by a torque of the driving unit necessary for driving the wing portion to generate the lift force.

Accordingly, a rising and moving apparatus is realized in which lift force per one torque is the highest. In other words, a driving unit is realized in which the torque necessary to generate a prescribed lift force is the smallest. Thus, a rising and moving apparatus that is more advantageous for rising is provided. In the present invention, the torque refers to the magnitude of the rotational force used for driving the wing portion, unless specified otherwise.

Further, the prescribed parameter related to the flapping rise and movement described above may be the highest frequency of the driving unit necessary for realizing the flapping motion of the wing portion.

Accordingly, a rising and moving apparatus is realized that flies flapping, using a driving unit of which upper limit of the driving frequency is the smallest. This enables the lowest setting of the stiffness of the lowest driving unit. Generally, a member having low stiffness is of light weight, and hence, this means that the driving unit can be formed by using a light weight member. As a result, the mass of the driving unit can be reduced, and hence, a rising and moving apparatus that is more advantageous for rising is provided.

Further, the prescribed parameter related to the flapping rise and movement described above may be a value obtained by dividing the lift force generated by the flapping motion of the wing portion by the energy necessary for generating the lift force.

Accordingly, the energy used for the flapping motion can be minimized. Therefore, when it is necessary to generate a prescribed lift force, for example, an energy source smaller in size can be used.

In the present invention, the energy used for the flapping motion refers to the energy consumed by the driving unit driving the wing portion, unless specified otherwise. Typical example of the energy includes electric power consumed by the driving unit.

Desirably, the wing portion satisfies the following relation, where f denotes flapping frequency, L denotes representative length, r denotes a distance from a portion having the highest stiffness, w denotes a load on a portion at a distance r from the portion having the highest stiffness, and d denotes a displacement generated at the portion that bears the load w exerted by the load w:

$$0.36 \times 10^{-8} < r^3 \times w/d/(L \times f)^2 < 4.48 \times 10^{-8}.$$

Accordingly, a rising and moving apparatus is realized, which has the wing portion that can flap without decreasing each of the absolute value of the lift force, efficiency of the lift force with respect to the torque and the efficiency of the lift force with respect to the driving force of the wing portion, to be smaller than ½ of the optimal values.

The method of manufacturing the rising and moving apparatus of the present invention includes the following steps.

① Measuring physical amounts related to an actual structure of a wing of an insect.

② Preparing an equivalent numerical model of wing structure that can be regarded as equivalent to the actual wing, in which the physical amounts related to the actual structure of the wing are given as numerical values.

③ Preparing numerical models of a plurality of different types of wing structures in which stiffness parameter of the equivalent numerical model of wing structure is varied.

④ Measuring physical amounts related to the manner of flapping motion while the actual wing of the insect is caused to perform flapping motion.

⑤ Preparing a numerical model of flapping motion in which the physical amounts related to the manner of flapping motion are expressed as numerical values.

⑥ Executing fluid-structure interactive analysis, while a plurality of different types of numerical models of wing structure are each caused to perform flapping motion represented by the numerical model of flapping motion, in a preset virtual fluid for analysis.

In this fluid-structure interactive analysis, the behavior of the fluid and the behavior of the structure including interaction therebetween are analyzed, and a numerical model related to the fluid of the virtual fluid and the numerical model related to the structure of the numerical model of wing structure are calculated, respectively.

⑦ Using a prescribed numerical model of wing structure among the plurality of different types of numerical models of wing structure, manufacturing the wing portion that is driven by a driving apparatus.

The prescribed numerical model of wing structure is the numerical model obtained through fluid-structure interactive analysis. The numerical model is the model in which the prescribed parameters of the numerical model related to the fluid of the virtual fluid and the numerical model related to the structure of the numerical model of wing structure have the optimal values.

According to the method of manufacturing the rising and moving apparatus including steps ① to ⑦ described above, it is possible to quantify and consider the influence of deformation of the wing for each of the plurality of wing structures having wing portions of different stiffness. Therefore, it is possible to manufacture a rising and moving apparatus that has a wing of optimal stiffness for flapping flight, in consideration of the influence of wing deformation.

The prescribed parameter described above may be the lift force generated at the numerical model of wing structure when the numerical model of wing structure is caused to perform flapping motion.

By this manufacturing method, it is possible to manufacture a rising and moving apparatus that has a wing portion capable of generating maximum lift force by the flapping motion.

The prescribed parameter described above may be a value obtained by dividing the lift force generated at the numerical model of wing structure when the numerical model of wing structure is caused to perform flapping motion by the torque necessary for driving the numerical model of wing structure to generate the lift force.

By this manufacturing method, it is possible to manufacture a rising and moving apparatus that has the maximum lift force per one torque. In other words, a driving unit is realized in which the torque necessary to generate a prescribed lift force is the smallest. Thus, a rising and moving apparatus that is more advantageous for rising can be manufactured. In the present invention, the torque refers to the magnitude of the rotational force used for driving the wing portion, unless specified otherwise.

The prescribed parameter related to the flapping rise and movement described above may be the highest frequency of the driving unit necessary for realizing the flapping motion of the numerical model of wing structure.

By this manufacturing method, a rising and moving apparatus is manufactured that can fly flapping, using a driving unit of which upper limit of the driving frequency is the smallest. This enables lowest possible setting of the stiffness of the driving unit. Generally, a member having low stiffness is of light weight, and hence, this means that the driving unit can be formed by using a light weight member. As a result, the mass of the driving unit can be reduced, and hence, a rising and moving apparatus that is more advantageous for rising can be manufactured.

The prescribed parameter may be a value obtained by dividing the lift force generated on the numerical model of wing structure when the numerical model of wing structure is caused to perform flapping motion, by the energy necessary for generating the lift force.

By this manufacturing method, it is possible to manufacture a wing portion by which the energy used for the flapping motion can be minimized. Therefore, when it is necessary to generate a prescribed lift force, for example, a rising and moving apparatus can be manufactured in which an energy source is made smaller in size.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 44 is a schematic illustration representing a structure of a rising and moving apparatus in accordance with a third embodiment.

FIG. 58 is a front view representing a structure of the rising and moving apparatus in accordance with a fourth embodiment.

FIG. 79 is a table representing correspondence between change in the manner of flapping of a left wing and resulting change in the state of rising.

FIG. 80 is a table representing correspondence between basic operations for flapping rise and patterns of the manner of flapping to realize the same.

DESCRIPTION OF THE PREFERRED EMBODIMENTS

First Embodiment

A flapping flight moving apparatus as a first embodiment of the rising and moving apparatus of the present invention will be described with reference to FIGS. 1 to 14.

The flapping flight moving apparatus in accordance with the present embodiment includes wing portion for flapping in a space, a driving unit for driving the wing, a control unit for controlling the driving unit and additional components.

The component itself realizing the manner of driving the wing is not the essence of the present invention. It is possible to have the rising and moving apparatus in accordance with the present invention flap in a manner different from the manner of flapping employed by the flapping flight moving apparatus in accordance with the present embodiment.

In the present embodiment, the manner of flapping flight will be described with reference to hovering operation as an example. In the present embodiment, the driving unit for the wing is regarded as a black box. In the present embodiment, the manner of flapping will be described focused on the manner shown in FIGS. 3 and 4 as discussed later.

(Overall Configuration)

Figure 1:
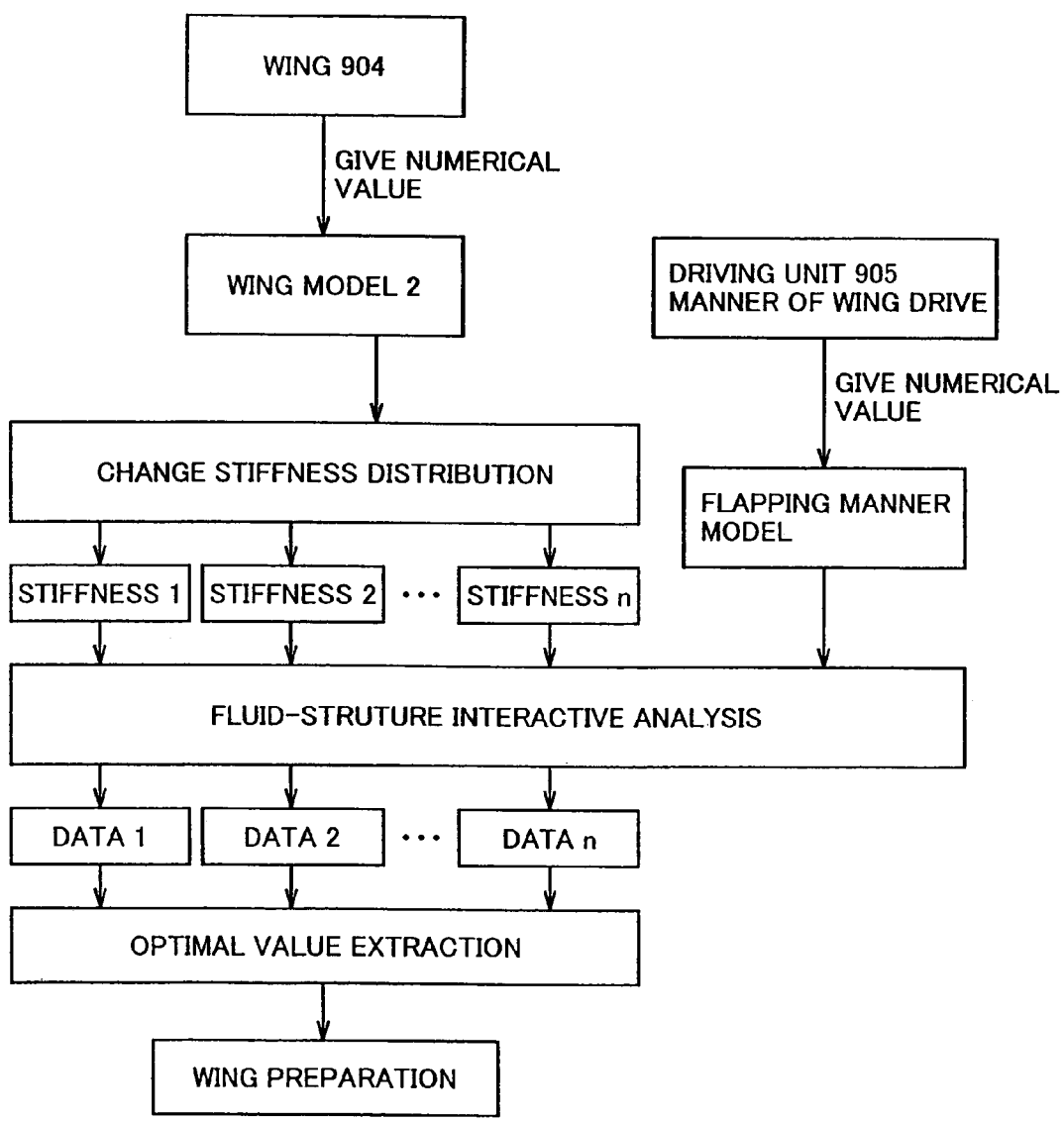
FIG. 1 is an illustration schematically showing the method of manufacturing the rising and moving apparatus in accordance with a first embodiment of the present invention.

First, a method of manufacturing the flapping flight moving apparatus 90 in accordance with the present embodiment will be outlined with reference to FIG. 1.

In the method of manufacturing flapping flight moving apparatus 90 in accordance with the present embodiment, first, in order to specify the structure of a wing 904, a wing model 2 as an equivalent model of actual structure is prepared, in which a structure of a wing of a certain insect is represented as numerical values. Details of the procedure for preparing the equivalent model of actual structure will be described later. Thereafter, using wing model 2 as a reference, stiffness parameter of wing model 2 is changed n times, to prepare n numerical models of wing structure having n different stiffnesses consisting of stiffness 1, stiffness 2, . . . stiffness n. Stiffness 1, stiffness 2, . . . stiffness n are mutually different values.

Further, based on a result of observation of insect wing behavior, a flapping manner model (numerical model of flapping manner) is prepared, by representing in numerical values the manner of driving of driving unit 905 driving the wing portion. Details of the method of preparing the flapping manner model will be described later.

Thereafter, the above described n different wing structure models are caused to flap in accordance with the above described flapping manner model, and the behavior of fluid and behavior of the structure at this time are analyzed. For this analysis, fluid-structure interactive analysis is used, in which interaction between the fluid and the structure is considered. As a result, data 1, data 2, . . . data n of physical amounts related to the behavior of the fluid and physical amounts related to the behavior of the structure are calculated.

Among data 1, data 2, . . . data n, data of which prescribed parameter such as lift force has the optimal value is extracted. Finally, using various parameters of the numerical model of wing structure of the extracted data, a prototype of wing 904 is prepared. Driving unit 905 drives the prototype of wing 904 in the manner of flapping represented by the flapping manner model described above. Accordingly, prescribed parameters (such as the lift force) of the combination of the numerical model of wing stiffness and flapping manner model of wing 904 will have the best values.

The prescribed parameters may possibly include lift force, lift force per unit torque, lift force per unit frequency, and lift force per unit energy.

The arrangement and function of flapping flight moving apparatus 90 in accordance with the present embodiment will be described with reference to FIGS. 2 to 4. The flapping flight moving apparatus in accordance with the present embodiment contains, in a body 906, a control unit 901, an instruction receiving unit 902, a sensor unit 903 and a driving unit 905. Wings 904 are pivotably connected to driving unit 905. Further, wings 904 perform the flapping motion, driven by driving unit 905.

Instruction receiving unit 902 receives information related to movement instruction. Sensor unit 903 detects information related to the state of flight, such as attitude and position of flapping flight moving apparatus 90. Control unit 905 determines the manner of flapping of wing 904 based on the information related to the movement instruction and the information related to the states of flight, and transmits a driving signal that can specify the manner of flapping of wing 904, to driving unit 905. Thus, wing 904 starts to flap in the prescribed manner of flapping.

Wing 904 receives, as it moves, reaction force from the air therearound. The reaction force is transmitted to driving unit 905. As a result, when the reaction force exceeds the self-weight of flapping flight moving apparatus 90, body 905 having driving unit 905 fixed therein rises.

Figure 3:
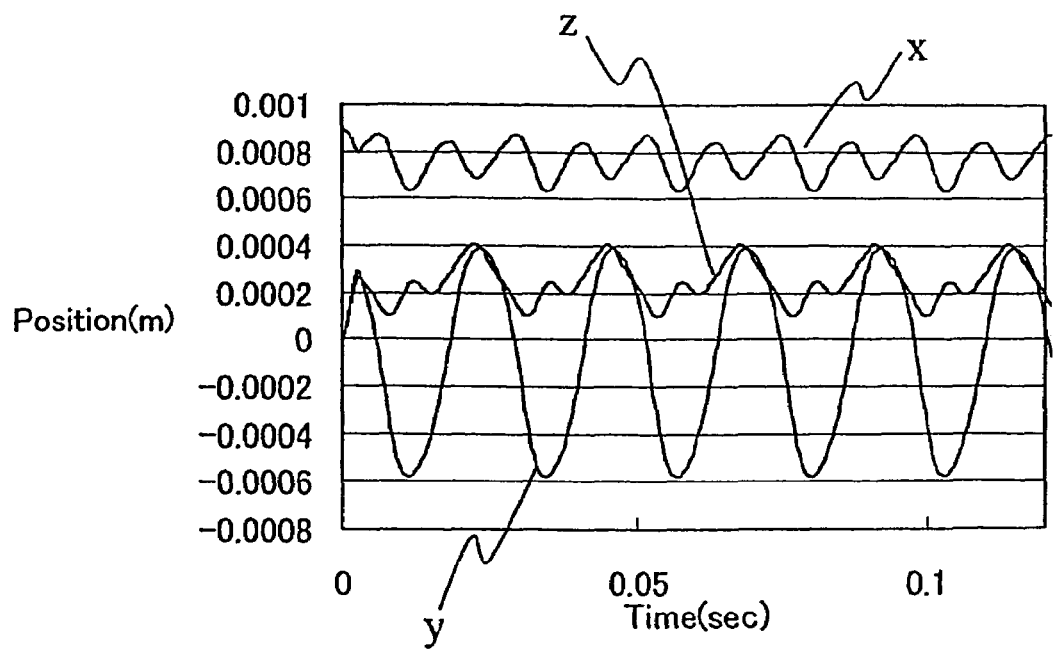
FIG. 3 is a graph representing history of motion of a prescribed one point assumed on the wing in accordance with the first embodiment.
Figure 4:
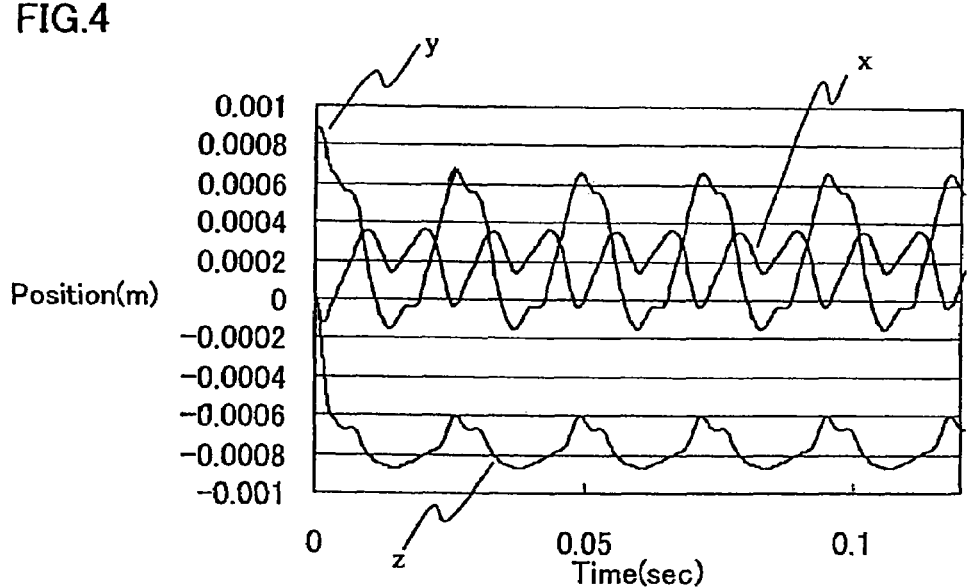
FIG. 4 is a graph representing history of motion of another point assumed on the wing in accordance with the first embodiment.
Figure 5:
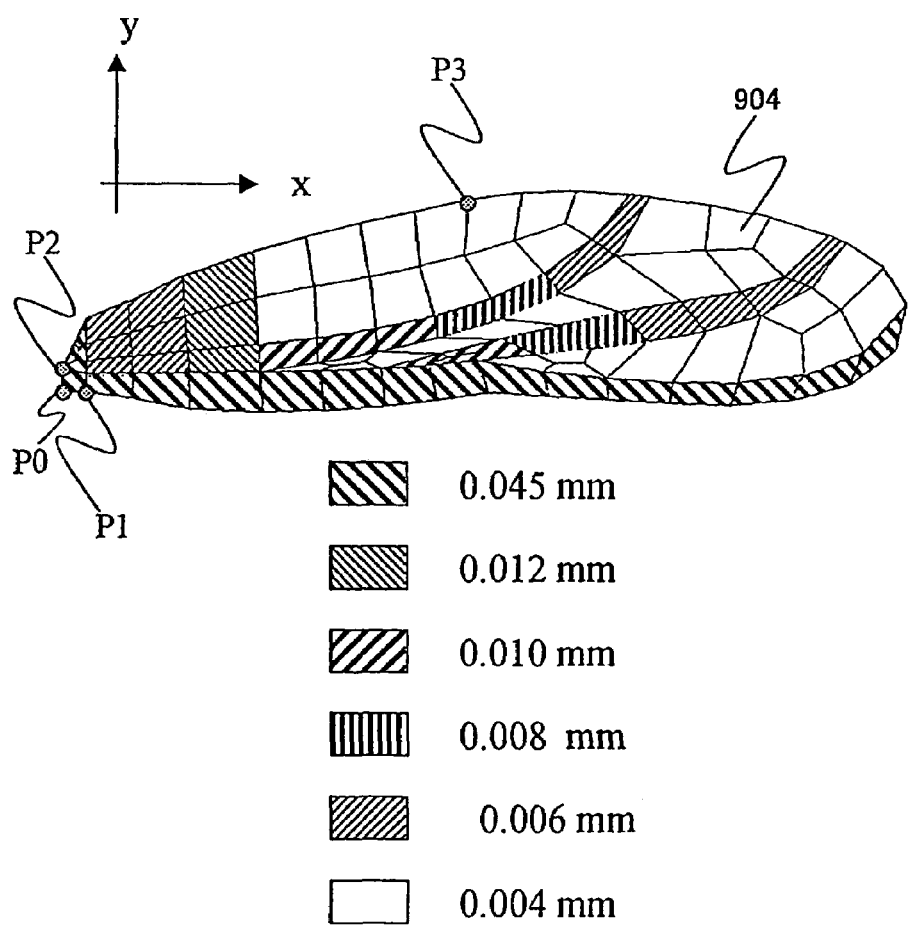
FIG. 5 is an illustration of the wing in accordance with the first embodiment divided element by element.

During steady hovering, driving unit 905 drives wing 905 such that points P1 and P2 on wing 904 shown in FIG. 5 realize the same time-sequential change in the coordinate values (history) as those shown in FIGS. 3 and 4. Points P1 and P2 on wing 904 shown in FIG. 5 may be moved, and rotation is not restricted. Further, point P0 on wing 904 shown in FIG. 5 is connected pivotably to driving unit 905. In the following, only the steady hovering of the rising and moving apparatus will be described. Wing 904 of FIG. 5 represents thickness distribution of the wing in the numerical model, and the details of the model will be described later.

(Preparation of Numerical Model)

Next, the method of preparing a numerical model of flapping flight through fluid-structure interactive analysis will be described with reference to FIGS. 3 to 11.

The method of analysis used by the inventors is the strong coupling method of fluid and structure, utilizing ALE finite element analysis method proposed by Qun Zhang, (Tokyo University Dissertation Thesis, 1999).

In the following, the method of analyzing the behavior of the wing structure and the behavior of the fluid therearound caused by the driving of the wing, using the strong coupling method of fluid and structure will be described specifically.

First, it is necessary to set a space for the numerical model of wing structure to perform flapping motion. According to the calculations made by the inventors, when a flapping flight moving apparatus having a wing of 4 cm long and flapping frequency of 30 Hz is to be analyzed, the air flow is almost a steady flow in a space at a distance of about 20 cm or smaller from flapping flight moving apparatus 90.

Therefore, a spherical space having the radius of 20 cm is set as a space for the numerical model of wing structure to perform flapping motion. Thus, only the space in the sphere having the radius of 20 cm is considered to be the object of strong coupling fluid-structure interactive analysis. Accordingly, the amount of calculation in strong coupling fluid-structure interactive analysis can be reduced.

In the fluid-structure interactive analysis in accordance with the present embodiment, for simplicity of description, it is assumed as a precondition that flapping flight moving apparatus 90 is positioned approximately at the center of a cubic region for analysis, each side of which is 20 cm in length. A numerical model related to the fluid and a numerical model related to the structure during hovering under this condition will be prepared.

In the method of fluid-structure interactive analysis used for flapping flight moving apparatus 90 in accordance with the present embodiment, physical elements are considered in spatially discrete manner. For this purpose, it is necessary to divide physical elements of the wing structure into shapes referred to as basic shapes.

As the basic shapes, tetragonal shapes are used for wing model 2 and hexahedron shapes are used for the fluid, as will be discussed later.

In the fluid-structure interactive analysis, the basic shape is referred to as an element, and representative points such as vertexes and the like of the element are referred to as nodes. Further, elements and nodes have numbers not overlapping with each other allotted thereto, in order to identify each element and each node. These numbers will be referred to as element numbers and node numbers. Further, a series of node numbers set corresponding to each element number will be referred to as connectivity.

In the ALE finite element method, both in fluid and structure, it is necessary to set at every element and every node the coordinates of each node, connectivity of each node, boundary condition of each node and parameters of respective physical values of each element.

Specifically, determining the coordinates of each node, connectivity of each node, boundary condition of each node and parameters of respective physical values of each element is equivalent to preparation of the numerical model related to the fluid and the numerical model related to the structure.

(Preparation of Numerical Model Related to Wing Structure)

First, wing 904 is divided into basic shapes. FIG. 5 represents wing 904 used by the inventors divided into basic shapes, using hatchings that can identify thickness of each element. The method of dividing wing 904 into basic shapes is a method using a general mesh generating software and the like.

Coordinates of each node and connectivity of each node are prepared by allotting element number to each of the elements shown in FIG. 5 and by allotting node numbers to the nodes.

As to the boundary condition of each node, a numerical model of the manner of driving the wing is given as the boundary condition. The manner of driving the wing (manner of flapping) is represented using the position and attitude of each element or each node of the wing. In flapping flight moving apparatus 90 in accordance with the present embodiment, only the root portion of wing 904 receives the positive motion from driving apparatus 905. Therefore, when values corresponding to the position and attitude of the node at the root portion of wing 904 can be obtained, it is possible to prepare a numerical model of the manner of driving the wing.

Physical values of each element are data known in advance, and there are various methods of selecting the same. The selecting methods will be described later.

(Preparation of a Numerical Model Related to the Fluid)

A mesh is not available for the fluid element. Therefore, a mesh for the fluid element is prepared using, by way of example, a commercially available mesh forming software.

In the fluid-structure interactive analysis method used by the inventors, it is necessary that prescribed nodes are commonly used by the structural mesh and the fluid mesh. Therefore, first, a tetragonal mesh including the wing 904 is prepared.

Figure 6:
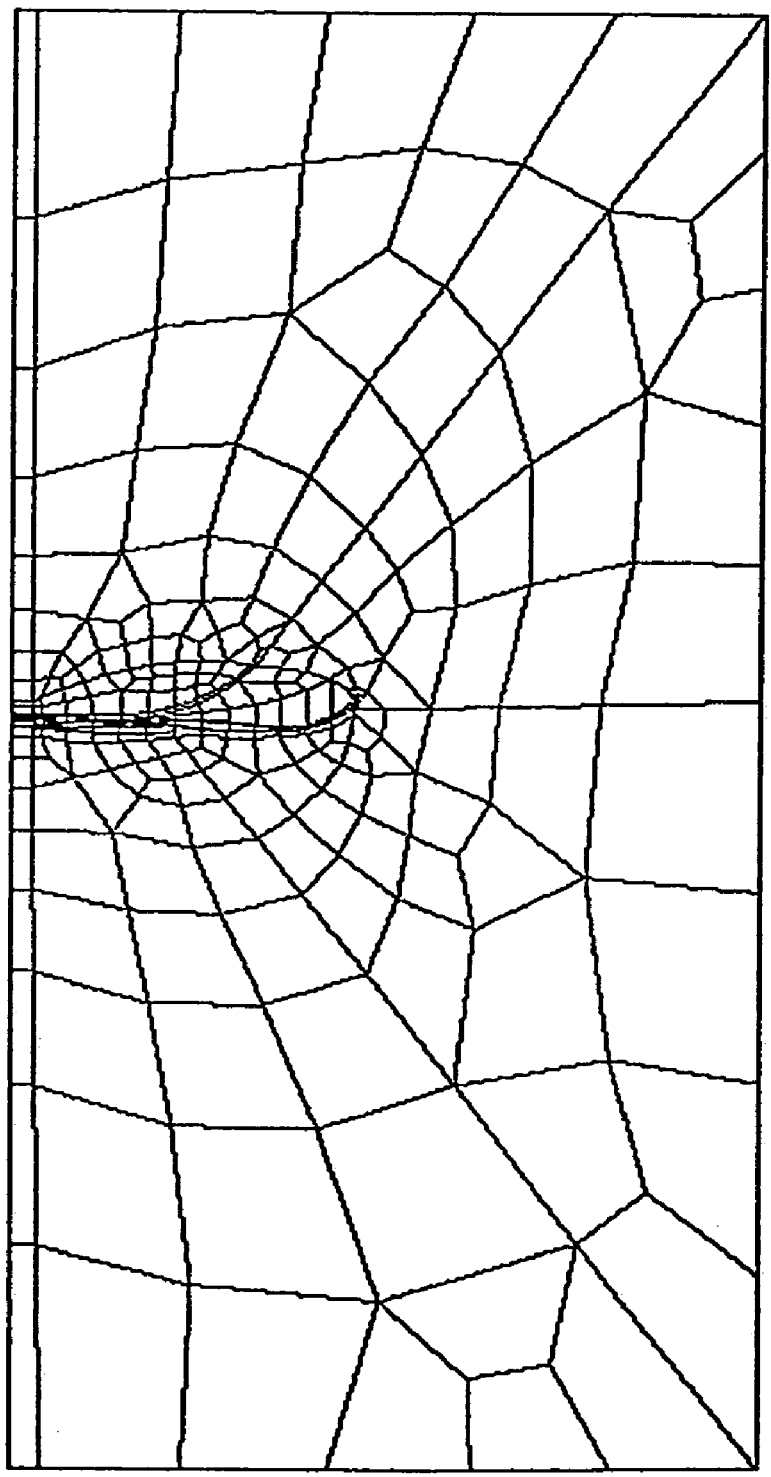
FIG. 6 is an illustration of a space used for analysis in accordance with the first embodiment divided element by element.
Figure 7:
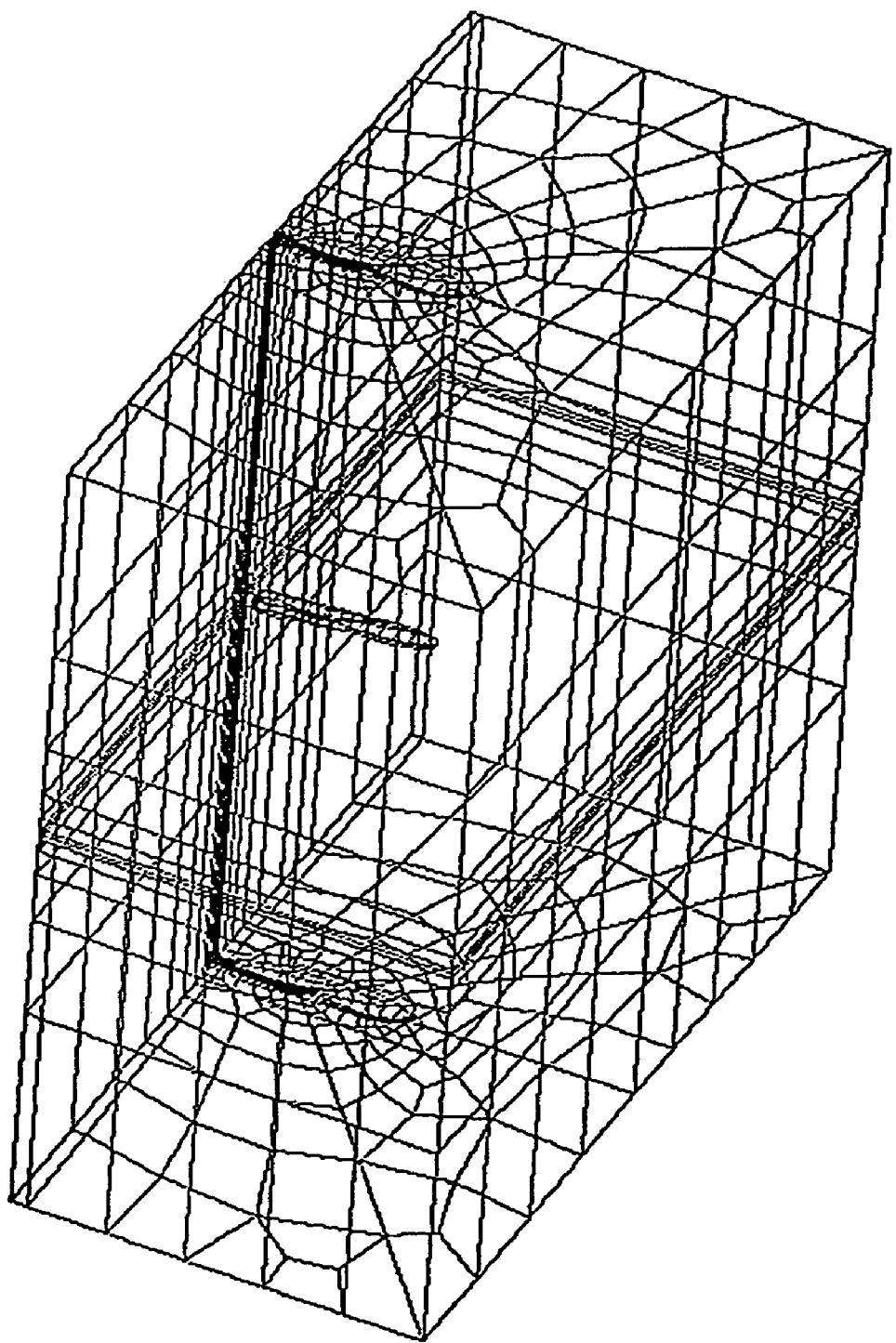
FIG. 7 is a perspective view of the space used for the analysis in accordance with the first embodiment.

Thereafter, the tetragonal mesh is swept upward and downward, to prepare a hexahedron mesh. Tetragonal meshes other than the wing 904 are deleted after the preparation of hexahedron mesh mentioned above. As a result, meshes such as shown in FIGS. 6 and 7 are prepared. In this manner, coordinates and connectivity of respective nodes are prepared for fluid element as well.

Further, to the nodes shared by the fluid and the wing, fixation boundary condition (relative fluid velocity 0) is given as the boundary condition. To the nodes forming the outer wall of the cubic region for analysis, boundary condition of external force of 0, that is, a condition under which the fluid can flow freely, is given.

In addition, mass density, coefficient of viscosity and bulk modulus of the air are given as physical values of each fluid element.

In order to calculate a numerical model related to the structure and a numerical model related to the fluid in the steady hovering state, the inventors analyzed, through fluid-structure interactive analysis, a state in which flapping motion of one period of the numerical model related to the wing structure is repeated for a plurality of times.

(Actual Data)

The data actually used for analysis will be described with reference to Tables 1 to 6.

Coordinates of each node are common to the numerical model related to the fluid and the numerical model related to the structure. Respective nodes are denoted by Node 1, Node 2, . . . . Thus, coordinates of respective nodes are represented by the x, y and z coordinates of respective nodes Node 1, Node 2, . . . , as shown in Table 1. Table 1 is referred to as NodeCoords.dat.

TABLE 1

Node Coords.dat

| Index | x | y | z |
|---|---|---|---|
| Node1 | −0.03616 | 0.03895 | 0.04457 |
| . | . | . | . |
| . | . | . | . |
| Node71 | 0 | 0 | 0 |
| . | . | . | . |
| Node83 | 0.000889 | 0 | 0 |
| . | . | . | . |
| Node337 | 0 | 0.000889 | 0 |
| . | . | . | . |
| . | . | . | . |

Thereafter, it is necessary to designate connectivity of the nodes forming the numerical model related to wing structure, so as to specify the wing structure. Thus, for tetragonal Element1 shown in FIG. 8, four vertexes (nodes) Node71 (that is, P0), Node83 (that is, P1), Node 142 and Node337 (that is, P2) are designated counterclockwise from the lower left vertex (node), to represent the quad nodes shell element by the nodes.

Further, respective shells forming the numerical model related to the wing structure are labeled with numbers, such as ShellElement1, ShellElement2, . . . as shown in Table 2. Connectivity is represented by numerical values representing the node numbers constituting respective shells, listed counterclockwise from the lower left vertex (node) of the four vertexes of tetragonal Element 1 shown in FIG. 8. Table 2 is referred to as ShellMesh.dat.

TABLE 2

ShellMesh.dat

| element index | left_front | right_front | right_back | left_back |
|---|---|---|---|---|
| ShellElement1 | 71 | 83 | 149 | 337 |
| . | . | . | . | . |
| . | . | . | . | . |
| . | . | . | . | . |

Similarly, connectivity is designated for the mesh prepared for the fluid region. Here, the fluid region is represented as hexahedron element. Further, in order to represent scalar amount of pressure acting on the fluid region, an additional node, which is referred to as pressure node, is added to each fluid mesh.

The order of designating connectivity of the hexahedron element is as follows. First, node numbers of four points on the lower surface of the hexahedron element are continuously denoted counterclockwise, from the lower left vertex (node) among the four vertexes (nodes) of tetragonal Element 1 shown in FIG. 8. Thereafter, node numbers of four points on the upper surface of the hexahedron element are designated also counterclockwise, from the lower left vertex (node) among the four vertexes (nodes) of tetragonal Element 1 shown in FIG. 8. Finally, the node number of the pressure node is designated. Thus, a set of connectivity of a total of 9 points is given as shown in Table 3. In Table 3, a set of connectivity of a total of 9 points is given per one fluid element. Table 3 is referred to as FluidMesh.dat.

TABLE 3

| FluidMesh.dat element index | left front bottom | right front bottom | right back bottom | left back bottom | left front top | right front top | right back top | left back top | Pressure |
|---|---|---|---|---|---|---|---|---|---|
| FluidElement1 | 71 | 83 | 149 | 337 | 99 | 221 | 414 | 66 | 121 |
| . | . | . | . | . | . | . | . | . | . |
| . | . | . | . | . | . | . | . | . | . |

Further, it is necessary to add physical values to fluid and structure, respectively. Table 4 represents physical values of respective elements of the numerical model related to the structure.

TABLE 4

ShellMaterial.dat

| element index | Young's modulus | Poisson's ratio | Specific gravity | Thickness |
|---|---|---|---|---|
| ShellElement1 | 0.5E+09 | 0.3 | 0.7E+03 | 4.5E−05 |
| . | . | . | . | . |
| . | . | . | . | . |
| . | . | . | . | . |

Table 5 represents physical values of respective elements of the numerical model related to the fluid.

TABLE 5

FluidMaterial.dat

| element index | Viscosity | Specific gravity | Bulk modulus |
|---|---|---|---|
| FluidElement1 | 1.81E−05 | 1.2 | 1.00E+05 |
| . | . | . | . |
| . | . | . | . |
| . | . | . | . |

Tables 4 and 5 are referred to as ShellMaterial.dat and FluidMaterial.dat, respectively. In ShellMaterial.dat, Young Modulus, Poisson's Ratio, specific gravity and thickness are listed, for numerical model elements related to each structure of the wing. In FluidMaterial.dat, viscosity, specific gravity and bulk modulus are listed for numerical model elements of each fluid.

In the present embodiment, fluid-structure interactive analysis is performed on numerical models related to wing structures having a plurality of different stiffnesses. Here, Young's modulus listed in ShellMaterial.dat above is changed. Accordingly, stiffness of the numerical model related to the wing structure is changed. More specifically, Young's modulus is changed by changing the material of wing 904, assuming that the overall stiffness of the material forming wing 904 is uniform.

Further, Table 6 represents time-history of x, y and z coordinates at the nodes of the wing 904 in ShellMotion.dat, that is, the manner how the positions of nodes of wing 904 change.

embodiment, for convenience of data processing, the manner of flapping of wing 904 is represented by time-sequential data of the positions of three points forming an element near the root portion of wing 904.

Here, it is assumed that deformation of the element at the root portion of wing 904 is very small. Generally, total degree of freedom of three points is nine degrees of freedom. For the nine degrees of freedom, three restricting conditions are posed, that the distance between each of the three points is constant. Therefore, the position and the attitude can be represented by six degrees of freedom, that is, nine degrees of freedom minus three degrees of freedom. The data of FIG. 6 is the time history itself of the coordinate values shown in FIGS. 3 and 4.

The data described above with reference to Tables 1 to 6 are examples only, and data format and the values are not limited to those shown in Tables 1 to 6 described above.

(Results of Calculation)

In the following, an example of the data obtained through the above described fluid-structure interactive analysis will be discussed. The data are obtained as a result of fluid-structure interactive analysis using the data shown in Tables 1 to 6.

Figure 9:
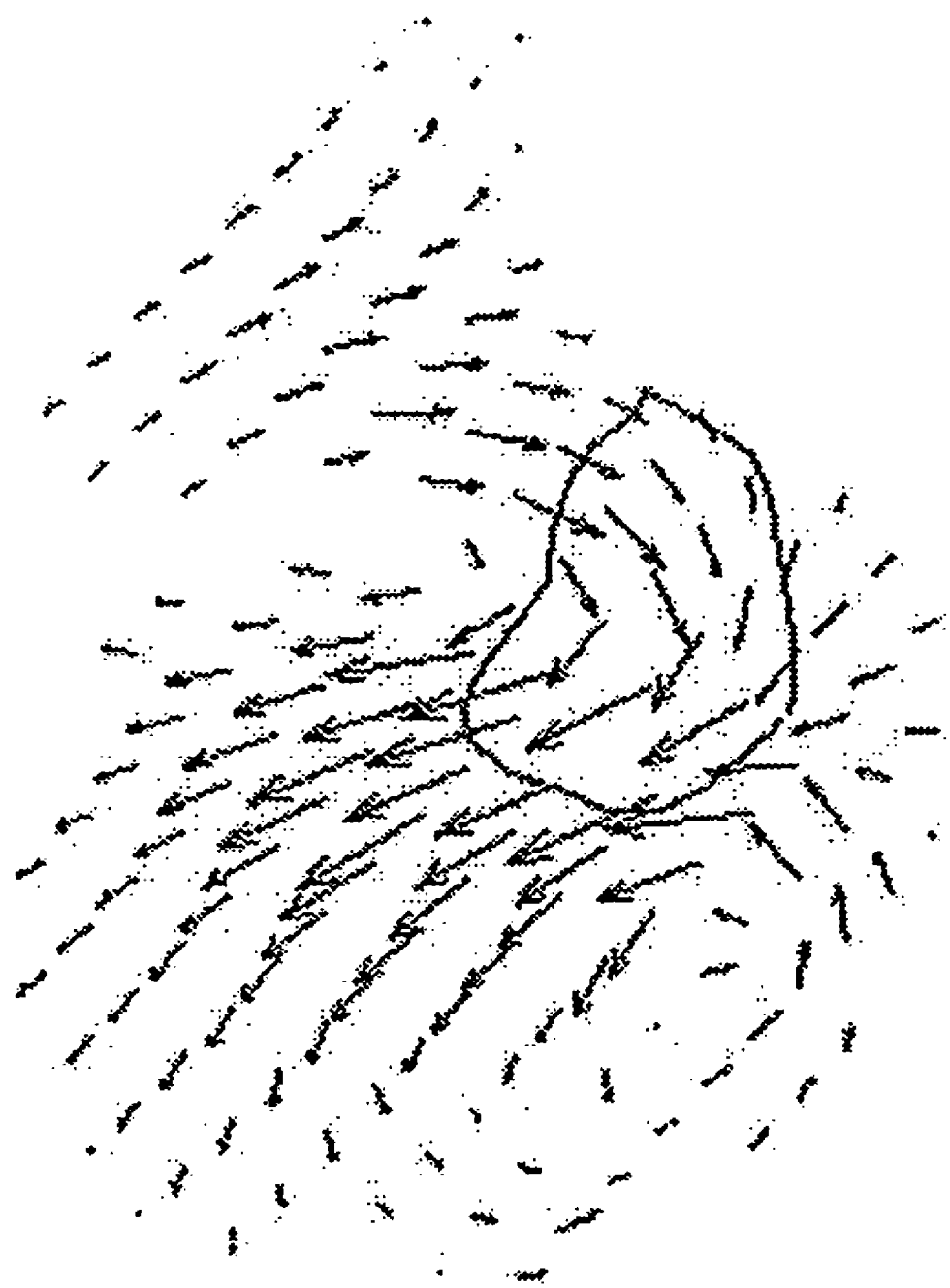
FIG. 9 is a visualization of the numerical model of the fluid, representing fluid flow around the wing in accordance with the first embodiment.

FIG. 9 represents the results of calculation of the fluid behavior around the wing 904 in a steady state. In FIG. 9, arrows represent absolute velocity distribution around the wing 904. Considering the time of calculation, fluid-structure interactive analysis is performed on a half model, in which the body structure of the rising and moving apparatus is omitted and only one of the left and right wings is given. Further, in order to avoid complexity of display, only the absolute velocity distribution on a cross section vertical to the surface of wing 904 is given.

Figure 10:
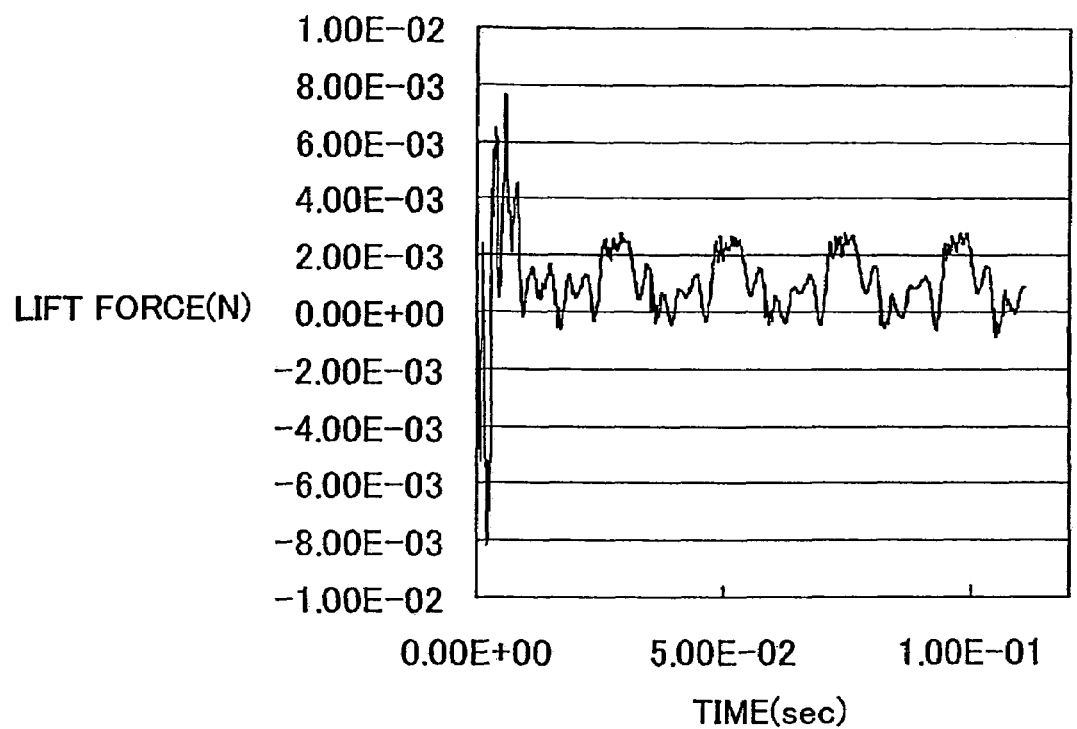
FIG. 10 is a graph representing time-sequential change in the lift force acting on the wing in accordance with the first embodiment.

FIG. 10 represents the lift force generated by the flapping motion of the wing calculated by the fluid-structure interactive analysis described above. As shown in FIG. 10, the lift force is irregular at first, but eventually converges to a periodic behavior. At the time point when the lift force becomes periodic, the behavior of the fluid and the behavior of the structure each become periodic. The periodic behavior of the lift force is equivalent to the behavior of the fluid and of the structure during hovering.

Figure 11:
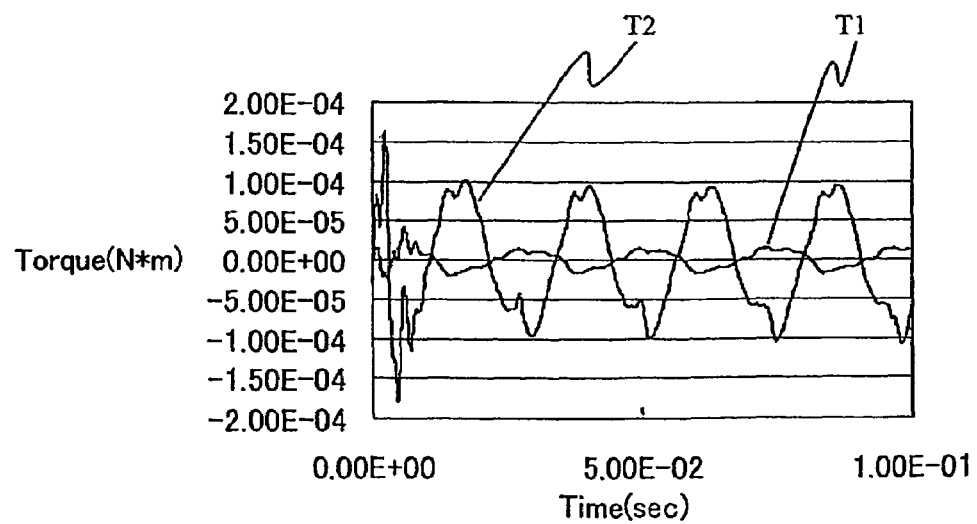
FIG. 11 is a graph representing relation between time and driving torque of the wing, in accordance with the first embodiment.

FIG. 11 represents a relation between the driving torque necessary for driving wing 904 and time, in the fluid-

TABLE 6

ShellMotion.dat

| Node/Time(sec) | 0 | 0.00003 | 0.00006 | 0.00009 | . . . | 0.121 |
|---|---|---|---|---|---|---|
| Node71_x | 0 | 0 | 0 | 0 | . . . | 0 |
| Node71_y | 0 | 0 | 0 | 0 | . . . | 0 |
| Node71_z | 0 | 0 | 0 | 0 | . . . | 0 |
| Node83_x | 0.000889 | 0.000889 | 0.000889 | 0.000889 | . . . | 0.000874 |
| Node83_y | 0 | 1.15E−07 | 4.56E−07 | 1.02E−06 | . . . | 6.5E−05 |
| Node83_z | 0 | 9.04E−08 | 3.59E−07 | 8.02E.07 | . . . | 0.000148 |
| Node337_x | 0 | −1.1E−07 | −4.6E−07 | 1E−06 | . . . | 0.000155 |
| Node333_y | 0.000889 | 0.000889 | 0.000889 | 0.000889 | . . . | 0.00056 |
| Node337_z | 0 | −1.6E−07 | −6.4E−07 | −1.4E−06 | . . . | −0.00067 |

As described above, the manner of flapping of wing 904 (how it flaps) is represented by six degrees of freedom in the position and attitude of the node at the root portion of wing 904. In the fluid-structure interactive analysis of the present structure interactive analysis described above. Here, θ1(T1) represents the torque in the direction of right turn when the longitudinal direction of the wing (wing span direction), that is, the direction from the root portion to the tip end portion of the wing 904 is the axis of rotation. θ2(T2) represents the torque in the direction of right turn when the direction from the leading edge to the trailing edge of the wing (direction in the plane of wing 904 and orthogonal to the direction of the wing span) is the axis of rotation. θ3(T3) represents the torque in the direction of right turn when vector product of θ1 and θ2 is the axis of rotation.

From the result of analysis, a numerical model related to the structure and a numerical model related to the fluid during steady hovering can be obtained. As a result, the weight of the rising and moving apparatus that can be lifted in accordance with the numerical model related to the manner of flapping described above and the torque of the actuator to realize the manner of flapping in accordance with the numerical model of the manner of flapping described above can be calculated.

(Preparation of the Wing)

The method of preparing wing 904 will be described with reference to FIGS. 12 to 14.

Figure 12:
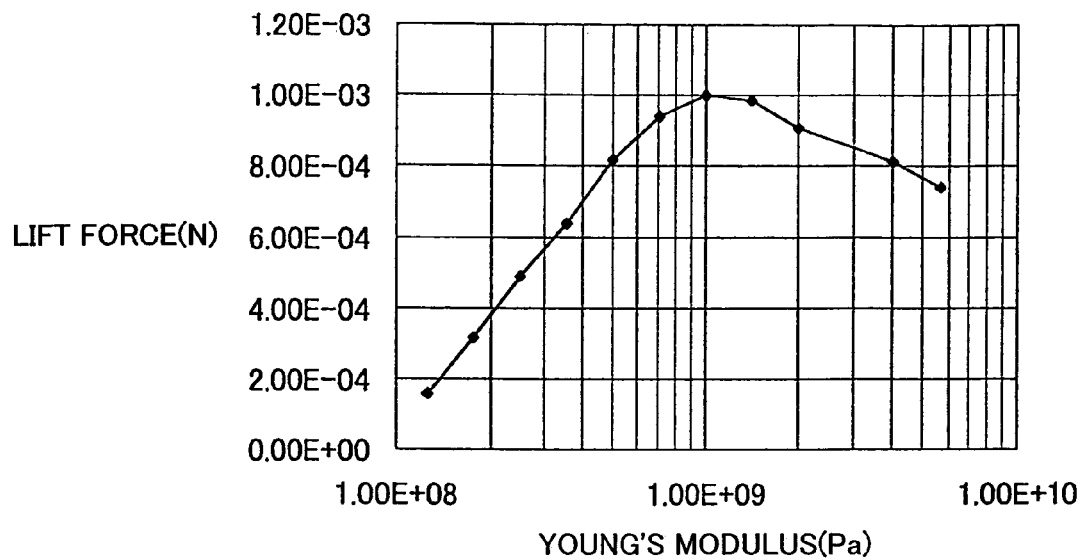
FIG. 12 is a graph representing relation between stiffness (Young's modulus) of the wing and lift force, in accordance with the first embodiment.
Figure 13:
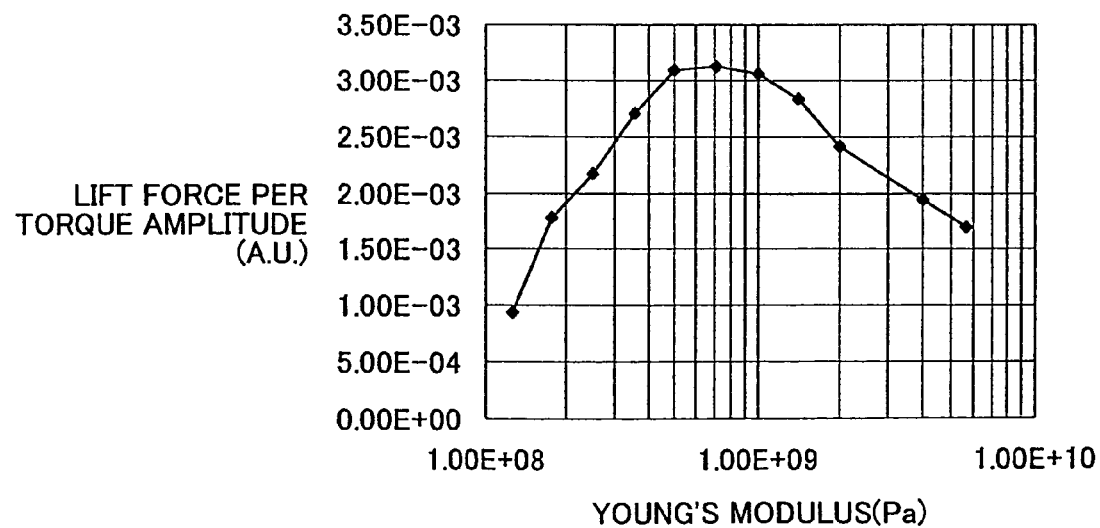
FIG. 13 is a graph representing relation between stiffness (Young's modulus) of the wing and torque efficiency, in accordance with the first embodiment.

FIG. 12 represents a relation between Young's modulus of the wing in the numerical model related to the structure described above and the lift force when Young's modulus of the wing is varied logarithmically. The optimal Young's modulus of the wing is about $1.0 \times 10^9$. When Young's modulus of the wing is not higher than $2.5 \times 10^8$, the lift force becomes at most 0.5 times the maximum value. Therefore, we can conclude that a wing of which Young's modulus is not higher than $2.5 \times 10^8$ is not suitable for flapping flight.

Further, the maximum amplitude of the wing driving torque and the lift force are calculated. The resulting relation between the value obtained by dividing the lift force described above by the value of the maximum amplitude of the wing torque and Young's modulus is shown in FIG. 13. Namely, relation between efficiency of driving torque and Young's modulus is shown. As can be seen from FIG. 13, optimal Young's modulus of the wing is about $7.07 \times 10^8$, and when Young's modulus of the wing is out of the range of $1.77 \times 10^8$ to $5.66 \times 10^9$, the lift force attained with the same torque decreases to be lower than half the maximum value. Therefore, a wing of which Young's modulus is out of the range of $1.77 \times 10^8$ to $5.66 \times 10^9$ is not suitable for flapping flight.

Further, it is effective to derive the relation between driving characteristics of driving unit 905 and Young's modulus. By way of example, assume that an actuator of which driving force is in proportion to the voltage, such as an actuator that generates electrical traction, is used as the actuator for the rising and moving apparatus. Generally, the energy of an actuator is in proportion to a square of the voltage applied to the actuator. Therefore, the energy necessary for the flapping flight is in proportion to a square of the force exerted on the driving unit at the time of flapping motion.

By a calculation utilizing such a characteristic, it is possible to calculate the energy consumed by driving unit 905. Accordingly, the relation between the lift force per unit energy obtained by dividing the lift force by the energy and Young's modulus can be derived, as shown in FIG. 14.

Figure 14:
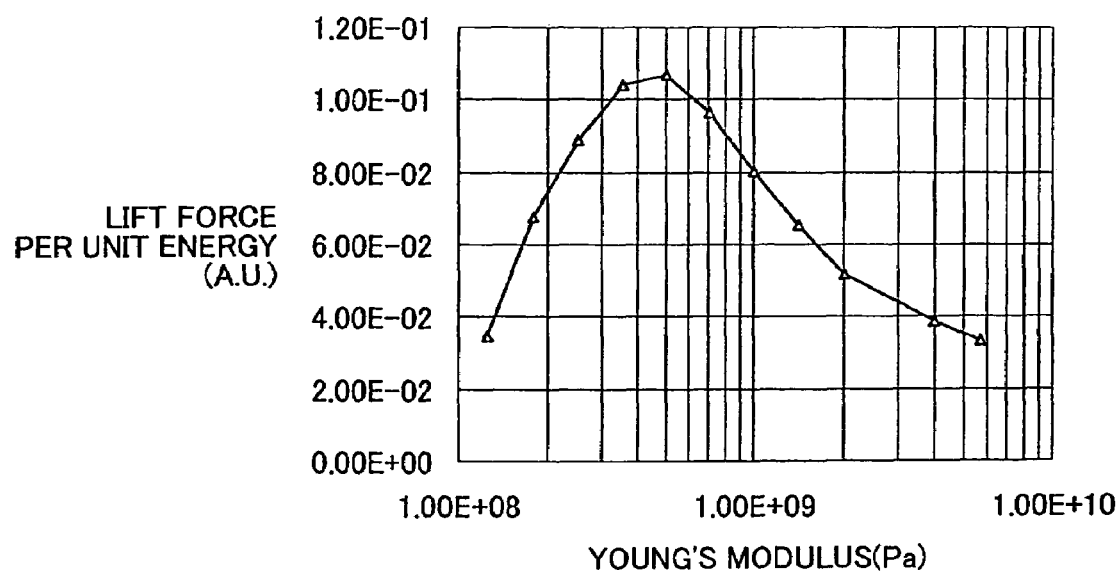
FIG. 14 is a graph representing relation between stiffness (Young's modulus) of the wing and energy efficiency, in accordance with the first embodiment.

As can be seen from FIG. 14, the optimal Young's modulus of the wing is $5.0 \times 10^8$, and when Young's modulus is out of the range of $1.77 \times 10^8$ to $2.0 \times 10^9$, driving energy twice as much or higher is necessary to attain the same lift force as that attained when Young's modulus is $5.0 \times 10^8$. Therefore, a wing of which Young's modulus is out of the range of $1.77 \times 10^8$ to $2.0 \times 10^9$ requires increased mass of the driving energy source, and hence, it is not suitable for flapping flight.

Other methods of preparing the wing may include the following.

First, data of time history of the torque shown in FIG. 11 is subjected to Fourier series development, so as to obtain maximum driving frequency required of driving unit 905. The definition of the maximum driving frequency is determined in accordance with characteristics and the like of the driving unit of the flapping rising and moving apparatus. By way of example, the maximum driving frequency may be defined as the maximum value of the frequency that has a spectrum intensity exceeding a certain threshold value. By a procedure similar to that of the aforementioned Fourier series development, maximum driving frequency required of driving unit 905 for each of a plurality of values of Young's modulus is calculated. Thereafter, among the values of Young's modulus with which lift force condition and the like are within the condition for rising and moving the rising and moving apparatus, one value of Young's modulus that corresponds the lowest maximum driving frequency is extracted. Then, a wing having the thus extracted Young's modulus is formed.

Further, relation between Young's modulus and each of numerical models of applications, that is, manner of rising, state of use or manner of flight of the rising and moving apparatus 90 is plotted as a graph. In this manner, a wing of which Young's modulus realizes the manner of rising, state of use or manner of flight that is closest to the target manner of rising, state of use or manner of flight may be used to form the rising and moving apparatus. By way of example, means that represents the target manner of rising, state of use or manner of flight may be magnitude of vibration experienced by body 906.

As described above, in the method of manufacturing the flapping flight moving apparatus as the rising and moving apparatus in accordance with the present embodiment, a plurality of numerical models of wing structure having different stiffnesses are used. For each of the plurality of numerical models of wing structure, fluid-structure interactive analysis is performed, to obtain a numerical value related to the fluid behavior. Based on the numerical model related to the fluid, an optimal numerical model of wing structure is obtained, which has Young's modulus that attains optimal result for a prescribed parameter. A prototype of the wing that is equivalent to the optimal numerical model of wing structure is formed.

It is noted that in designing the rising and moving apparatus of the present embodiment, a value that is 0.5 times the optimal value is used as a reference value for each of the lift force, driving torque efficiency and driving energy efficiency. The reference value, however, is only an example for description, and not limited to 0.5 times the optimal value. When this reference value is used, it is determined that Young's modulus of the wing within the range of $2.5 \times 10^8$ to $2.0 \times 10^9$ is suitable for flapping flight.

In the simplest manner, a wing 904 may be formed of a material having Young's modulus in the range of $2.5 \times 10^8$ to $2.0 \times 10^9$, and the wing 904 suitable for driving unit 905 can readily be obtained.

It may be the case that only a material having a certain predetermined Young's modulus is available as the material of the wing. In that case, the thickness distribution of the wing is changed such that wing 904 deforms in the similar manner as the numerical model related to the structure of the optimal wing 904. In this manner, a wing having the target stiffness distribution may be formed.

Generally, at a portion where bending deformation is dominant, the degree of bending deformation of the wing is in inverse proportion to a product of a cube of the wing thickness and Young's modulus. At a portion where tensile deformation is dominant, the degree of tensile deformation of the wing is in proportion to a product of the wing thickness and Young's modulus. Therefore, a method of forming a wing may be possible in which thickness distribution of the numerical model of wing structure is reorganized.

More practically, the following method may be possible. First, thickness distribution of the numerical model of wing structure is obtained. Thereafter, using the result of fluid-structure interactive analysis, amount of displacement and amount of deformation with respect to loads on various portions of the numerical model of wing structure are calculated. Finally, thickness distribution of the numerical model of wing structure mentioned above is modified by binary search and sensitivity analysis, for example, such that the same deformation occurs as that experienced by the optimal numerical model of wing structure under the load. A prototype of the wing, of which thickness distribution is in accordance with the new numerical model of wing structure obtained by this modification, is formed.

As described earlier, the numerical model of wing structure changes differently in flexural rigidity and in tensile strength when the thickness is changed. Therefore, change in thickness should desirably be as small as possible.

By the technique above, wing 904 having the optimal stiffness is formed.

As can be understood from the consideration of analysis results, the wing that is suitable for flapping flight is not a wing as a rigid body but a wing capable of elastic deformation, having Young's modulus in the range of $2.5 \times 10^8$ to $2.0 \times 10^9$.

Next, generalization of stiffness at a representative portion will be considered.

In the following, in the numerical model of wing structure prepared by using the fluid-structure interactive analysis in accordance with the present embodiment, stiffness at a trailing edge point (P3 in FIG. 5) near the center between the root portion and the tip end portion of the wing will be considered as a reference.

Generally, when the flapping flight moving apparatus flies flapping, the velocity of the fluid colliding against the wing differ portion by portion. For example, at the tip end side of the wing, fluid velocity is large, while at the root side of the wing, fluid velocity is small. The force exerted from the fluid to the wing is in proportion to a square of the wing velocity. Therefore, when the stiffness is gradually increased from the tip end side to the root side of the wing such that the stiffness is in proportion to the square of distance from the tip end portion of the wing to a prescribed portion, it follows that almost the same deformation occurs at every portion from the tip end to the root of the wing.

Further, the relation between stiffnesses of wings of a plurality of rising and moving apparatuses may be represented by a function that is in proportion to a square of a product of the flapping frequency of the wing and the length of the wing of each rising and moving apparatus. By way of example, when the flapping frequency is twice that of a reference wing and the length of the wing is ⅓ times the length of the reference wing, the wing of interest has the stiffness ⁴⁄₉ times the stiffness of the reference wing.

Further, the amount of displacement caused by bending of a flat plate increases in proportion to a cube of a distance from a fulcrum, when rotational motion and translational motion at the fulcrum of the flat plate are both restricted.

The foregoing contents can be given by the following expressions. The relation of load-displacement at a measurement point of stiffness at a distance r0 from the fulcrum can be represented as $d/w \propto r0^3$, as described above, using positional displacement d derived from a small deformation when a small load w is on a prescribed position of the wing. Therefore, a constant K0 represented as $K0=r0^3/(d/w)$, that is, stiffness normalized by the distance r0 from the fulcrum (stiffness divided by the cube of distance r0 from the fulcrum to the measurement point) is constant regardless of the distance r0 from the fulcrum to the measurement point.

As described above, in a numerical model of the structure (wing model 904) in accordance with the present embodiment, when the representative length of the wing is defined as L0 and the flapping frequency is defined as f0, stiffness K of a wing having the representative length L and flapping frequency f satisfies the following relation, when represented in a state normalized (divided) by the distance r0 from the fulcrum to the point of measurement of displacement:

$K=K0 \times ((L \times f)/(L0 \times f0))^2$.

Simulation shows that when a numerical model of the structure of wing 904 has Young's modulus of $5.0 \times 10^8$, representative length of L0=0.017 (m), distance from the fulcrum to the point of measurement of displacement r0=0.00515 (m) and the load w is $9.8 \times 10^{-6}$ (N), the amount of displacement d at the point of measurement at a distance of r0 from the fulcrum is $1.2 \times 10^{-4}$ (m). In the rising and moving apparatus in accordance with the present embodiment, flapping frequency is F0=1/0.023 (Hz), and hence, stiffness $K0=1.12 \times 10^{-8}$. Similarly, considering the upper limit and lower limit of Young's modulus determined in advance, the following relation holds:

$0.66 \times 10^{-8} < K0 < 3.16 \times 10^{-8}$.

The value K0 as such is the coefficient representing the stiffness of the wing most suitable for flapping flight in accordance with the present embodiment. Specifically, the stiffness of the wing may be determined by employing the value K that satisfy the condition of $0.36 \times 10^{-8} < K/(L \times f)^2 < 4.48 \times 10^{-8}$.

It may be possible that the wing size or flapping frequency is different from that of the rising and moving apparatus of the numerical model related to the wing structure and the numerical model related to the manner of flapping (how it flaps) described above. In that case, the range of wing stiffness K may be determined in accordance with the general condition given above and a wing 904 having the determined stiffness may be formed, and a wing having the stiffness most suitable for flapping flight can be obtained.

The technique described above is an example of a technique of utilizing the data obtained from the numerical model related to the structure and the numerical model related to the fluid. By way of example, as the representative length L, a distance from the fulcrum of the wing to a portion that receives the highest fluid force may be used.

(Supplement)

In the rising and moving apparatus in accordance with the present embodiment, it is assumed that the structural deformation of the wing is mainly bending deformation, and the wing structure is assumed to be a flat plate. The structure of the wing, however, is not limited to a flat plate.

Even when a numerical model related to a combined structure of beams and films as generally observed on wings of insects is used, it is possible to determine the stiffness of the wing by using a technique similar to that shown in FIG. 1. Further, a net structure as observed in wings of insects may be replaced by the numerical model of a flat plate structure such as the wing 904 in accordance with the present embodiment for analysis.

Further, the method of fluid-structure interactive analysis is not limited to the fluid-structure interactive analysis of the present embodiment and any method may be used provided that the behavior of the wing that passively deforms because of the fluid force can be represented properly. If similarity transformation of the wing deformation can be realized using an enlarged scale model by, for example, providing anisotropy in stiffness distribution of the wing, a method may be used in which the wing stiffness is determined through experiments. It is possible by such a method also to prepare one that attains similar effects as the flapping flight moving apparatus in accordance with the present embodiment.

In the numerical model of wing structure in accordance with the present embodiment, for simplicity of description, the optimal stiffness of wing 904 is calculated by changing Young's modulus of wing 904 as a whole. The method of determining the stiffness of the wing is not limited to the one described above. A method may be used in which Young's modulus of the wing is determined portion by portion. A method may be used in which thickness distribution of the wing is determined portion by portion. Further, a method may be used in which Young's modulus and thickness are changed every element by element of the numerical model of the structure of wing 904 to find the optimal Young's modulus and optimal thickness distribution of the wing, if increased amount of computation does not pose any problem.

Further, the method of setting an outer shape of wing 904 and a shape of each element constituting wing 904, and setting the surrounding space for analysis is not limited to the one described above. The optimal value of wing stiffness may vary dependent on the characteristics of driving apparatus 905 and the manner of driving. Therefore, actually, it is desirable to form the wing 904 by calculating a range of acceptable stiffness or avoiding extremely unacceptable stiffness under expected main manners of driving such as turning to the left or right or forward movement.

In the present embodiment, a minimum necessary, abstract component for autonomous movement based on external instruction information has been described as an arrangement of the rising and moving apparatus. The component is described as having control unit 901, instruction receiving unit 902, sensor unit 903, driving unit 905 and wing 904 provided on body 906. When external instruction is unnecessary, instruction receiving unit 902 is unnecessary, and when sensor feedback is unnecessary, sensor unit 903 is unnecessary.

As the stiffness of the wing and the manner of flapping are closely related to each other, a method may be used in which, opposite to the method of determining stiffness of the wing based on the manner of flapping, the flapping frequency or the manner of flapping itself is determined based on the lift force calculated by the fluid-structure interactive analysis in accordance with the present embodiment. Further, a method may be used in which wing stiffness is determined by combining the method of determining the wing stiffness based on the manner of flapping of the wing and the method of determining the flapping frequency or the manner of flapping itself based on the calculated lift force.

(Characteristics and Effects of the Rising and Moving Apparatus in Accordance with the Present Embodiment)

Figure 15:
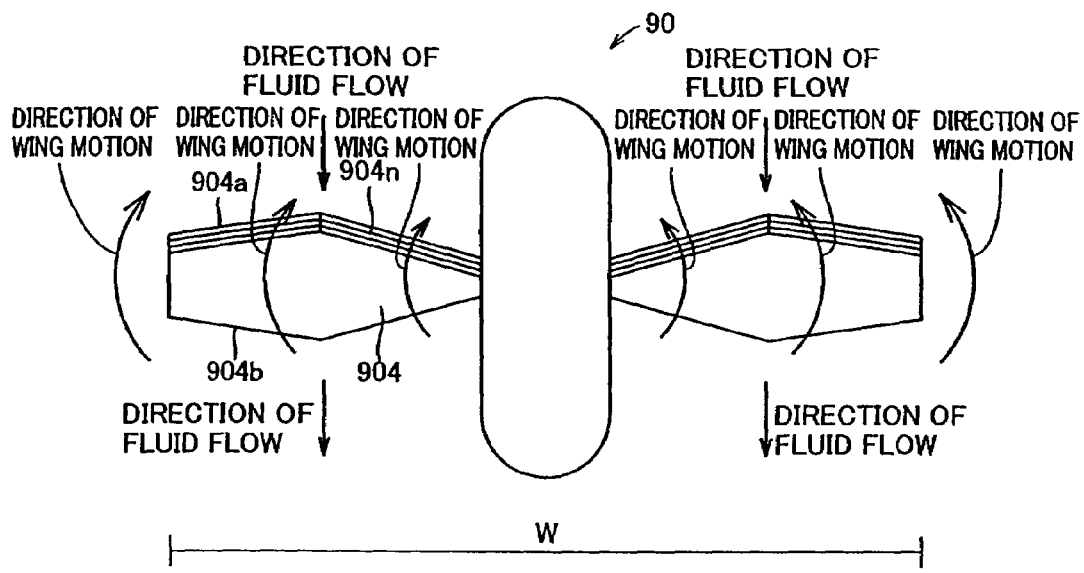
FIGS. 15 to 23 show first to ninth examples of the rising and moving apparatus in accordance with the first embodiment.
Figure 16:
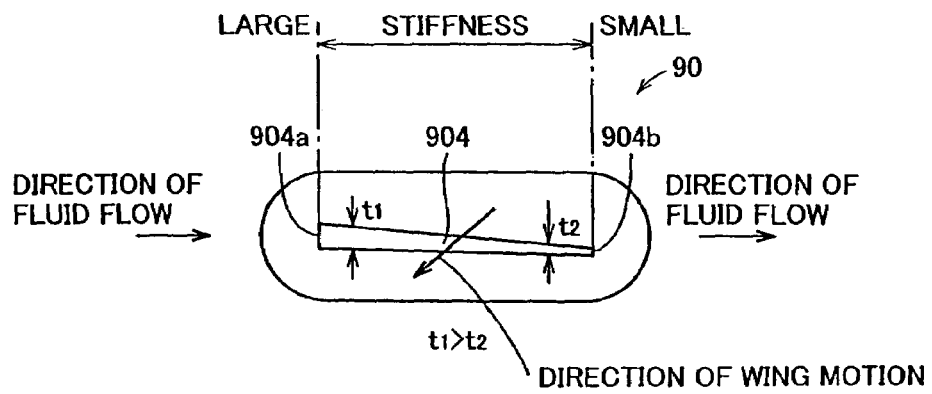
Figure 17:
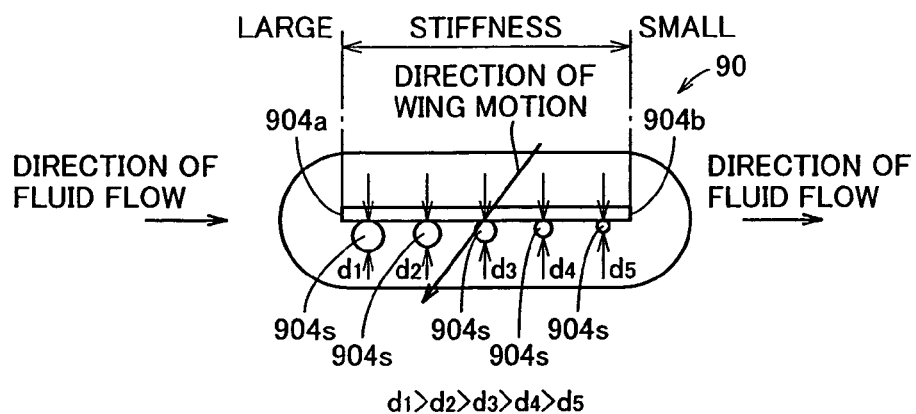

Characteristics and effects of the rising and moving apparatus will be described with reference to FIGS. 15 to 24. In FIGS. 15 to 17, fluid flow is denoted by arrows. The flow denoted by the arrows in these figures represent relative fluid velocity between the wing and the fluid caused by the motion of the wing represented by arrows in the same figures, unless specified otherwise. Further, wing 904 of the rising and moving apparatus of the present embodiment described below has wing stiffness distribution optimized by utilizing the fluid-structure interactive analysis described above. Therefore, the stiffness distribution of wing 904 as described below is suitable for flapping flight.

The rising and moving apparatus in accordance with the present embodiment is a rising and moving apparatus in which a wing shaft can be reciprocated (pivoted) in the forward/backward direction and the wing shaft can pivot about a central axis of rotation in the direction of extension of the wing shaft. Therefore, the rising and moving apparatus in accordance with the present embodiment is capable of obtaining rotational lift, wake capture and efficiently using the phenomenon of delayed stall. Specific examples of such structure and function of a rising and moving apparatus will be described with reference to the third and fourth embodiments, and therefore, only the characteristics of the wing will be discussed here.

Figure 2:
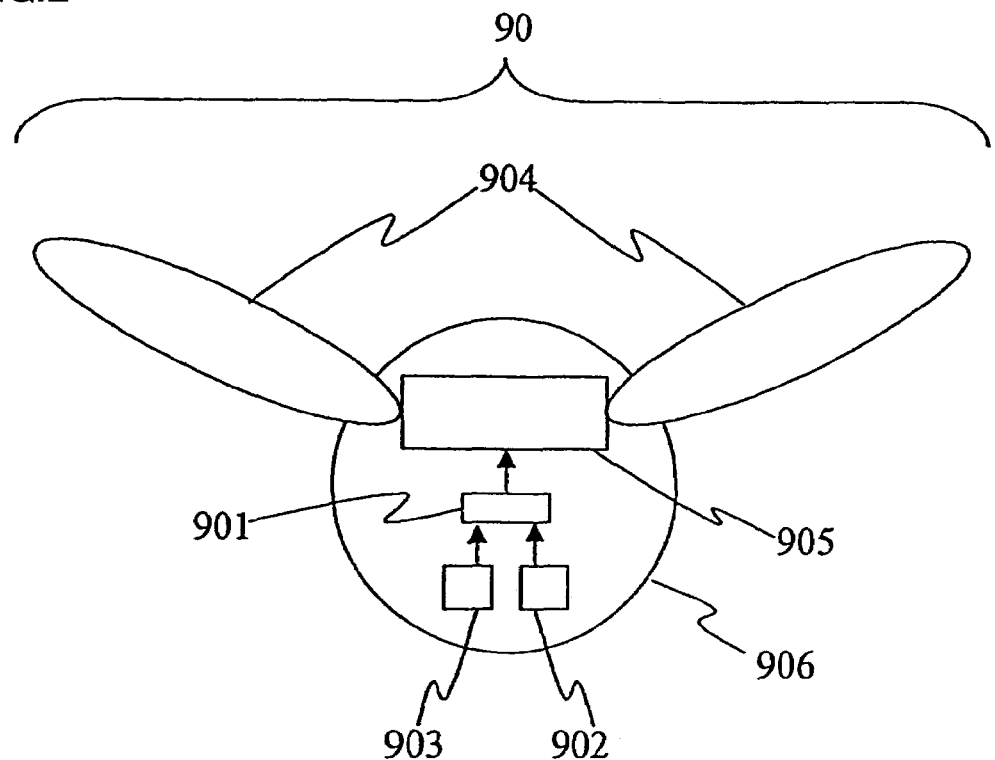
FIG. 2 represents main components of the rising a moving apparatus in accordance with the first embodiment.

As shown in FIG. 2, the rising and moving apparatus (90) of the present embodiment includes a wing portion (904) elastically deformed by a force exerted by surrounding fluid, to an extent that allows a body (901, 902, 903, 905, 906) to hover and move, a driving unit (905) driving the wing portion (904), and a control unit (901) controlling the manner of driving by the driving unit (905).

Therefore, the inefficiency of flapping motion and instability in control of the flapping motion that are the disadvantages of the wing portion as a rigid body can be improved.

Desirably, the wing portion (904) mentioned above has torsional rigidity or flexural rigidity of an upstream side of the fluid represented by the arrows higher than the torsional rigidity or flexural rigidity of the downstream side of the fluid represented by the arrows, as shown in FIG. 15.

By this arrangement, buckling of the wing portion (904) at the upstream side of the fluid caused by the fluid force in the compressing direction exerted on the wing portion (904) at the upstream portion of the fluid can be suppressed.

Further, desirably, the wing portion (904) has torsional rigidity or flexural rigidity on the side of the leading edge (904a) higher than the torsional rigidity or flexural rigidity on the side of the trailing edge (904b), as shown in FIG. 15.

By this arrangement, buckling of the wing portion (904) at the side of the leading edge (904a) caused by the fluid force in the compressing direction exerted on the wing portion (904) at the side of the leading edge (904a) can be suppressed.

Further, a wave plate structure (904n) having ridge lines or valley lines extending along the direction of the wing span (w) of the wing (904) may be provided at the upstream side of the fluid of the wing (904), as shown in FIG. 15. Further, a wave plate structure (904n) having ridge lines or valley lines extending along the direction of the wing span (w) of the wing (904) may be provided at the leading edge (904a) side of the wing (904). Further, thickness ($t_1$) of the wing portion (904) on the upstream side of the fluid represented by the arrows may be larger than the thickness ($t_2$) of the wing portion (904) on the downstream side of the fluid, as shown in FIG. 16. Further, support structure (904s) at the upstream side of the fluid represented by the arrows may be thicker than the support structure (904s) at the downstream side of the fluid (relation between diameters of cross sectional circles of a plurality of support structures: $d_1 > d_2 > d_3 > d_4 > d_5$). Further, thickness ($t_1$) of the wing portion (904) on the side of the leading edge (904a) may be larger than the thickness ($t_2$) of the wing portion (904) on the side of the trailing edge (904b), as shown in FIG. 16. Further, the support structure (904s) on the side of the leading edge (904a) may be thicker than the support structure (904s) on the side of the trailing edge (904b), as shown in FIG. 17 (relation between diameters of a plurality of support structures: $d_1 > d_2 > d_3 > d_4 > d_5$).

By such an arrangement, such a stiffness distribution of the wing portion (904) can be realized that efficiently suppresses buckling at the portion of the wing (904) on the upstream side of the fluid or the side of the leading edge (904a) of the wing (904), without much increasing the mass of the wing portion (904).

Figure 18:
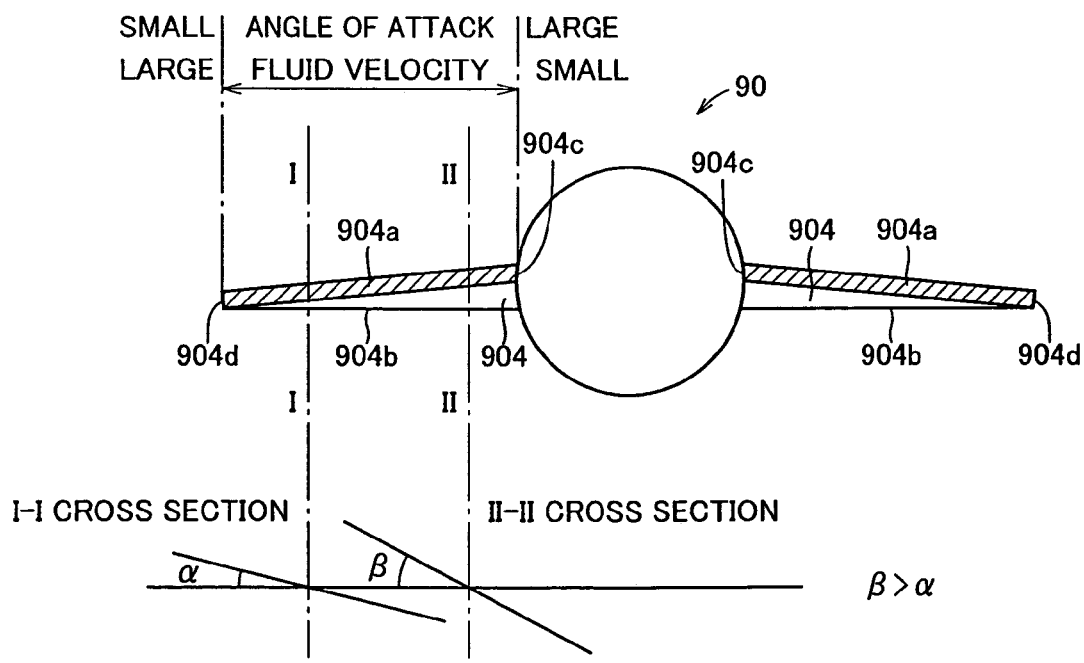

Further, the angle of attack of the wing portion (904) where the fluid velocity is relatively high is smaller as compared with the angle of attack of the wing portion where the fluid velocity is relatively low ($\alpha < \beta$), as shown in FIG. 18. Further, it is desirable that the angle of attack ($\alpha$) of the wing portion (904) at the tip end (904d) is smaller as compared with the angle of attack ($\beta$) of the wing portion (904) at the root (904c) ($\alpha < \beta$), as shown in FIG. 18.

Because of this arrangement, it becomes possible to optimize the angle of attack at various portions of the wing (904), in accordance with the magnitude of fluid velocity colliding against various portions of the wing portion (904).

Desirably, the wing portion (904) is rotatable about a prescribed center of rotation (wing root 904c), and flexural rigidity of the portion relatively closer to the center of rotation (wing root 904c) of the wing (904) is higher than the flexural rigidity of the portion relatively far from the center of rotation (wing root 904c).

By the above described structure, the portion of the wing (904) having small radius of rotation can be moved more quickly than the portion of the wing (904) having larger radius of rotation, when the rising and moving apparatus (90) turns. More specifically, as compared with the portion far from the center of rotation (wing root 904c) where the motion velocity is high, the portion closer to the center of rotation (wing root 904c) where the motion velocity is lower can be moved more quickly.

Figure 19:
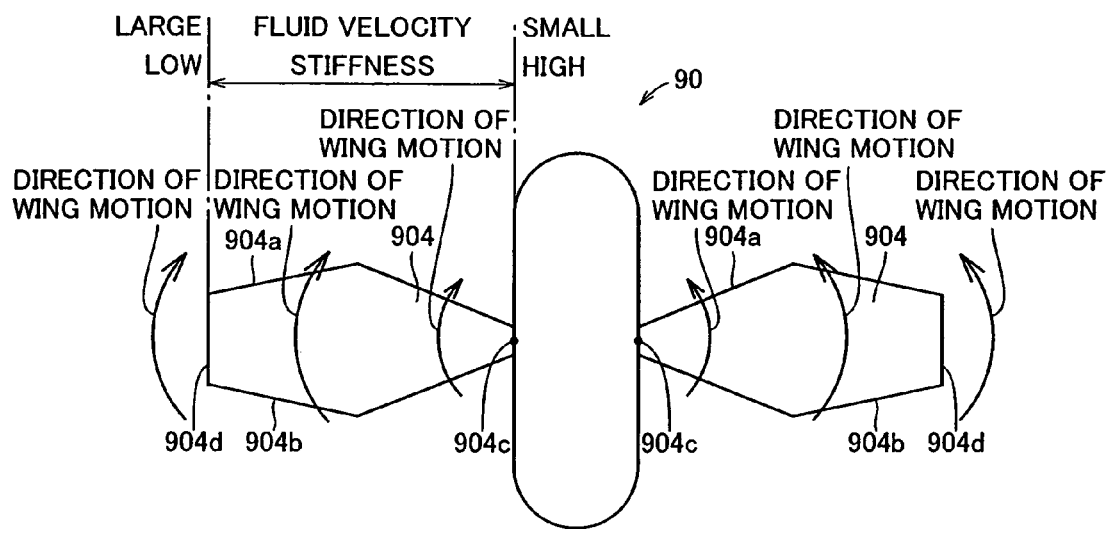

Desirably, the wing portion (904) is rotatable about a prescribed center of rotation (wing root 904c), and torsional rigidity of the portion relatively closer to the center of rotation (wing root 904c) of the wing portion (904) is higher than the torsional rigidity of the portion relatively far from the center of rotation (wing root 904c), as shown in FIG. 19.

By the above described arrangement, among the portions of wing (904), the portion (tip end 904d) of the wing where the fluid velocity colliding against the wing (904) is high assumes an attitude closer along the direction of the fluid flow, and hence, the portion comes to have smaller angle of attack. Therefore, a wing portion (904) can be realized that has angles of attack distribution conforming to the fluid velocity.

Figure 20:
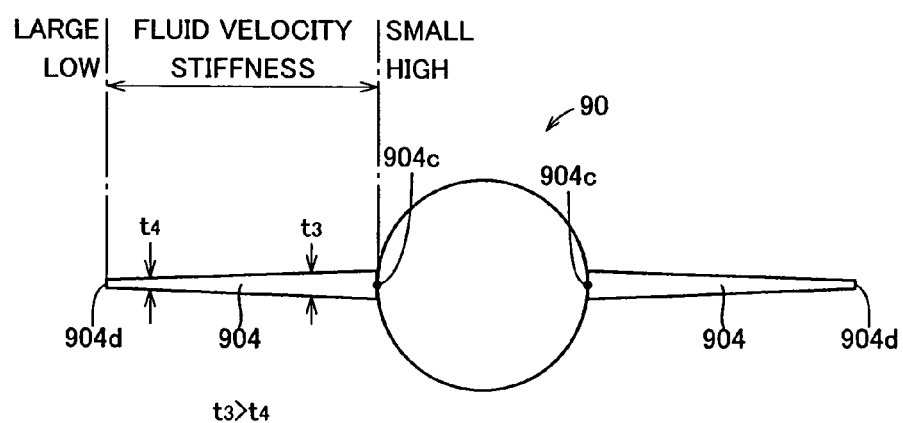
Figure 21:
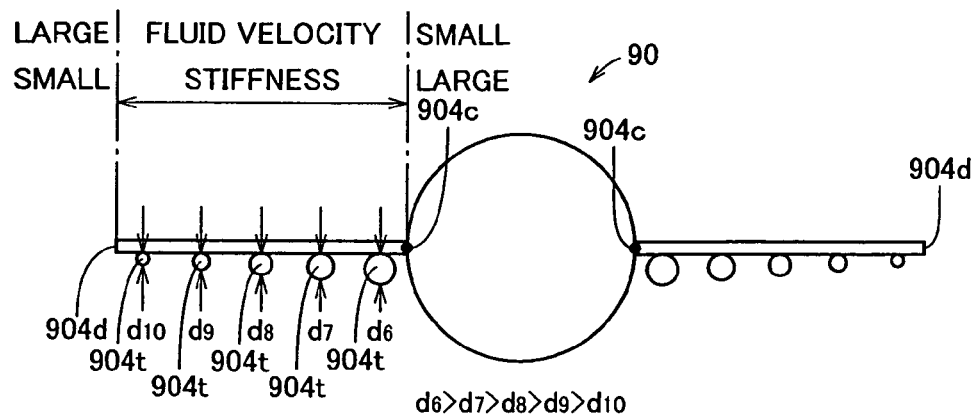

Desirably, thickness ($t_3$) of the wing at a portion closer to the center of rotation (wing root 904c) is larger than the thickness ($t_4$) far from the center of rotation (wing root 904c) ($t_3 > t_4$), as shown in FIG. 20. Further, desirably, the support structure (904t) closer to the center of rotation (wing root 904c) is thicker than the support structure (904t) far from the center of rotation (wing root 904c), as shown in FIG. 21 (diameters of support structures (904t) satisfy $d_6 > d_7 > d_8 > d_9 > d_{10}$).

By this arrangement, the stiffness on the side closer to the center of rotation (wing root 904c) of the wing (904) and the stiffness on the side far from the center of rotation(wing root 904c) of the wing (904) can be made different from each other by a simple method.

Figure 22:
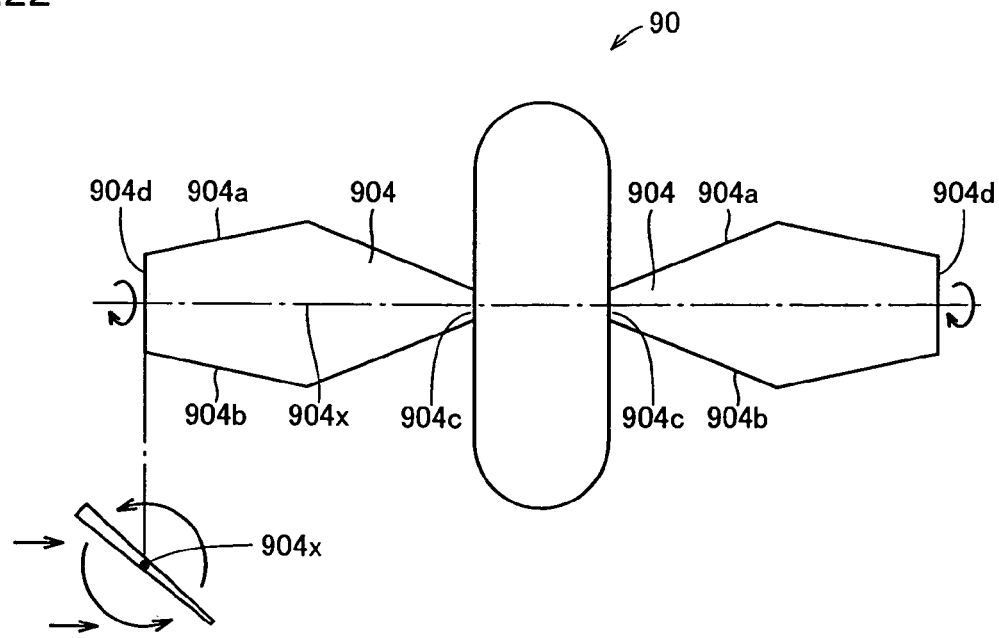

Further, it is desirable that the wing portion (904) is provided such that the axis of rotation (904x) along the direction of the wing span is positioned approximately in the middle between the leading edge (904a) and the trailing edge (904b), as shown in FIG. 22.

By this arrangement, as compared with a wing portion of which axis of rotation (904x) along the direction of wing width (w) is biased to the side of the leading edge (904a) or the trailing edge (904b), the difference in pressure generated above the wing (904) and below the wing (904) can be increased.

Figure 23:
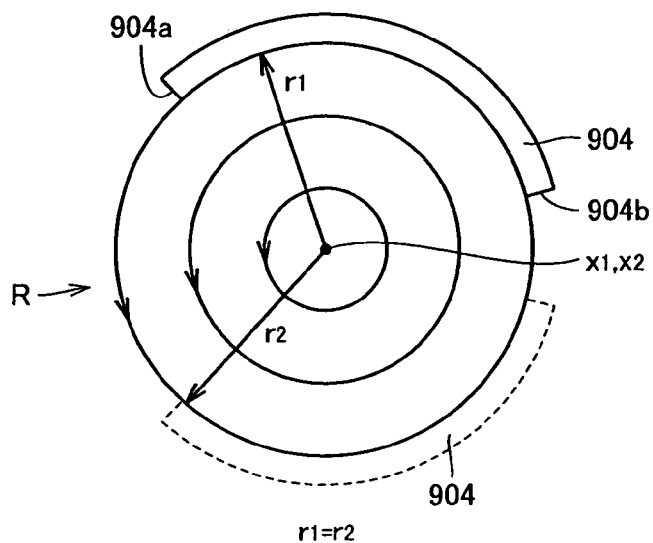

Desirably, during stroke reversals of the wing portion (905), the control unit (901) controls the driving unit (905) such that the lower surface of the wing (904) comes into contact with an upper portion of the vortex (R) generated by the flapping motion of the wing portion (904) immediately before the stroke reversal, as shown in FIG. 23.

By this arrangement, the decrease in the lift force during stroke reversal of the wing portion (904) can be compensated for, and the deformation of the wing portion (904) can be reversed before and after the stroke reversal.

Desirably, during stroke reversal of the wing portion (904), the control unit (901) controls the driving unit (905) such that elastic deformation occurs by which the direction of extension of the axis of rotation ($X_1$) of the vortex (R) generated by the stroke reversal matches the direction of extension of the axis connecting the center of radius of curvature ($X_2$) of the wing portion (904), as shown in FIG. 23.

By this arrangement, the force in the vertically downward direction generated at the time of stroke reversal of the wing portion (904) can be minimized, and hence, decrease in lift force of the rising and moving apparatus (90) can be suppressed as much as possible.

Figure 24:
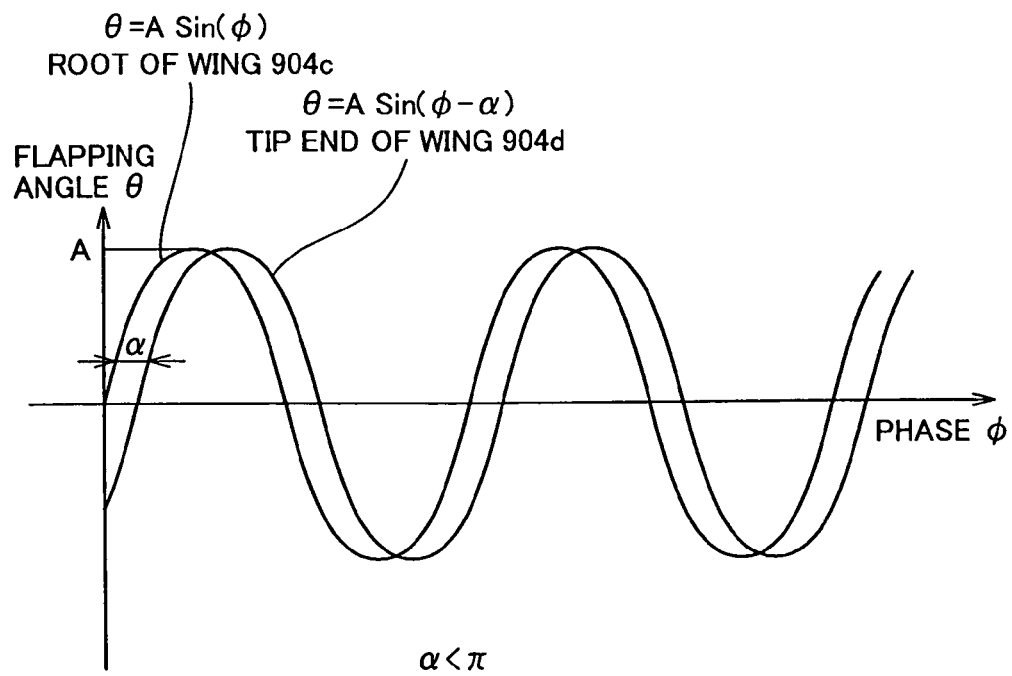
FIG. 24 is a graph representing relation between flapping angle θ and a position P on the wing (root portion of the wing and tip end portion of the wing) of the tenth example of the rising and moving apparatus in accordance with the first embodiment.

Desirably, when the wing portion (904) is driven by the driving unit (905), the root portion (905c) moves periodically, and the wing portion elastically deforms such that it has a portion having a different phase of periodic motion than the phase of the periodic motion at the root portion (905c), as shown in FIG. 24. Specifically, it is desirable that, portion by portion of the wing (904), it becomes, to a higher degree, difficult to follow the change in attitude of the fulcrum. By way of example, it is desirable that the wing portion elastically deforms (subjected to bending deformation and torsion deformation) such that the timing of motion of the wing (904) gradually delays from the root portion (904c) to the tip end (904d) of the wing portion (904). It is preferred that the wing portion (904) elastically deforms (subjected to bending deformation and torsion deformation) such that the timing of motion of the wing (904) gradually delays from the central axis of rotation (904X) shown in FIG. 22 to the side of the leading edge or the trailing edge.

By this arrangement, the timing at which the lift force peaks at various portions of the wing (904) will be differentiated, and hence, generation of abrupt acceleration at the wing portion (904) can be suppressed.

Further, desirably, the wing portion (904) elastically deforms such that the phase of the periodic motion of a portion (tip end 904d) of the wing (904) where a relatively large fluid force is exerted is delayed as compared with a portion (wing root 904c) where a relatively small fluid force is exerted (flapping angle θ: phase delay α), as shown in FIG. 24. Further, it is desirable that the wing portion (904) elastically deforms such that the phase of periodic motion of the root portion (904c) is delayed from that of the tip end portion (904d) (flapping angle θ: phase delay α), as shown in FIG. 24. The flapping angle θ is represented by the phase φ of wing 904 that is performing a periodical motion.

By this arrangement, the difference in acceleration among various portions of the wing (904) caused by the difference in force exerted by the fluid colliding against various portions of the wing (904) can be made smaller.

Further, desirably, the delay in phase mentioned above (flapping angle α) is at most ½ of one phase of the flapping motion (flapping angle π). As the direction of flapping motion of the wing (904) is generally reversed at one half the flapping period, when the delay in phase mentioned above (flapping angle α) is set at most ½ of one phase of the flapping motion, it becomes possible to maintain a state where the sign of the phase of the force exerted on the tip end portion (904a) of the wing (904) that periodically changes is the same as the sign of the phase of the force exerted on the root portion (904b) of the wing (904) that also periodically changes.

Further, desirably, the manner of control of the control unit (901) controlling the driving unit (905) and the manner of elastic deformation of the wing portion (904) are related such that a prescribed parameter related to the flapping rise and movement has the optimal value in accordance with the result of fluid-structure interactive analysis.

In this manner, a rising and moving apparatus is realized in which the prescribed parameter related to flapping flight is optimized.

Further, the prescribed parameter related to flapping flight may be the lift force generated by the flapping motion of the wing portion (904).

Accordingly, a rising and moving apparatus (90) is realized, which has the wing portion that can generate the largest lift force by the flapping motion.

The prescribed parameter related to flapping rise and movement may be a value obtained by dividing the lift force generated by the flapping motion of the wing portion (904) by a torque necessary for driving the wing portion (904) to generate the lift force.

Accordingly, a rising and moving apparatus (90) is realized in which lift force per one torque is the highest. In other words, a driving unit (905) in which the torque necessary to generate a prescribed lift force is the smallest, can be used for the rising and moving apparatus (90). Thus, a rising and moving apparatus (90) that is more advantageous for rising is provided. In the rising and moving apparatus (90) in accordance with the present embodiment, the torque refers to the magnitude of the rotational force used for driving the wing portion (904), unless specified otherwise.

Further, the prescribed parameter related to the flapping rise and movement described above may be the highest frequency of the driving unit necessary for realizing the flapping motion of the wing portion.

Accordingly, a rising and moving apparatus is realized that flies flapping, using a driving unit (905) of which upper limit of the driving frequency is the smallest. This enables lowest possible setting of the stiffness of the driving unit (905). Generally, a member having low stiffness is of light weight, and hence, this means that the driving unit (905) can be formed by using a light weight member. As a result, the mass of the driving unit (905) can be reduced, and hence, a rising and moving apparatus (90) that is more advantageous for rising is provided.

Further, the prescribed parameter related to the flapping rise and movement described above may be a value obtained by dividing the lift force generated by the flapping motion of the wing portion (904) by the energy necessary for generating the lift force.

Accordingly, the energy used for the flapping motion can be minimized. Therefore, when it is necessary to generate a prescribed lift force, for example, a rising and moving apparatus (90) with an energy source smaller in size can be manufactured.

In the rising and moving apparatus (90) in accordance with the present embodiment, the energy used for the flapping motion refers to the energy consumed by the driving unit (905) driving the wing portion (904), unless specified otherwise. Typical example of the energy includes electric power consumed by the driving unit (905).

Desirably, the wing portion (904) satisfies the following relation, where f denotes flapping frequency, L denotes representative length, r denotes a distance from a portion having the highest stiffness, w denotes a load on a portion at a distance r from the portion having the highest stiffness, and d denotes a displacement generated at the portion that bears the load w exerted by the load w:

$$0.36 \times 10^{-8} < r^3 \times w/d/(L \times f)^2 < 4.48 \times 10^{-8}.$$

Accordingly, a rising and moving apparatus (90) is realized, which has the wing portion that can flap without decreasing each of the absolute value of the lift force, efficiency of the lift force with respect to the torque and the efficiency of the lift force with respect to the driving force of the wing portion, to be smaller than ½ of the optimal values.

Next, fluid-structure interactive analysis used for designing rising and moving apparatus (90) in accordance with the present embodiment and a general procedure of the method of manufacturing the rising and moving apparatus will be specifically described. In the following, the fluid velocity refers to the fluid velocity with respect to a coordinate system fixed in a space, that is, the absolute velocity, unless specified otherwise.

Referring to Tables 1 to 6 and FIGS. 25 to 44, the method of preparing fluid-structure interactive numerical model in accordance with the first embodiment and the method of manufacturing the rising and moving apparatus using the model will be described.

The method of preparing the fluid-structure interactive numerical model in accordance with the present embodiment is for preparing the numerical model related to the air as the fluid and the numerical model related to the wing as the structure. The numerical models are obtained by analyzing the structure of the wing of an insect and the manner of flapping flight of the insect (how it flaps).

According to the method of manufacturing the rising and moving apparatus in accordance with the present embodiment, using the numerical models prepared by the method of preparing fluid-structure interactive numerical model described above, a rising and moving apparatus that imitates the structure of the wing of an insect and the manner of flapping flight of the insect is manufactured.

Specifically, the numerical model related to the fluid includes a numerical model of the fluid velocity and a numerical model of fluid pressure. The numerical model related to the structure mainly includes a numerical model of the manner of motion of the structure and a numerical model of force acting on the structure. The numerical model of the manner of motion is a numerical model of movement, deformation and the like of the structure that is in contact with the fluid. The numerical model of force is a numerical model of external force, nodal reaction, internal stress and the like.

Next, a technique for preparing a numerical model related to an actual flight of a dragonfly using the method of preparing the fluid-structure interactive numerical model in accordance with the present embodiment will be described. More specifically, a technique will be described in which a numerical model related to a structure of the wing of a flying dragonfly and a numerical model related to the air around the wing are prepared.

In this technique, as a numerical model related to the fluid, a numerical model of the fluid velocity and pressure of the air around the wing of a flapping dragonfly is used. Further, in this technique, as a numerical model related to the structure, numerical models of force such as the pressure of surrounding air on the wing structure of the dragonfly, external force (driving force) driving the wing of the dragonfly, vertical stress (pressure or tension) on the wing structure of the dragonfly and shear force, translational movement or rotational movement of the wing of the dragonfly, and deformation of the wing of the dragonfly are used.

In this technique, data related to the wing structure measured in a flapping flight of the actual dragonfly in the air and the data related to flapping flight are used for the fluid-structure interactive analysis. Thus, the numerical model related to the structure and the numerical model related to the fluid described above are obtained.

In the method of preparing the fluid-structure interactive numerical model in accordance with the present embodiment, numerical models are formed only for the mechanical elements. It is noted, however, that using a method similar to that described above, numerical models including a muscle driving model, a model of neural system driving the muscle, model of information processing in a brain and model of sensing of sensing organs that will be the base for information processing may be prepared.

(Outline of the Procedure for Preparing Fluid-Structure Interactive Numerical Model)

Figure 25:
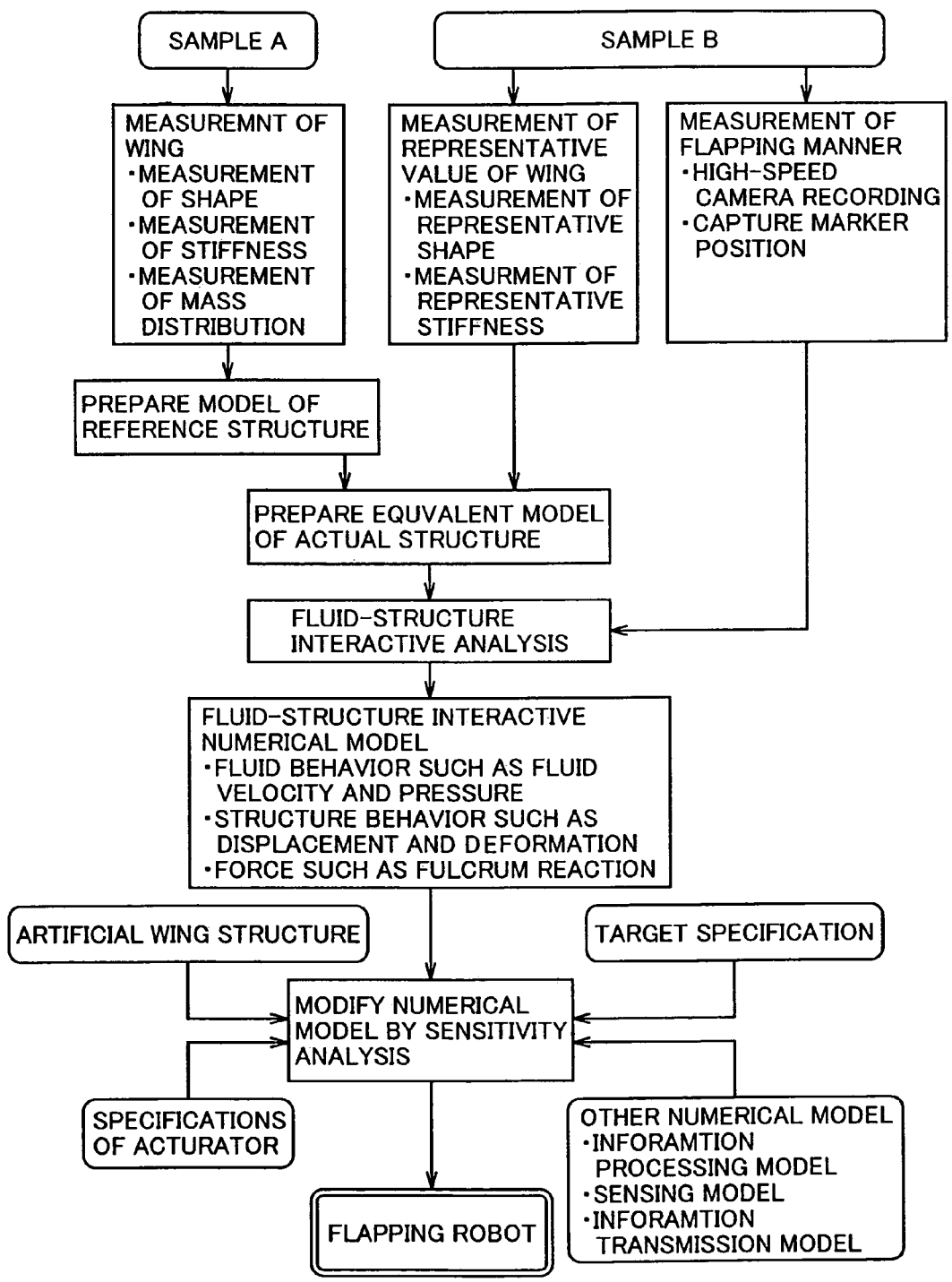
FIG. 25 represents a process for manufacturing a rising and moving apparatus in which the fluid-structure interactive numerical model calculated by the method of preparing the fluid-structure interactive numerical model in accordance with the first embodiment is modified by sensitivity analysis.

First, the outline of the procedure for preparing fluid-structure interactive numerical model will be described with reference to FIG. 25.

The procedure of preparing the fluid-structure interactive numerical model (hereinafter also simply referred to as "numerical model") in accordance with the present embodiment can be divided into the following seven processes:

1. measurement of reference structure;
2. modeling of the reference structure;
3. measurement of actual structure;
4. preparation of equivalent numerical model of actual structure by interpolation of the reference structure;
5. measurement of time-sequential data of representative positions of flapping;
6. modeling of the body (structural portion other than the wings); and
7. fluid-structure interactive analysis.

First, processes 1 to 4 are executed and a numerical model equivalent to the actual structure of the wing (hereinafter referred to as "equivalent numerical model of actual structure") that represents shape and stiffness of the wing in numerical values is prepared.

Thereafter, process 5 is executed, and the driving force model of the wing (hereinafter referred to as "numerical model of flapping motion") is prepared, which represents a manner of flapping flight of the wing by numerical values.

Here, it is assumed for simplicity of description that the body model of process 6 is only the shape and mass distribution represented as numerical values. Specifically, the body model is used only for the function of providing boundary condition for the fluid and the function of providing inertia for translational and rotational motions at the fulcrum of the wing.

Actually, however, position, attitude and shape of the numerical model of the body may change. Even when analysis is performed considering these changes, the numerical models can be prepared by applying the similar method as preparing the fluid-structure interactive numerical model of the wing, for the change in position, attitude and the shape.

More specific procedure for preparing the numerical model is as follows.

First, a wing of a dragonfly (hereinafter referred to as "Sample A") is separated from a living body, for example, as needed. Then, physical values related to the wing structure are precisely measured. Using the measured physical values, a numerical model of a reference structure is prepared. Further, physical values of the manner of flapping flight of another sample (hereinafter referred to as "Sample B") are measured, and using the measured physical values, a numerical model of flapping motion is prepared.

Next, for Sample B, physical values related to the structures of representative portions of the wing that can be measured without damaging Sample B are measured. Using the data of the physical values of representative portions, the numerical model related to the structure of Sample A, that is, the numerical model of reference structure is converted in some way, whereby a numerical model that can be regarded as equivalent to the numerical model of the wing structure of Sample B, that is, the equivalent numerical model of actual structure, is prepared.

The behavior of the fluid and the behavior of the structure when the equivalent numerical model of actual structure of Sample B is driven in the flapping manner directly measured from Sample B are calculated by fluid-structure interactive analysis. Thus, the fluid-structure interactive numerical model including the influence from the ambient fluid is prepared for the flapping motion of Sample B.

The procedure for manufacturing a rising and moving apparatus on the fluid-structure interactive numerical model obtained through the above described method is as follows.

Each procedure will be described in detail with reference to FIGS. 25 to 38.

(Measurement of Physical Values Related to the Structure of the Numerical Model of Reference Structure)

First, physical values related to the structure of Sample A are measured for preparing the numerical model of reference structure. Generally, equation of motion of a structure is given as an expression of external force and acceleration, using a spring and damper characteristics, that is, elasticity with respect to displacement and damping ratio with respect to velocity.

Generally, damping of internal stress in a structure occurs when kinetic energy is converted to thermal energy in the structure. This corresponds to occurrence of structural change or destruction.

Let us consider a case in which a dragonfly of which flapping frequency is 30 Hz continuously flies for more than a week and broken only by outer damage. Here, the structural change in the wing (plastic deformation) in the flapping motion of several periods can be considered extremely small. Therefore, in the present embodiment, it is assumed that damping of internal stress in the structure is zero. In other words, it is assumed that the wing is subjected to elastic deformation only and not plastic deformation. Therefore, in the equation of motion, the damping ratio with respect to velocity is zero.

Thus, the equation of motion in the structure is given by the elasticity with respect to displacement (stiffness of the wing), mass of the wing and external force exerted on the wing.

Namely, there are three parameters necessary for preparing the structural model of the wing, that is, shape, stiffness and mass of the wing. The method of measuring these parameters will be described with reference to FIGS. 26 to 31.

(Measurement of the Shape of Numerical Model of Reference Structure)

First, measurement of the shape of the wing will be described with reference to FIGS. 26 and 27.

Figure 26:
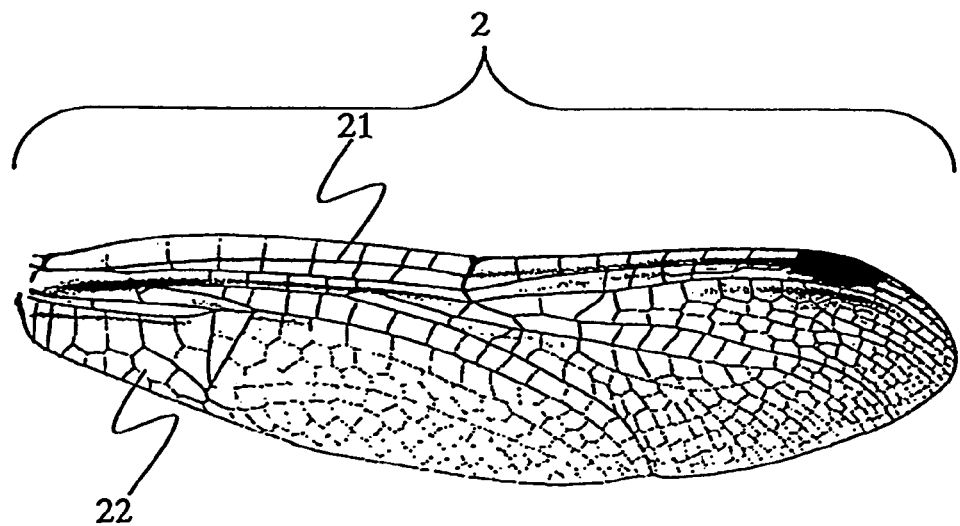
FIG. 26 represents beam and film structures of a wing of an actual insect in accordance with the first embodiment.

As shown in FIG. 26, biological wing 20 of a dragonfly used in the present embodiment has such a structure in that a film structure 22 is spun over a branching beam structure 21. For stiffness modeling, which will be described later, it is necessary to grasp positional relation between the beam structure 21 and the film structure 22.

For this purpose, the inventors used the following method for measuring the shape.

First, in order to grasp three-dimensional wing shape, a general, commercially available X-Y stage 33 and a laser distance meter 32 arranged to be able to measure distance in a direction approximately vertical to the main surface of X-Y stage 33 are used.

Figure 27:
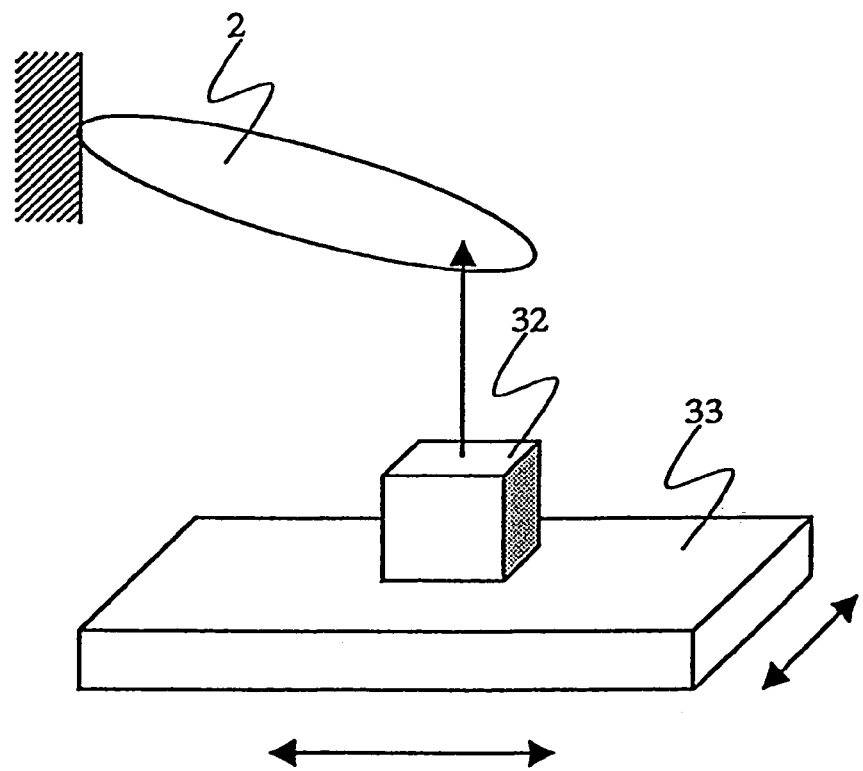
FIG. 27 represents a method of measuring shape of the wing in accordance with the first embodiment.

As shown in FIG. 27, the distance to biological wing 20 is measured by laser distance meter 32, with the laser distance meter 32 fixed at a certain position on the main surface of X-Y stage 33. Thereafter, in order to grasp the entire shape of biological wing 20, parameters x (i), y (i) by which the position of laser distance meter 32 on the main surface of X-Y stage 33 can be specified and the measured value z (i) of laser distance meter 32 are considered. In this consideration, the shape represented as a set of parameters (x (i), y (i), z (i)) is regarded as the measured shape of biological wing 20.

Alternatively, as shown in FIG. 26, an image of biological wing 20 in a plane approximately parallel to the main surface of X-Y stage 33 is obtained by an image pick-up means such as an image scanner or a digital camera. Thus, it is possible to identify the position along the X and Y directions of beam structure 21. When biological wing 20 is arranged at a position approximately parallel to the main surface of X-Y stage 33, it follows that beam structure 21 of biological wing 20 does not exist overlapping in the Z direction. Therefore, beam structure 21 exists only at the position of measured value z (i), that is, a position at the distance in the Z direction measured by laser distance meter 32 corresponding to parameters x (i), y (i).

Accordingly, the arrangement of all the beam structures 21 is determined where x, y, z are considered as the coordinate axes. As to the method of grasping the shape of biological wing 20, any other method may be used provided that the shape of biological wing 20 including three-dimensional arrangement of beam structure 21 can be grasped.

For example, in most of commercially available laser distance meters 32, accuracy in measurement lowers when returning laser beam is insufficient. In order to detect a state where the laser beam does not return sufficiently, most of the commercially available laser distance meters 32 have a monitor function for monitoring the returning light intensity of the laser. By the monitoring function, it is possible to calculate reflectance at the time of measurement by the laser distance meter 32. The film structure 22 of the wing of a dragonfly is almost transparent. Therefore, as a method of grasping the three-dimensional shape of biological wing 20 including the arrangement of beam structure 21, it may be possible to use the method of detecting beam structure 21 of biological wing 20 by mapping magnitude of scattered light with respect to the position of biological wing 20.

(Measurement of Stiffness of the Numerical Model of Reference Structure)

Basically, a general technique can directly be applied to the measurement of stiffness of the wing. More specifically, the following technique is used.

As already described, biological wing 20 is of a combined structure including beam structure 21 and film structure 22. Therefore, for each representative portion of biological wing 20, beam structure 21 and film structure 22 are separated from each other. For each of the separated beam structure 21 and film structure 22, tensile strength test, bending strength test or the like is performed, to determine stiffness. Further, a hole of a prescribed shape is opened at a portion of film structure 22. By the deformation of the hole shape, tension exerted on film 22 is reverse-calculated.

The technique, however, is disadvantageous as it is complex. Further, in this technique, flexural rigidity is determined as a result of interaction between the beam structure and the film structure. Therefore, errors in the numerical models of the two structures may be synergistically involved.

Now, as to the structure of a wing of an insect, deformation of the wing can be considered separately in bending deformation and tensile deformation. As the wing of an insect is very thin, it is understood that deformation caused by bending is dominant in the wing deformation. In other words, the wing of an insect has small distortion and large deformation.

Therefore, in the present embodiment, biological wing 20 is approximated as an assembly of shell structures. Specifically, a combined element of one film structure 22 and beam structure 21 is considered as one shell structure. By this technique, the entire biological wing 20 is regarded as a combined body of shell structures, and the stiffness of the biological wing 20 can be measured with the beam structure 21 and the film structure 22 being in the combined state.

Thus, in order to determine flexural rigidity of biological wing 20 that is a dominant factor determining the behavior of wing model 2 and the fluid, the flexural rigidity of a wing of an insect is directly measured. By using the flexural rigidity of the wing of the insect, it becomes substantially possible to form a numerical model of reference structure of the wing having flexural rigidity that is close to the flexural rigidity of the actual wing of the insect. Further, as compared with a combined element of beam structure and film structure, the amount of calculation for preparing the numerical model of reference structure can be reduced, as the beam structure is eliminated from the shell structure. Namely, by performing analysis with the biological wing 20 considered as a set of shell structures, working efficiency can be improved.

It is necessary to determine the value of flexural rigidity of each portion of biological wing 20 individually, and therefore, flexural rigidity must be measured for each portion of biological wing 20 as separated. Therefore, in view of preparation of the equivalent numerical model of actual structure, which will be described later, it is desirable that measurement of flexural rigidity of each portion of wing 2 is performed with the biological wing 20 dried uniformly.

(Measurement of Mass Distribution of Numerical Model of Reference Structure)

As already described with respect to stiffness measurement, biological wing 20 is divided into beam structure 21 and film structure 22, and therefore, as a method of measuring mass of the wing, it is possible to measure mass of each of the beam structure 21 and film structure 22 of representative portions of the biological wing 20 as divided. When wing 2 is treated as a shell structure, however, what is necessary is simply to measure the mass of the combined structure including beam structure 21 and film structure 22, at each portion of biological wing 20.

Actually, when biological wing 20 is separated from the living organism, the wing begins to dry and its mass decreases.. Therefore, first, at the time point when the biological wing 20 is separated from the living organism, mass of the entire biological wing 20 in the normal state is measured. After the biological wing 20 is sufficiently dried, the mass of the entire biological wing 20 in the dried state is measured. Thereafter, the dried biological wing 20 is divided into portions for measurement, and the mass of each of the divided portions is measured. The mass of each portion of the biological wing 20 divided in the dried state is divided by the ratio of the mass of the entire biological wing 20 in the dried state with respect to the mass of the entire biological wing 20 in the normal state, to obtain the mass of each divided portion of biological wing 2 in the normal state.

The mass of each divided portion of biological wing 20 in the normal state is divided by the size of the piece of which mass has been measured, and the resulting value of division is used as mass distribution of wing model 2. By dividing the mass of the piece by the area of the piece, the mass per unit area can be calculated, for a shell structure, for example.

Through the above described manner, the shape of wing model 2 and stiffness and mass of representative portions of wing model 2 are measured.

(Modeling of Reference Structure)

Modeling of the structure of biological wing 20 of Sample A that serves as the reference structure will be described with reference to FIGS. 26 to 28.

Generally, in a method frequently used for analyzing a structure, the biological wing 20 is divided into an assembly of unit structures, and various physical values are applied to the divided unit structure. The unit structure is generally referred to as a mesh.

In the present embodiment, the unit structure of the wing is regarded as a shell structure. More specifically, a numerical model of wing 20 is represented as an assembly of shell structures having physical values including the shape, mass distribution and stiffness as described above.

(Shape Modeling)

First, position of a node (intersection point of lines representing a mesh) constituting each mesh is applied to each node. Dependent on the technique of analysis, attitude (a plurality of point positional data) of each node is applied to the mesh.

Here, mesh division is desirably performed taking the beam structure 21 as a reference. It is particularly noted that the beam structure 21 has a recessed/protruded structure referred to as corrugations that run as ridges over the biological wing 20, and physical values of biological wing 20 changes significantly with the corrugations being the boundary. Therefore, it is desirable that one mesh does not traverse the beam structure 21 (this is the reason why grasping of the arrangement of beam structure 21 is of importance). Except for these points, the method of preparing mesh does not need any modification from the conventionally used methods.

(Stiffness Modeling)

Thereafter, stiffness is applied to each mesh.

The stiffness of wing model 2, that is, basic parameters that determine amount of deformation of wing model 2 against an external force acting on wing model 2 are Young's modulus, Poisson's ratio and mesh thickness.

As already described, wing model 2 in the present embodiment has small distortion and large deformation. Therefore, deformation of the shell structures is for the most part determined by the product of Young's modulus and the second moment of inertia. Poisson's ratio has almost no influence on deformation, and therefore a general value of 0.3 is used. In view of preparing equivalent numerical model of actual structure, which will be described later, an average of a plurality of values resulting from measurements at all portions of biological wing 20 may be used as the Young's modulus of wing model 2 as a whole. Namely, a rough value may be used as the Young's modulus of biological wing 20 as a whole. Thereafter, using the flexural rigidity measured at each portion of biological wing 20, the thickness of the mesh is reversed-calculated from the result of numerical calculation or theoretical solution.

For example, let us consider a beam having the length l, height h and width b. When the beam has one end fixed and a load of w is applied in the height direction on the other end, displacement x of the beam in the height direction is given as $x=w \times l^3/(E \times b \times h^3/12)$ where x is small as compared with l. The width b of the shell is found by measurement of the shell structure. Therefore, when Young's modulus E is known, the beam height h can be calculated. Here, it is assumed that $E=1.0 \times 10^9$.

Accordingly, thickness of the mesh at each representative portion is determined. A value obtained by interpolation of the mesh thickness at each representative portion is applied to each mesh. Here, the thickness at each representative portion is the thickness for representing flexural rigidity of the combined structure of beam structure 21 and film structure 22, and therefore, it is different from the thickness of beam structure 21 itself or the thickness of film structure 22 itself. As an example, the thickness distribution of quad element shell model using MITC (Mixed Interpolation of Tensorial Components) is shown in FIGS. 5 and 28.

(Mass Modeling)

The mass can simply be calculated by interpolating mass per unit area calculated from the result of mass measurement at each representative portion. To the mesh, a value obtained by multiplying the mass per unit area at the mesh position by the mesh area is applied.

In the manner as described above, a numerical model related to the structure representing shape, stiffness and mass distribution of biological wing 20 is prepared. In the following, this numerical model will be referred to as the numerical model of reference structure.

(Preparation of Equivalent Numeral Model of Actual Structure)

Figure 29:
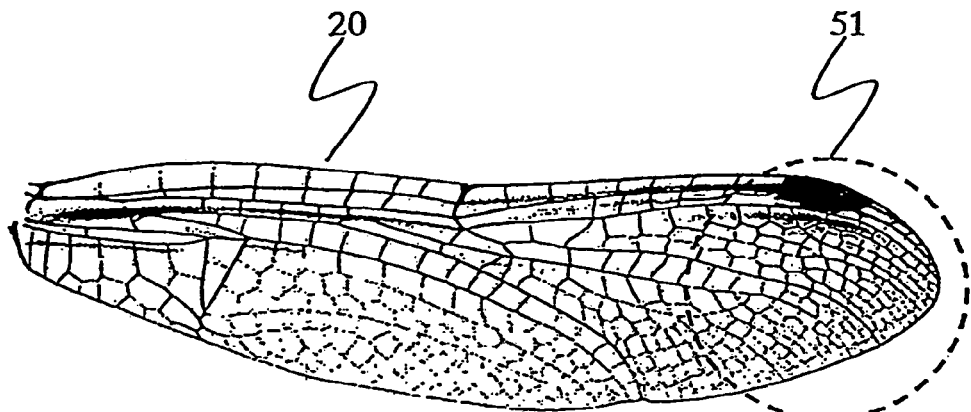
FIG. 29 represents an approximately flat region of a wing, related to the first embodiment.
Figure 30:
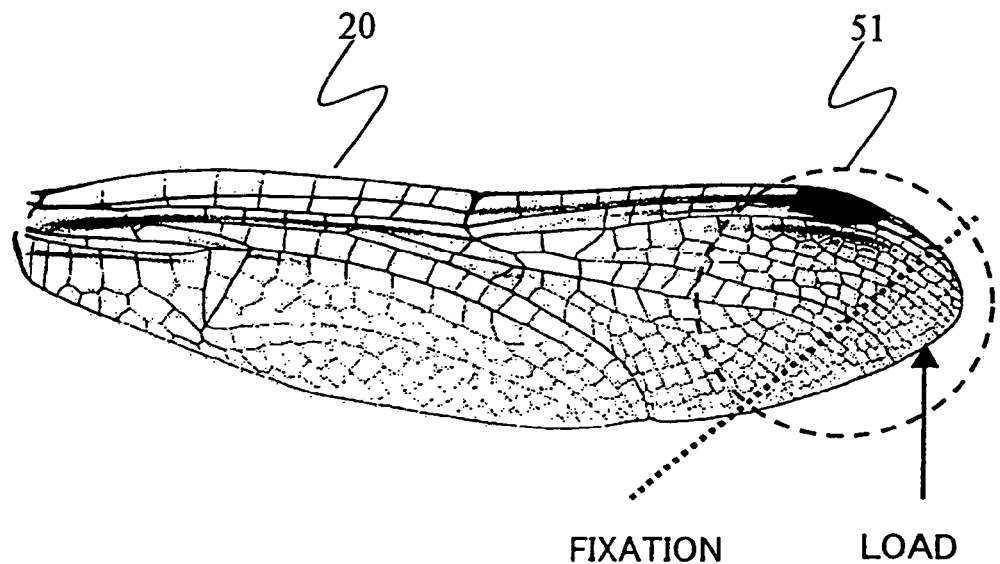
FIG. 30 represents a technique of measuring stiffness at a representative point of a wing in accordance with the first embodiment.
Figure 31:
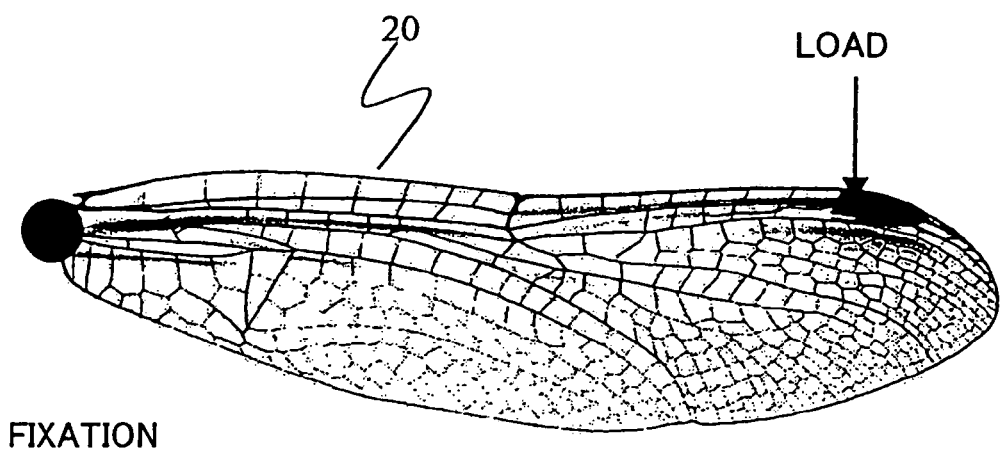
FIG. 31 represents another technique of measuring stiffness at a representative point of a wing in accordance with the first embodiment.

Referring to FIGS. 29 to 31, a technique of measuring the shape of a representative portion and stiffness of the representative portion of Sample B without damaging Sample B as a living organism will be described.

(Measurement of Representative Shape)

When representative shape is to be measured, first, representative structure of biological wing 20 is measured, based on the picked-up image of biological wing 20. By way of example, distance from a reference point to a point of measurement is measured using an outline of biological wing 20 and a characteristic branching point of beam structure 21 as the reference point.

Based thereon, the ratio α of the shape of biological wing 20 (wing of Sample B) with respect to the numerical model of reference structure (wing of Sample A) is calculated. Specifically, the ratio of distance from a common reference point to the measurement point of biological wing 20 (wing of Sample B) with respect to the numerical model of reference structure (wing of Sample A) is calculated.

For example, distance from a representative point on the wing of Sample B to a prescribed one point on the outline is measured, whereby the outline shape of the wing of Sample B is grasped. Consequently, it becomes possible to make the numerical model of reference structure (wing of Sample A) closer to the numerical model of Sample B. By way of example, when the length of the outline in the longitudinal direction of the numerical model of reference structure (wing of Sample A) is $l_1$ and the outline length along the longitudinal direction of biological wing 20 of Sample B is $l_2$, the shape ratio α is $α=l_2/l_1$. Using this shape ratio α, the numerical model of reference structure is transformed such that the numerical model of reference structure (wing of Sample A) approximates to the numerical model of Sample B.

(Measurement of Representative Stiffness)

Here, the technique of measuring stiffness of a representative portion of biological wing 20 without damaging Sample B as a living organism will be described.

Generally, stiffness is measured by fixing one end of a prescribed object, applying a certain load on another portion of the object, and measuring the resulting amount of displacement. Therefore, it is desired that one end of the object is fixed firm enough not to cause any variation by the magnitude of the load applied to another portion of the prescribed object. When a living organism is to be measured without physically damaging the same, it is necessary that the load causes minimum possible damage to the biological wing 20.

Here, the following techniques may be possible to accurately measure the representative stiffness without damaging the biological wing 20 of the living organism.

One is the method that uses fixing means confirming to the protruded/recessed shape of biological wing 20. According to this method, however, it may be necessary to prepare fixing means that matches difference in shape of individual wing of insects, dependent on difference in shape of the wings of insects. Therefore, it is troublesome to prepare the fixing means.

Therefore, it is desirable to apply the method that uses fixing means confirming to the protruded/recessed shape of biological wing 20 only for measurement of such a portion at which difference in shape caused by fixation is small. For example, the region 51 of the trailing edge side at the tip end of biological wing 20 shown in FIG. 29 is almost a flat plane. Therefore, this region 51 is fixed on a line as shown in FIG. 30, a load is applied to portions other than region 51, and the displacement is measured.

Alternatively, a method of fixing a strong portion of beam structure 21 of biological wing 20, the root portion of beam structure 21 of biological wing 20 in particular, is also effective. For example, the root of biological wing 20 is fixed as shown in FIG. 31, and the relation between load and displacement is measured at the tip end portion of biological wing 20.

(Preparation of Equivalent Numerical Model of Actual Structure by Transforming Numerical Model of Reference Structure)

Here, a technique will be described in which the equivalent numerical model of actual structure is prepared by transforming the numerical model of reference structure using representative measured values obtained by measuring the biological wing 20 of a living organism, that is, of Sample B.

First, using the shape ratio α calculated by the measurement of representative shapes, the numerical model of reference structure is enlarged/reduced. The enlarged/reduced model will be referred to as an intermediate model.

Specifically, the coordinates of the mesh node and the thickness of the mesh are defined as P and T, respectively. The node coordinate after converting the value P with the shape ratio α described above is defined as P'. The mesh thickness after converting the value T with the shape ratio α described above is defined as T'. Here, there is the relation $P'=P×α$ and $T'=T×α$. In the intermediate model, the numerical model of the shape and the numerical model of the mass approximately reflect the shape and mass of Sample B.

Thereafter, the same dynamical condition as the condition used for measuring the representative stiffness of Sample B, that is, fixing condition and load condition are applied, as numerical model, to the intermediate model. The amount of deformation of the structure of the intermediate model is calculated by analysis of the intermediate model. When displacement of the intermediate model under the load equivalent to the load applied for measuring representative stiffness of Sample B described above is represented as β, Young's modulus E for each mesh is changed to E' which is calculated as $E'=E×β$.

More specifically, when a value of displacement under a certain dynamical condition in the intermediate model is 0.5 times the value of displacement under the same condition measured from the living organism, Young's modulus of the intermediate model is multiplied by 0.5. Thus, Young's modulus of the intermediate model is converted to have the relation between load and displacement comparable to that of the living organism.

Accordingly, the intermediate model with Young's modulus converted comes to have the shape, mass and stiffness almost the same as those of wing 20 of Sample B. The intermediate model with converted Young's modulus will be hereinafter referred to as equivalent numerical model of actual structure. Through the above described process, the equivalent numerical model of actual structure is prepared.

(Measurement of Position of Representative Point of Flapping)

Next, a method of preparing a model of the manner of flapping, that is, the position and attitude for biological wing 20 (numerical model of position data) based on position measurement of representative point of the wing of Sample B will be described. The position and attitude of biological wing 20 are represented by the manner of driving of the actuator itself, that is, position and attitude of the fulcrum of the biological wing 20. The fulcrum of the biological wing 20, however, is within the body of Sample B, and measurement of the fulcrum is substantially impossible. Measurement from video images picked-up by a high speed camera, for example, enables measurement of position of a portion, whereas it does not enable measurement of attitude of a portion.

Accordingly, positions and attitudes of portions that are substantially equivalent to the position and attitude as the fulcrum of the biological wing 20 are measured. Specifically, positions of three points that can be picked-up by a high speed camera are measured. The attitude of a plane formed by the three points is considered to be the attitudes of these three points respectively. Thus, the attitude of biological wing 20 is determined through approximation. The reason for this is that a region in which the amount of deformation is small, including the fulcrum of biological wing 20, can be considered as having the same attitude as the fulcrum of biological wing 20. From the foregoing, it follows that the attitude of biological wing 20 can be represented by position data of the three points included in the region near the fulcrum of biological wing 20.

More specifically, a technique may be considered in which three point markers are provided at positions with smallest possible deformation on biological wing 20, and biological wing 20 is caused to flap. At this time, the images of biological wing 20, that is, images of flapping operation of Sample B are picked-up by a high speed camera. From the picked-up images of biological wing 20, the positions of point markers are measured. Considering accuracy in determining the attitude, it is desired that one of the angles formed by three point markers is close to 90°. More preferably, the three point markers should form a right isosceles triangle.

As the technique of measuring positions of the prescribed points on biological wing 20, a conventional technique of measuring a position of a prescribed point of a wing is used. In the technique, positions of the three point markers are picked-up by high speed cameras from two directions, and positions of the three point markers are displayed on the image. Thus, the manner of time-sequential movement of the positions of three points on the biological wing 20 can be observed. It is noted, however, that the images picked-up by the high speed cameras are quantized. Therefore, the measured value involves quantization error.

Therefore, smoothing of time-sequential data of the positions of three points is performed to alleviate position deviation of the prescribed points resulting from quantization error. The force exerted by the fluid is a function of velocity. Therefore, it is desirable to perform smoothing on time history of velocity, which is the time history of the positions of point markers mentioned above differentiated by time. The aforementioned time-history of velocity must be continuous (continuous function) to enable smoothing. When smoothing is performed on time-differentiated value of the time-history of positions in the rectangular coordinates directly, it is possible that the distance between point markers may vary. Therefore, it is more desirable that the smoothing is performed on the translational velocity and angular acceleration of the plane formed by the three points, respectively, that is, the position and attitude of the plane formed by the three points separated. The technique of measuring point positions is not limited to the technique described above, and any technique that can determine positions of certain three points of biological wing 20, that is, any technique that can determine the attitude of a prescribed region of the wing, may be used. A function that can be differentiated is suitable as a function for smoothing, as the differentiated result thereof is continuous. By way of example, when a function that can be differentiated is used, it is possible to perform low-pass filtering with Fourier series development on the position and angle of the plane formed by the three points described above.

In the following, the equivalent model of actual structure used for the fluid-structure interactive analysis of the present embodiment will be specifically discussed with reference to FIGS. 39 to 46.

Figure 8:
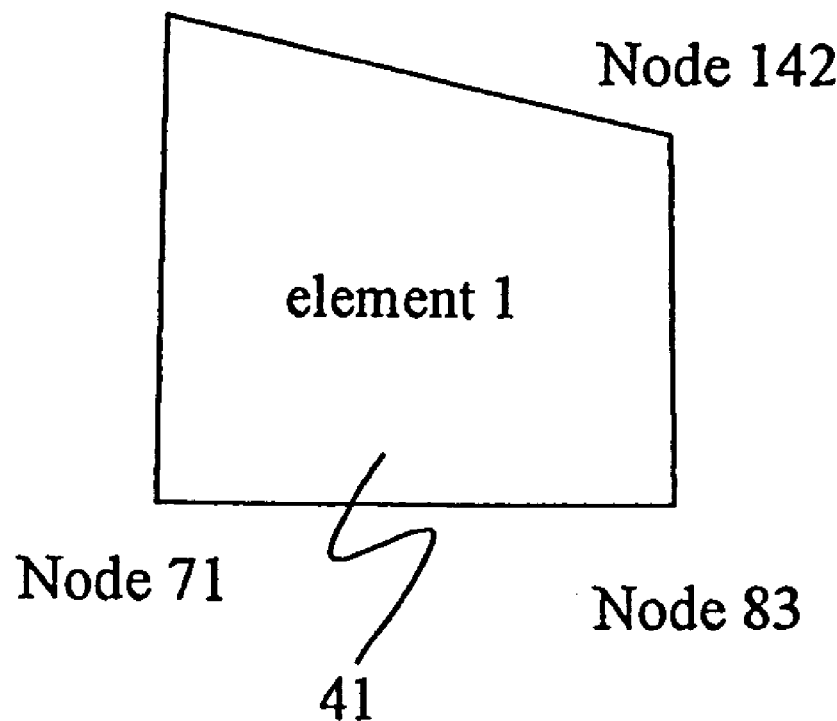
FIG. 8 is an illustration related to connectivity of the elements of the wing in accordance with the first embodiment.

In the method of preparing equivalent model of actual structure in accordance with the present embodiment, positions of these three points are given for the element at the root of the wing. FIG. 8 represents an element at the root of the wing shown in FIG. 28, that is, the element at the lower left corner extracted, with node numbers and the element number used for the analysis in accordance with the present embodiment added. Here, hovering state is assumed as the manner of flapping flight. Further, node 71 is assumed to be fixed at the origin, that is, (0, 0, 0). The numerical model of the attitude of the wing model 2 is represented by the time-history of the positions, that is, x, y z coordinates, of the remaining two points, that is, nodes 83 and 337.

Figure 33:
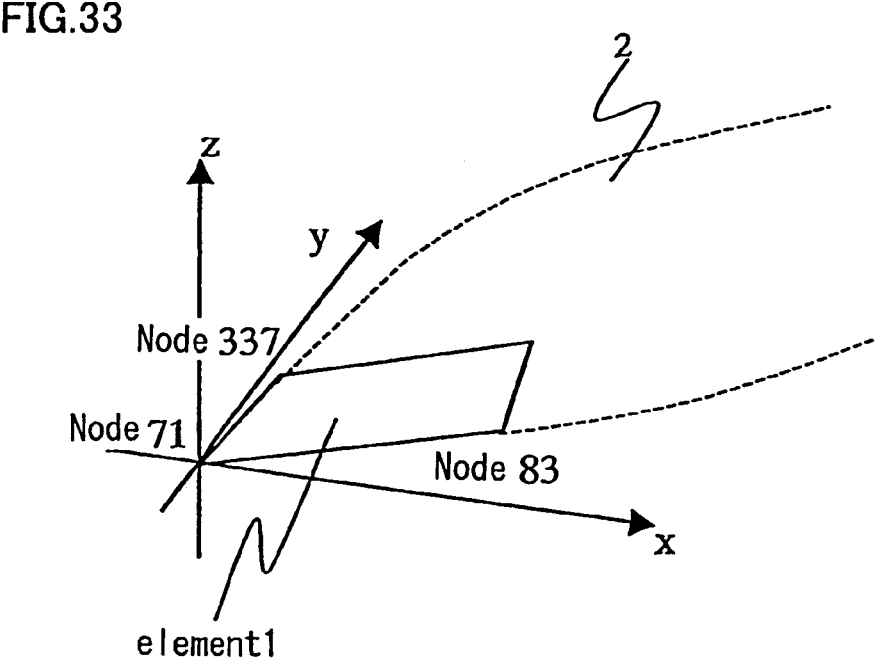
FIGS. 33 to 36 are illustrations representing specific examples of the equivalent numerical model of actual structure in accordance with the first embodiment, respectively.
Figure 34:
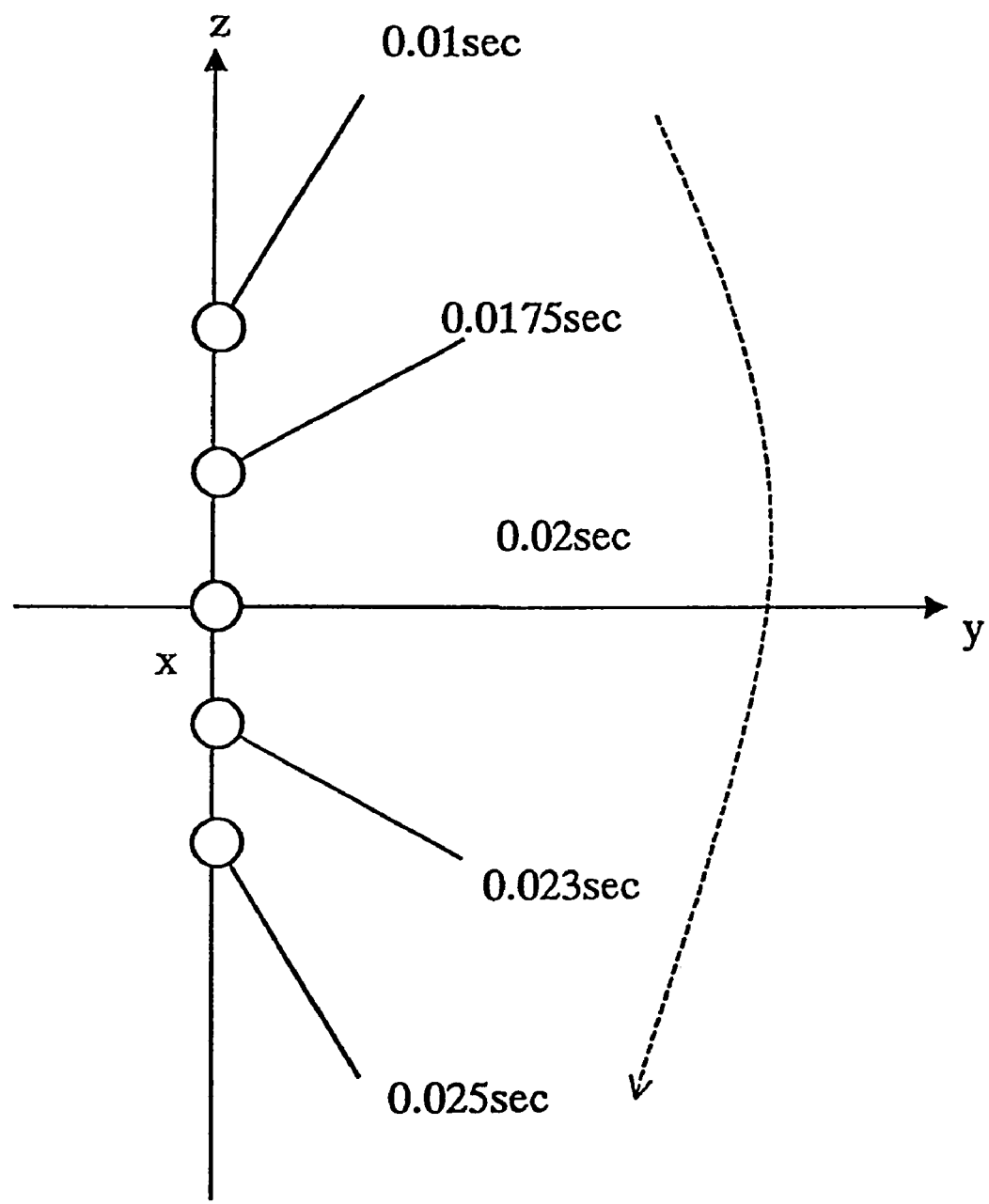
Figure 35:
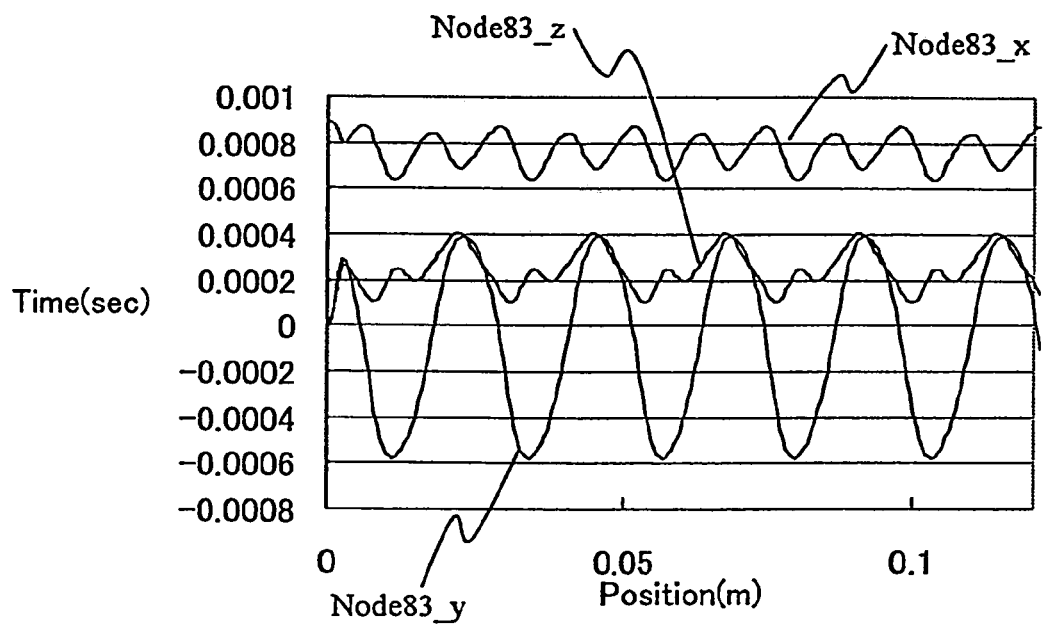
Figure 36:
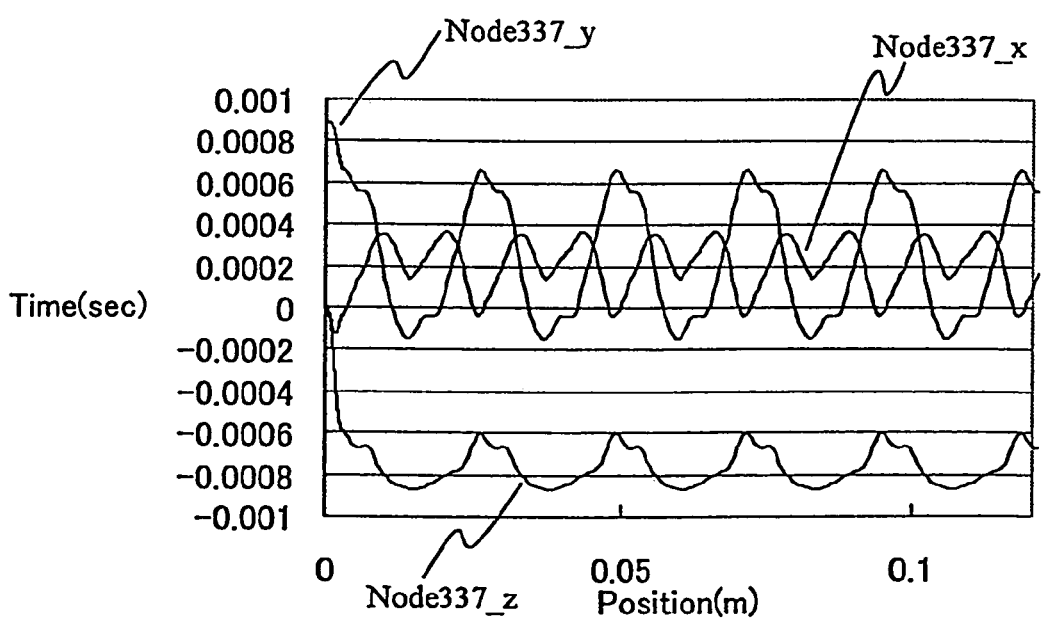

FIG. 34 represents the relation between behavior of wing model 2 and the change in position along with time in a down stroke of wing model 2 shown in FIG. 33. FIG. 35 represents time-history of x, y and z coordinate values of node 83. FIG. 36 represents time-history of x, y and z coordinate values of node 337.

(Fluid-Structure Interactive Analysis)

Here, the method of preparing a numerical model by fluid-structure interactive analysis will be described.

The method of analysis used by the inventors is the strong coupling method of fluid and structure, in accordance with fluid-structure interactive analysis proposed by Qun Zhang and Toshiaki Kubota, "Analysis of fluid-structure interaction problems with structural buckling and large domain changes by ALE finite element method" and in accordance with ALE finite element analysis method proposed by Qun Zhang, (Tokyo University Thesis, 1999, "ALE (Arbitrary Lagrangian-Eulerian Method) Finite Element Analysis of Structure-Fluid Interactive Problem Involving Structural Buckling and Area Deformation"). The method of application thereof will be discussed in the following. Here, ALE refers to a method in which Eulerian notation (fluid) and Lagrangian notation (structure) are handled uniformly, using a reference coordinate system. Further, the finite element method refers to a method of solving an equation provided by dividing the region to be analyzed into a finite number of elements and integrated by approximation within the elements. Different from the difference method, this method enables handling of free shapes. Further, it has been mathematically proved that the solution obtained by the method provides the best approximation of differential equation.

First, it is necessary to set a virtual space for preparing the numerical model. According to the calculations made by the inventors, when the wing has a length of 4 cm and flapping frequency of 30 Hz, the air flow is almost a steady flow at a distance of about 20 cm and further. Therefore, a spherical space having the radius of 20 cm including the structure for preparing the numerical model is considered to be the object of fluid-structure interactive analysis. Thus, the amount of calculation can be reduced.

For simplicity of description here, it is assumed that a fluid-structure interactive numerical model is prepared for an example in which a dragonfly is positioned approximately at the center of a cubic case each side of which is 20 cm in length, and the dragonfly is hovering.

In the ALE finite element method, the following four parameters A to D must be set both for the fluid and the structure. In the following, it is assumed that A represents coordinates of each node, B represents connectivity of each node, C represents boundary condition of each node and D represents physical values of each element.

(Structure Element)

The parameters A, B and D are determined at the time point when the equivalent numerical model of actual structure is prepared.

The parameter C is forced displacement of the node of the mesh of the equivalent numerical model of actual structure, that is, the numerical model of flapping motion. Therefore, as the parameter C, position data represented time-sequentially of the markers on wing 2 is given.

(Fluid Element)

There is no mesh prepared for the fluid element, and therefore, it is prepared by using a commercially available mesh preparing software, for example. In the fluid-structure interactive analysis method used by the inventors, it is necessary to use nodes common to the structural mesh also in the fluid mesh. Therefore, first, a mesh of a plane including the wing is prepared by tetragonal elements. Then, the tetragonal elements are swept upward and downward. Thus, a hexahedron mesh is prepared. Tetragonal meshes other than the wing are deleted after the preparation of hexahedron mesh. The hexahedron mesh has been described above with reference to FIGS. 6 and 7.

In this manner, coordinates and connectivity of respective nodes are prepared for fluid element as well. Further, as the boundary condition, a fixation boundary condition is given to the node of the wing and the nodes forming the outer wall of the cubic case. To the node shared by the fluid and the wing, relative fluid velocity of 0 is given as the boundary condition, and to the node forming the outer wall of the cubic analysis region, the boundary condition that allows free flow of fluid, that is, external force of 0, is given. In addition, mass density, coefficient of viscosity and bulk modulus of the air are given as physical values of each fluid element, as already discussed above.

In order to obtain a numerical model related to the manner of motion converged to the steady hovering state, a state in which flapping of one period is repeated for a plurality of times is analyzed.

[Actual Data]

The data actually used for analysis are those described with reference to Tables 1 to 6.

[Results of Calculation]

In the following, an example of the numerical model obtained through the above described method will be discussed. The numerical model is obtained from the data listed above, and the numerical model that is applicable to the present invention is not limited to this numerical model.

FIG. 9 described above represents the results of calculation of the fluid behavior around the wing model 2 in a steady state, represented as a numerical model. Arrows represent fluid velocity distribution around the wing model 2. Considering the time of calculation, in FIG. 9, fluid velocity distribution analyzed by a half model, in which the body structure is omitted and only one wing operates, is given. Further, in order to avoid complexity of display, only the velocity distribution on a cross section vertical to the biological wing model 2 of a living organism is given.

Figure 32:
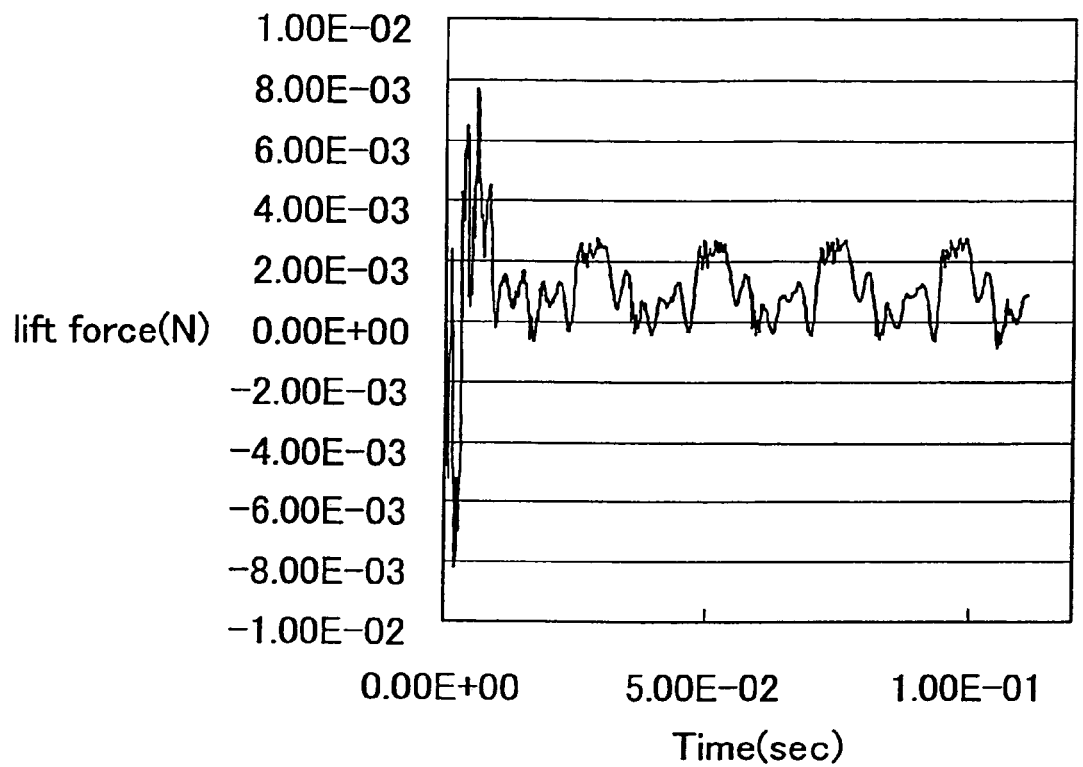
FIG. 32 represents transition of fulcrum reaction on a fulcrum of the wing, when the fluid-structure interactive numerical model in accordance with the first embodiment flaps.

FIG. 32 represents the total nodal force in the direction of y axis at nodes 71, 83 and 337 calculated by this method. As the forced displacement is exerted on nodes 71, 83 and 337, the total of nodal forces at nodes 71, 83 and 337 represent the force exerted on the body. As can be seen from FIG. 32, the nodal force, which is irregular in the initial state, eventually converges to a periodic behavior. Specifically, the behavior of the fluid and the behavior of the structure both become periodic at this time point. The periodic behaviors are equivalent to the behavior of the fluid and the behavior of the structure at the time of hovering. It is noted, however, that the direction of generation of the lifting force is the negative direction along the y axis, as shown in FIG. 34. According to the calculation made by the inventors, under the condition of gravitational acceleration of 9.8 m/sec$^2$, a lift force sufficient to lift a mass of about 0.1 g is generated per one wing, as can be seen from FIG. 32.

Figure 37:
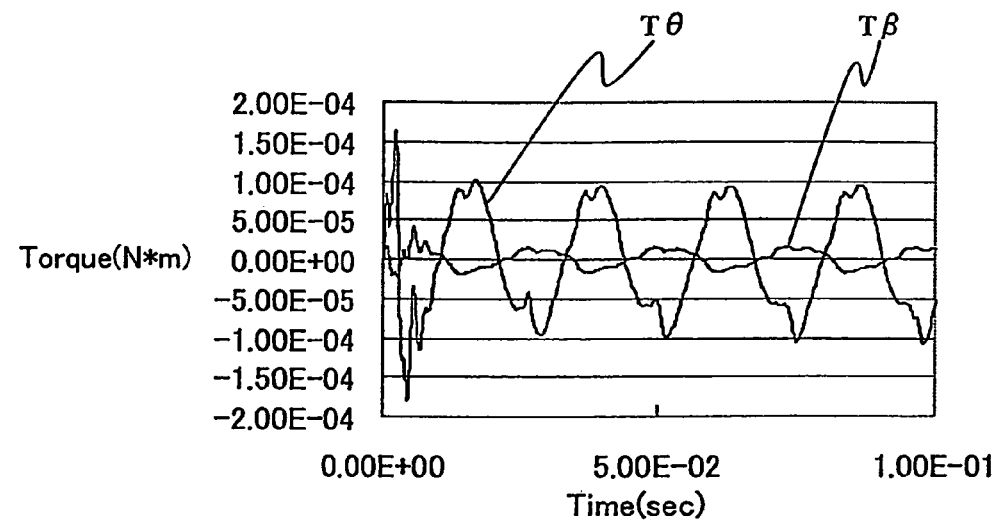
FIG. 37 is an illustration representing the driving torque exerted on the equivalent numerical model of actual structure in accordance with the first embodiment.

FIG. 37 shows the driving torque exerted on the wing at this time. In FIG. 37, θy represents torque in the direction of right turn in the positive direction along the y axis, and θz represents a torque in the direction of right turn along the positive direction of the z axis.

The torques θy and θz mentioned above are the driving torque itself of the actuator. Therefore, from the data above, we can say that a mass of 0.1 g can be lift up from the ground per one wing, using an actuator having the torque of 1.5 gf·cm to 3.5 gf·cm.

Accordingly, it is possible to prepare a numerical model of the fluid for steady hovering, and hence it is possible to calculate weight of the rising and moving apparatus that can be lifted and the torque of the actuator necessary for lifting the rising and moving apparatus.

(Technique of Fluid-Structure Interactive Analysis)

Various proposals have been made on the fluid-structure interactive analysis.

As the simplest technique, it is possible to determine fluid velocity by solving a moving boundary problem of the fluid only, from the video images of the wing picked-up by a high speed camera. The wing structure can be analyzed by deforming the structure by itself.

In this technique, however, it is necessary to measure in every step of analysis the movement of every portion (point) of the wing. Therefore, the data amount would be formidable. Further, the analysis can be employed only when motions of all the nodes of the wing are known. Therefore, this technique cannot be employed for the motion of the rising and moving apparatus described above, of which wing motion is unknown.

As methods of solving a problem having interaction between fluid and the structure, weak coupling method in which determinant equations of fluid and structure are calculated alternately, and strong coupling method in which equations of the entire system including fluid and structure (coupling equations) are calculated at one time (simultaneously) have been proposed. According to Qun Zhang et al. mentioned above, it is most efficient and optimal to use the strong coupling method, to solve the problem having strong interaction between fluid and the structure, as in the present embodiment.

The fluid-structure interactive structural analysis of Qun Zhang et al. described above has been made on a structure other than a living organism, while the fluid-structure interactive structural analysis of the present embodiment has been made on a behavior of a living organism, taking flapping motion of an insect in the air as an example. It is the feature of the present invention that, by applying the fluid-structure interactive structural analysis to a living organism, manufacturing of a robot mimicking the living organism is facilitated.

Second Embodiment

The method of preparing the fluid-structure interactive numerical model in accordance with the second embodiment will be described with reference to Table 7 and FIGS. 38 to 43.

Figure 28:
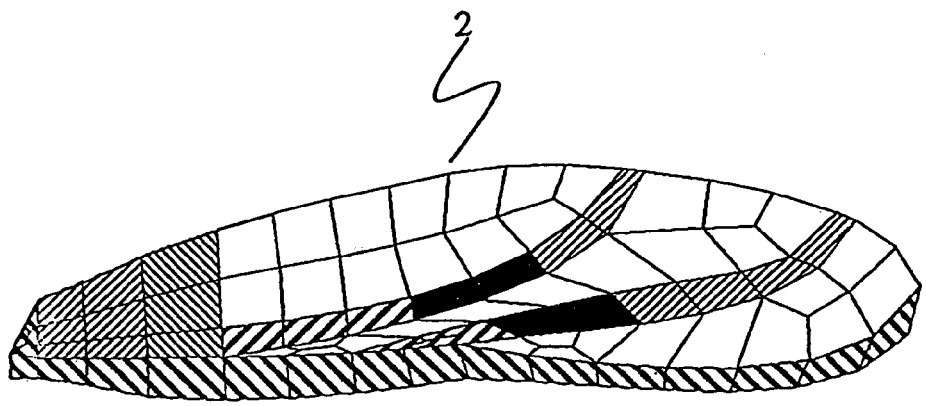
FIG. 28 represents wing thickness distribution related to the first embodiment.

The numerical model of the structure used in the method of preparing fluid-structure interactive numerical model of the present embodiment is shown in FIG. 28. The numerical model corresponds to the numerical model of the structure used in the method of preparing fluid-structure interactive numerical model of the first embodiment shown in FIG. 5, with the thicknesses of the wing changed, from 0.045 mm, 0.012 mm, 0.010 mm, 0.008 mm, 0.006 mm and 0.004 mm to 0.35 mm, 0.18 mm, 0.15 mm, 0.12 mm, 0.1 mm and 0.05 mm, respectively.

In the method of preparing fluid-structure interactive numerical model of the first embodiment, the direction of generation of the lift force was positive direction along the z axis in FIG. 34. In the method of preparing fluid-structure interactive numerical model of the present embodiment, it is along the negative direction along the y axis. Thus, in the present embodiment, the negative direction along the y axis is considered to be vertically upward.

Figure 38:
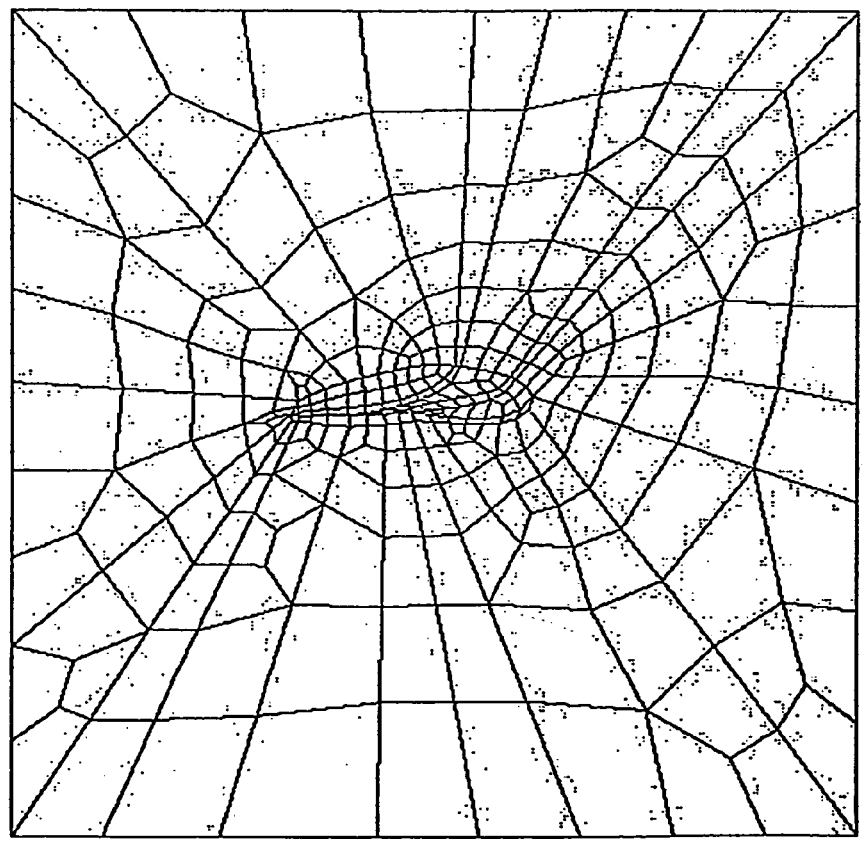
FIG. 38 is an illustration representing a method of preparing a mesh of a fluid in accordance with a second embodiment.
Figure 39:
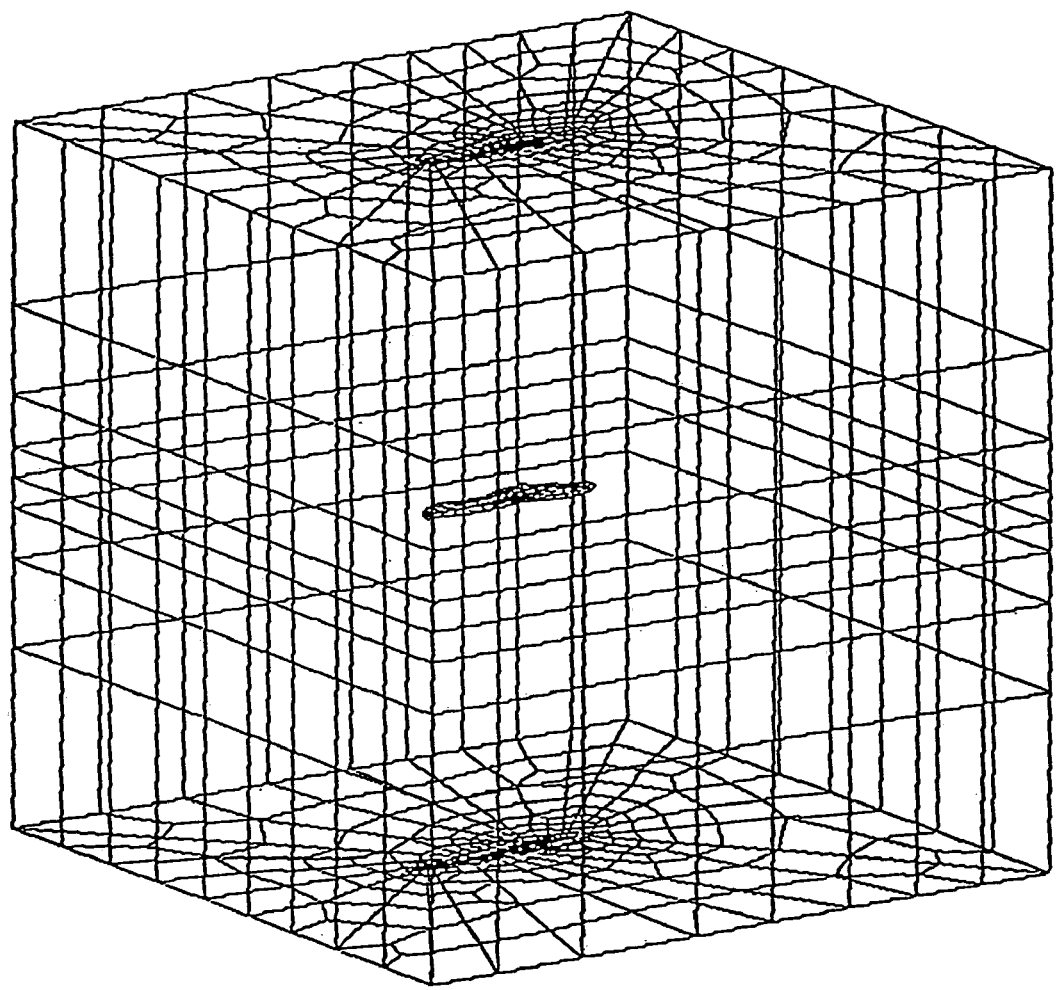
FIG. 39 represents an outline of the mesh of the fluid in accordance with the second embodiment.

In the method of preparing fluid-structure interactive numerical model of the present embodiment, the mesh structure shown in FIGS. 6 and 7 used in the first embodiment are replaced by the mesh structures shown in FIGS. 38 and 39.

Figure 40:
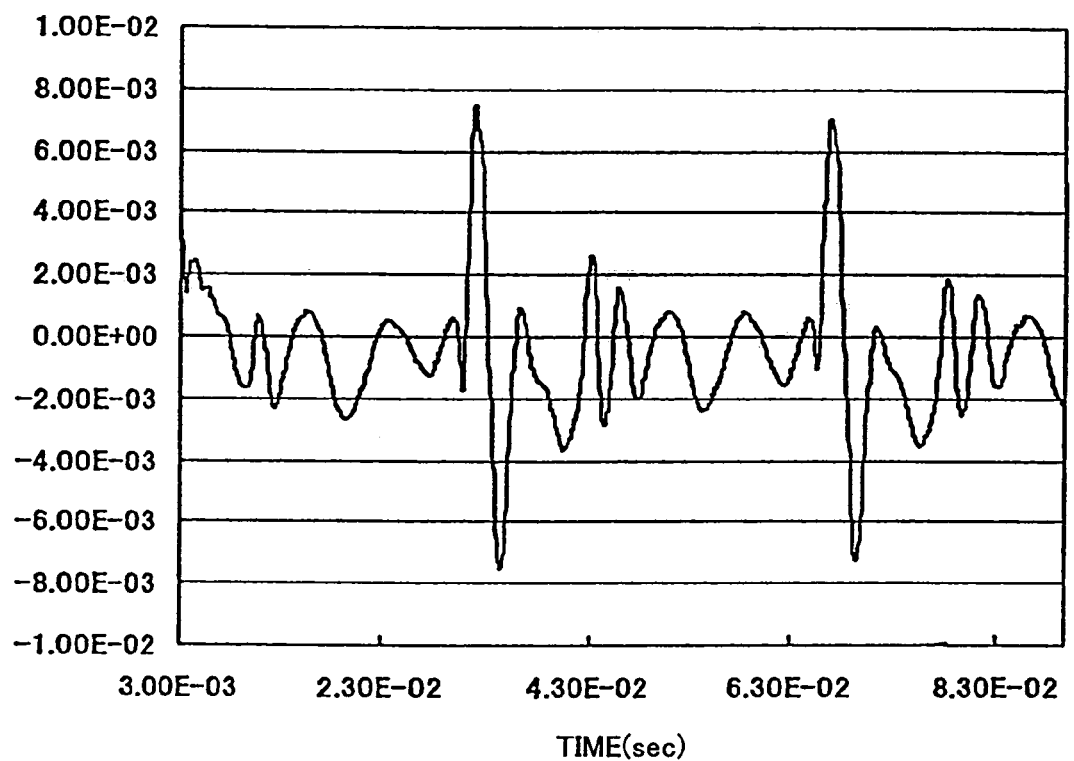
FIG. 40 represents transition of fulcrum reaction on a fulcrum of the wing, when the fluid-structure interactive numerical model in accordance with the second embodiment flaps.

Further, in the method of preparing fluid-structure interactive numerical model of the present embodiment, the relation between the lift force and time shown in FIG. 32 obtained by the method of preparing fluid-structure interactive numerical model of the first embodiment is as shown in FIG. 40.

Figure 41:
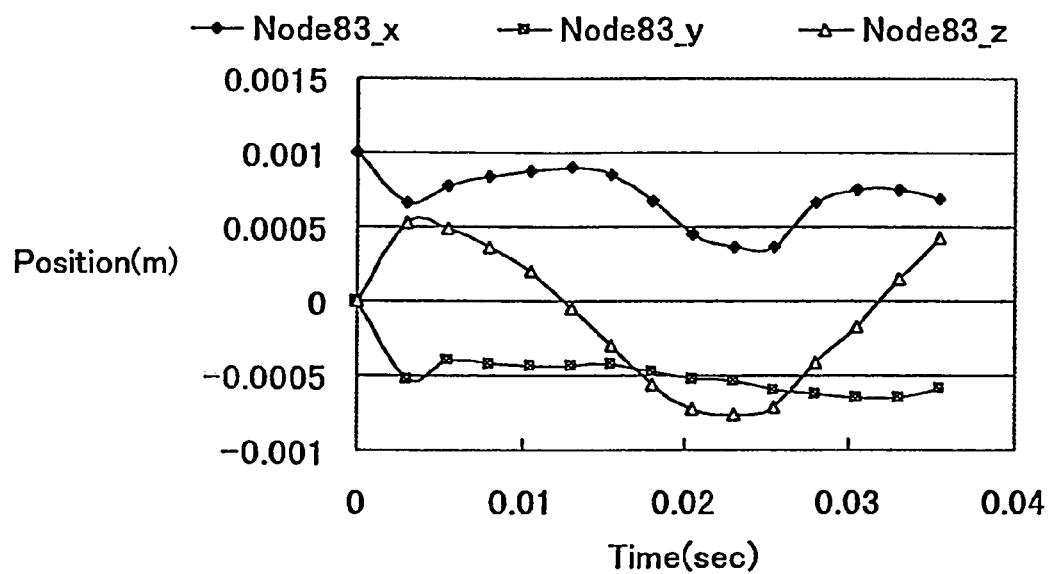
FIGS. 41 and 42 are illustrations representing specific examples of the equivalent numerical model of actual structure in accordance with the second embodiment.
Figure 42:
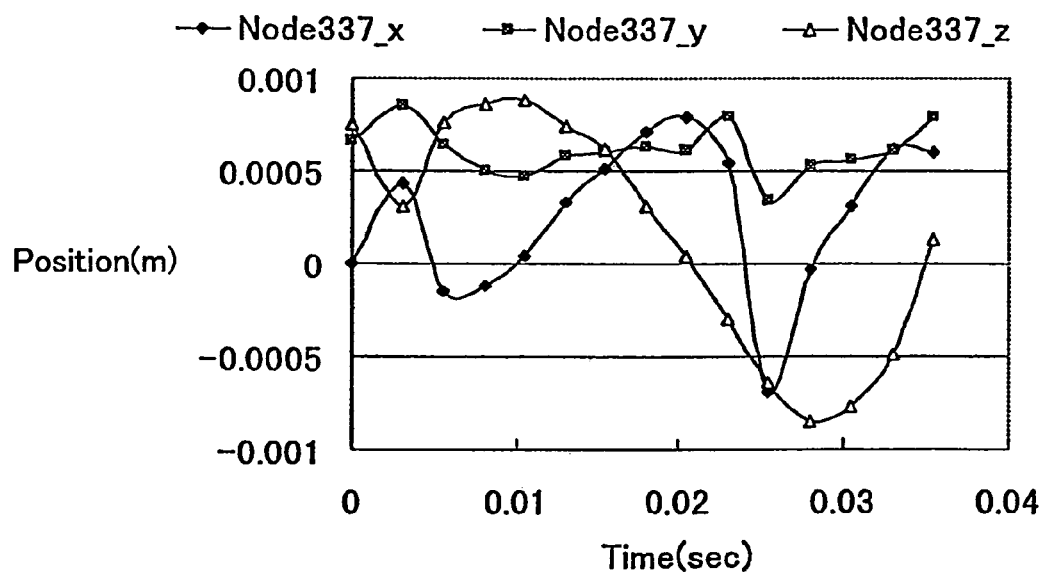

In the method of preparing fluid-structure interactive numerical model of the present embodiment, the relation between position and time shown in FIGS. 35 and 36 obtained by the method of preparing fluid-structure interactive numerical model of the first embodiment is changed to the relation shown in FIGS. 41 and 42.

Figure 43:
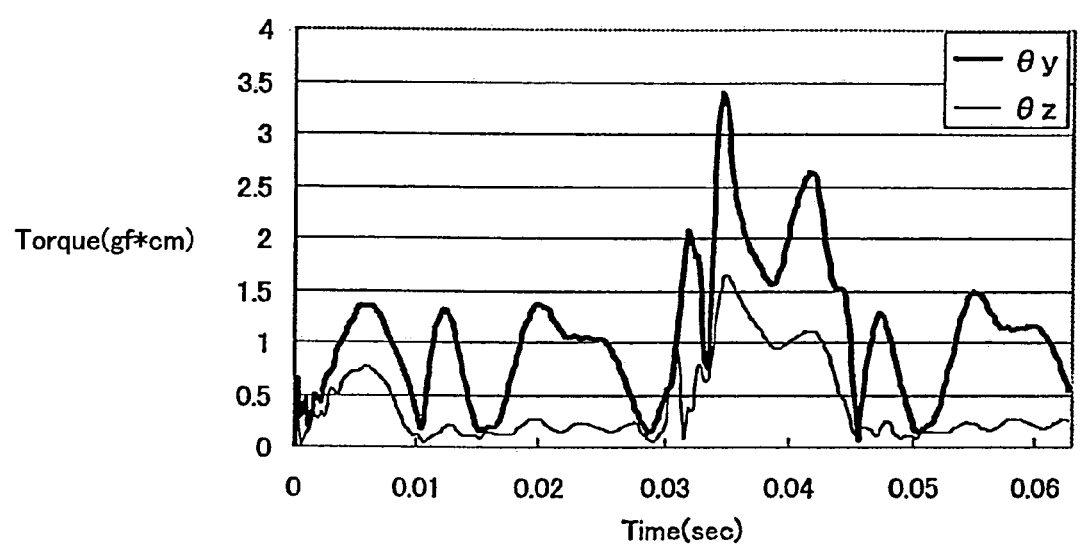
FIG. 43 is an illustration representing the driving torque exerted on the equivalent numerical model of actual structure in accordance with the second embodiment.

Further, in the method of preparing fluid-structure interactive numerical model of the present embodiment, the relation between torque and time shown in FIG. 37 obtained by the method of preparing fluid-structure interactive numerical model of the first embodiment is changed to the relation shown in FIG. 43. Here, referring to FIG. 43, θy represents Tβ in FIG. 37, and θz represents Tθ in FIG. 37.

In the method of preparing fluid-structure interactive numerical model of the present embodiment, the x and y coordinate values of Node83 of Table 1 used in the method of preparing fluid-structure interactive numerical model in accordance with the first embodiment are changed from 0.000889 to 0.001 and from 0.000889 to 0.001, respectively.

Further, in the method of preparing fluid-structure interactive numerical model of the present embodiment, Young's modulus, specific gravity and thickness of Table 4 used in the method of preparing fluid-structure interactive numerical model of the first embodiment are replaced from 0.5E+09 to 1.00E+09, from 0.7E+03 to 1.2E+03, and from 4.5E−05 to 0.35E−03, respectively.

In ShellMotion.dat, time-history of x, y and z coordinates at the nodes of the wing are as shown in Table 7, in place of those shown in Table 6.

TABLE 7

ShellMotion.dat

| Node/Time(sec) | 0 | 0.0025 | 0.005 | ... | 0.035 |
|---|---|---|---|---|---|
| Node71_x | 0 | 0 | 0 | ... | 0 |
| Node71_y | 0 | 0 | 0 | ... | 0 |
| Node71_z | 0 | 0 | 0 | ... | 0 |

TABLE 7-continued

ShellMotion.dat

| Node83_x | 0.001 | 0.000669 | 0.000772 | ... | 0.000689 |
|---|---|---|---|---|---|
| Node83_y | 0 | −0.00053 | −0.0004 | ... | −0.00059 |
| Node83_z | 0 | 0.000523 | 0.00049 | ... | 0.000423 |
| Node337_x | 0 | 0.00043 | −0.00015 | ... | −0.0006 |
| Node337_y | 0.000656 | 0.000848 | 0.000636 | ... | −0.00079 |
| Node337_z | 0.000755 | 0.000309 | 0.000758 | ... | −0.00013 |

As regards other figures and tables, the configuration and method used in the method of preparing fluid-structure interactive numerical model of the present embodiment are the same as those of the method of preparing fluid-structure interactive numerical model in accordance with the first embodiment.

(Characteristics and Effects of the Method of Manufacturing a Rising and Moving Apparatus in Accordance with the Present Embodiment)

The method of manufacturing the rising and moving apparatus of the present invention includes the following steps.

① Measuring physical values related to an actual structure of a wing of an insect.

② Preparing an equivalent numerical model of wing structure that can be regarded as equivalent to the actual wing, in which the physical values related to the actual structure of the wing are given as numerical values.

③ Preparing numerical models of a plurality of different types of wing structures in which stiffness parameter of the equivalent numerical model of wing structure is varied.

④ Measuring physical amounts related to the manner of flapping motion while the actual wing of the insect is caused to perform flapping motion.

⑤ Preparing a numerical model of flapping motion in which the physical values related to the manner of flapping motion are expressed as numerical values.

⑥ The step of fluid-structure interactive analysis, in which a numerical model related to the fluid in a virtual fluid and a numerical model related to the structure of the numerical model of wing structure are calculated, respectively.

In this step of analysis, numerical models when, in a preset virtual fluid for analysis, a plurality of different types of numerical models of wing structure are caused to perform flapping motion represented by the numerical model of flapping motion, respectively, are calculated. Here, the numerical models are prepared by the analysis of the behavior of the fluid and the behavior of the structure including interaction therebetween.

⑦ Using a prescribed numerical model of wing structure among the plurality of different types of numerical models of wing structure, manufacturing the wing portion that is driven by a driving apparatus.

The prescribed numerical model of wing structure is the numerical model obtained through fluid-structure interactive analysis. The numerical model is the model in which the prescribed parameters of the numerical model related to the fluid of the virtual fluid and the numerical model related to the structure of the numerical model of wing structure have the optimal values.

According to the method of manufacturing the rising and moving apparatus including steps ① to ⑦ described above, it is possible to quantify and consider the influence of deformation of the wing for each of the plurality of wing structures having wing portions of different stiffness. Therefore, it is possible to manufacture a rising and moving apparatus that has a wing of optimal stiffness for flapping fight, in consideration of the influence of wing deformation.

The prescribed parameter may be the lift force generated at the numerical model of wing structure when the numerical model of wing structure is caused to perform flapping motion.

By this manufacturing method, it is possible to manufacture a rising and moving apparatus (90) that has a wing portion (904) capable of generating maximum lift force by the flapping motion.

The prescribed parameter may be a value obtained by dividing the lift force generated at the numerical model of wing structure when the numerical model of wing structure is caused to perform flapping motion by the torque necessary for driving the numerical model of wing structure to generate the lift force.

By this manufacturing method, it is possible to manufacture a rising and moving apparatus (90) that has the maximum lift force per one torque. In other words, a driving unit (905) is realized in which the torque necessary to generate a prescribed lift force is the smallest. Thus, a rising and moving apparatus (90) that is more advantageous for rising can be manufactured. In the present invention, the torque refers to the magnitude of the rotational force used for driving the wing portion (904), unless specified otherwise.

The prescribed parameter related to the flapping rise and movement described above may be the highest frequency of the driving unit (905) necessary for realizing the flapping motion of the numerical model of wing structure.

By this manufacturing method, a rising and moving apparatus is manufactured that can fly flapping, using a driving unit (905) of which upper limit of the driving frequency is the smallest. This enables lowest possible setting of the stiffness of the driving unit (905). Generally, a member having low stiffness is of light weight, and hence, this means that the driving unit (905) can be formed by using a light weight member. As a result, the mass of the driving unit (905) can be reduced, and hence, a rising and moving apparatus (90) that is more advantageous for rising can be manufactured.

Further, the prescribed parameter may be a value obtained by dividing the lift force generated on the numerical model of wing structure when the numerical model of wing structure is caused to perform flapping motion, by the energy necessary for generating the lift force.

By this manufacturing method, it is possible to manufacture a wing portion (904) by which the energy used for the flapping motion can be minimized. Therefore, when it is necessary to generate a prescribed lift force, a rising and moving apparatus (90) can be manufactured in which an energy source is made smaller in size.

In the present embodiment, the energy used for the flapping motion refers to the energy consumed by the driving unit (905) driving the wing portion (904), unless specified otherwise. Typical example of the energy includes electric power consumed by the driving unit.

Next, a rising and moving apparatus as a specific example that can implement rising and moving apparatus 90 in accordance with the first embodiment will be described. Rising and moving apparatus 90 in accordance with the first embodiment described above has the structure and function as will be described in the following, in addition to the characteristics of wing 904 described above. In the third and fourth embodiments, however, wing portions having characteristics not fully the same as or different from those of wing portion 904 of rising and moving apparatus 90 in accordance with the first embodiment are discussed, as the overall structure and the function of the rising and moving apparatus as a whole are described. It is noted that, actually, the wing portion of the rising and moving apparatus in accordance with the third and fourth embodiments can be replaced by the wing portion 904 of the rising and moving apparatus 90 in accordance with the first embodiment.

Here, the force received by the wing from the fluid is referred to as the fluid force. For simplicity of description, a state is assumed, in which the air flow occurs only by the flapping, that is, a calm state is assumed.

Third Embodiment

The rising and moving apparatus in accordance with the third embodiment of the present invention will be described with reference to FIGS. 44 to 56. In the following description of the rising and moving apparatus of the present embodiment, the characteristics of wing 904 of the rising and moving apparatus 90 described above will not be discussed. Actually, however, the characteristics of wing 904 described above are combined with the wing 4 of the present embodiment.

(Overall Arrangement)

First, main components of the rising and moving apparatus as a whole in accordance with the present invention will be described with reference to FIG. 44. In the rising and moving apparatus in accordance with the present embodiment, for simplicity of description, it is assumed that the main portion driving the wings are in line symmetry, unless specified otherwise. Therefore, in the following, only the left half of the rising and moving apparatus will be described, assuming that components in mirror symmetry to the left half are provided on the right half. It is noted, however, that being in line symmetry is not an essential condition of the rising and moving apparatus in accordance with the present invention.

Figure 45:
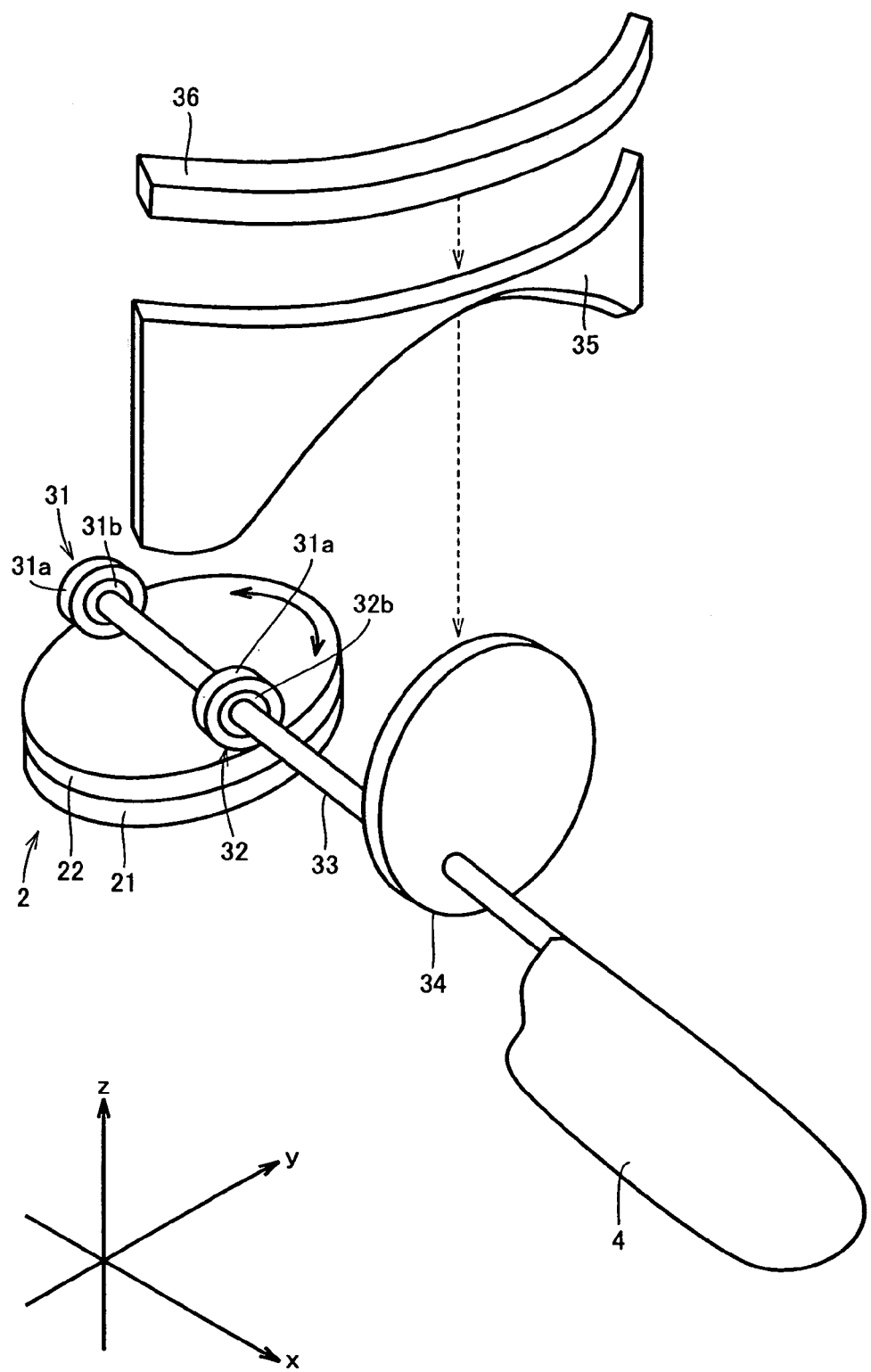
FIG. 45 is a schematic illustration representing a structure of main components of the driving mechanism of the rising and moving apparatus in accordance with the third embodiment.

A rising and moving apparatus 1 in accordance with the present embodiment includes as main components, an actuator 2 provided in a support structure 9, a transmission shaft 33 driven by actuator 2 through bearings 31, 32, and wings 4 driven by transmission shaft 33, as shown in FIGS. 44 and 45.

On transmission shaft 33, a pinion gear 34 is fixed. A rack gear 35 is engaged with pinion gear 34. Pinion gear 34 pivots while pinion gear and rack gear 35 being engaged with each other. Pinion gear 34 pivots due to in-plane motion of the plane of transmission shaft 33. The motion in the forward/backward direction of the wings 4 and transmission shaft 33 when viewed from above rising and moving apparatus 1 will be referred to the in-plane motion, only in the present embodiment.

By the pivoting operation of actuator 2 in the direction represented by the arrow in FIG. 45, transmission shaft 33 moves to draw a sectoral orbit, when transmission shaft 33 is viewed in a direction vertical to the main surface of actuator 2. In the following, the pivoting operation of transmission shaft 33 with the direction of extension of transmission shaft 33 being the central axis will be simply referred to as "pivoting operation of transmission shaft 33." Further, the pivoting operation of transmission shaft 33 with an axis matching the central axis of pivoting operation of actuator 2 will be referred to as "in-plane motion of transmission shaft 33." Here, when wing 4 is viewed along the direction of extension of transmission shaft 33, various portions of wing each make a motion that draws arcuate orbit.

Further, position of rack gear 35 relative to support position 9 is fixed. Further, rack gear 35 is held by a rack gear moving mechanism 36. Rack gear moving mechanism 36 is provided on support structure 9, and rack gear 35 can be moved relative to support structure 9.

Further, actuator 2 has a disk-shape. Actuator 2 pivots in the direction shown in FIG. 45. At this time, wing 4 rotates with the direction of extension of transmission shaft 33 being the central axis of pivoting operation. As a result, wing 4 generates an air flow in vertically downward direction. Thus, rising and moving apparatus 1 rises in vertically upward direction by the reaction of the vertically downward air flow.

Though details will be described later, in rising and moving apparatus 1 in accordance with the present embodiment, the central position of amplitude in the in-plane motion of tip ends of left and right transmission shafts 33 can be shifted forward or backward along the direction of progress, independently and separately. Thus, rising and moving apparatus 1 turns to the left or right, or moves forward or backward. Here, it is assumed that rotating operation about an axis extending in the forward/backward direction of rising and moving apparatus 1 is realized by changing at least one of the amplitude of pivoting operation and the frequency of pivoting operation of actuator 2.

Actuator 2 and rack gear moving mechanism 36 are each controlled by a control apparatus 5. Further, actuator 2, rack gear moving mechanism 36 and control apparatus 5 are operated by the power supplied from a power source 6.

(Support Structure)

Next, support structure 9 will be described. It is desired that support structure 9 is as light weight as possible as long as it has a mass in a range that ensures the function of the supporting structure. By way of example, the situation that the weight is reduced too much to decrease the stiffness and the energy for driving wing 4 causes vibration of support structure 9 and is lost must be avoided, and the range is determined based on such consideration. In rising and moving apparatus 1 in accordance with the present embodiment, carbon graphite, which is light weight, is used for support structure 9.

(Wing and Driving System Thereof)

The wing and the system for driving the wing will be described with reference to FIGS. 45 to 54.

(Actuator)

First, actuator 2 will be described with reference to FIG. 45.

In rising and moving apparatus 1 in accordance with the present embodiment, a motor generally referred to as an ultrasonic motor is used. The ultrasonic motor used as actuator 2 in the present embodiment is capable of pivoting a rotor portion 22 with respect to a stator portion 21 that is fixed on support structure 9 as show in FIG. 45. On rotor portion 22, outer circumferential portions 31a and 32a of bearings 31 and 32 are fixed.

Bearings 31 and 32 have inner circumferential portions 31b and 32b smoothly rotatable with respect to outer circumferential portions 31a and 32a. Transmission shaft 33 is fixed on inner circumferential portions 31b and 32b. Therefore, actuator 2 is capable of pivoting transmission shaft 33 about an axis that matches the central axis of pivoting of actuator 2, in a plane that is parallel to the main surface of actuator 2. Here, the pivoting operation of transmission shaft 33 occurs as pinion gear 34 pivots while being engaged with rack gear 35.

(Link Mechanism Provided by Deformed Rack and Deformed Pinion Gears)

Next, pinion gear 34 and rack gear 35 will be described with reference to FIGS. 46 and 47.

Referring to FIG. 45, rack gear 35 is formed by using a part of a circumferential surface of a column that has a bottom surface of circular shape that is similar to the circular shape of actuator 2. This configuration is to attain better engagement between pinion gear 34 and rack gear 35. For simplicity of description, however, the circumferential surface of the columnar rack gear 35 is developed to a plane. The developments of pinion gear 34 and rack gear 35 are as shown in FIG. 46. In FIG. 46, pinion gear 34 is elliptical. Pinion gear 34 pivots about an axis extending in a direction of transmission shaft 33 as the central axis of pivoting, as actuator 2 pivots. This will be simply referred to as "pivoting operation of pinion gear 34." Further, while a state is maintained in which the teeth of rack gear 35 and pinion gear engage with each other, pinion gear 34 reciprocates in the direction along the arrangement of teeth of rack gear 35. At this time, pinion gear 34 moves in line symmetry to left and right, about the symmetry axis of rack gear 35 that is in line symmetry, as shown in FIG. 46. Transmission shaft 33 moves in a horizontal direction in line symmetry to left and right, about the symmetry axis of rack gear 35 as shown in FIG. 46.

Figure 46:
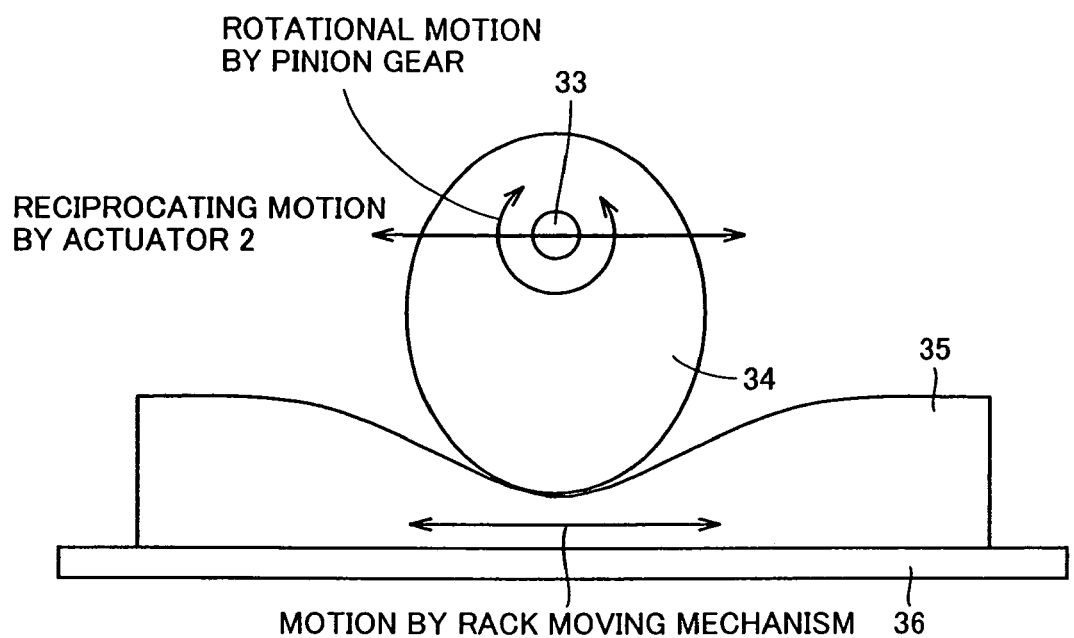
FIG. 46 is a development illustrating the function of a rack gear and a pinion gear of the rising and moving apparatus in accordance with the third embodiment.

It is noted, however, that actual rack gear 35 is configured such that the plane of rack gear 35 in the development of FIG. 46 forms the circumferential surface of the column of which central axis is the central axis of pivoting operation of actuator 2. Further, actual pinion gear 34 is configured such that the plane of pinion gear 34 in the development of FIG. 46 forms a part of an elliptical spherical shell. Thus, engagement between the teeth of rack gear 35 and pinion gear 34 is-maintained even when transmission shaft 33 pivots. If it is possible to eliminate any problem in engagement between rack gear 35 and pinion gear 34 by modifying the shape of gear teeth, for example, the shapes of rack gear 35 and pinion gear 34 are not limited to those described above.

Here, gear ratio of pinion gear 34 with respect to rack gear 35 is made small at opposite ends of amplitude of pivoting of actuator 2, that is, at two dead points, and made extremely large near the center of amplitude of pivoting of actuator 2. The gear ratio is represented as $d\alpha/d\beta$, where $\alpha$ represents the angle of pivoting operation of actuator 2 to cause the in-plane motion of transmission shaft 33, and $\beta$ represents the angle of pivoting operation of transmission shaft 33.

Therefore, the motion of elliptical pinion gear 34 that moves symmetrically to left and right with the symmetry axis of rack gear 35 that is in line symmetry shown in FIG. 46 being the center is, specifically, as follows. On and near the symmetry axis mentioned above, angular velocity of pinion gear 34 is smaller than at and near the opposite ends of movement to the left and to the right. In other words, at and near the opposite ends of movement to the left and to the right, angular velocity of pinion gear 34 is extremely larger than on and near the symmetry axis mentioned above. The reason for this is that, as pinion gear 34 is elliptical, the distance from an intersecting point between the major axis and minor axis to the outer circumference of the ellipse that is in contact with rack gear 35 is long on and near the symmetry axis, while the distance from an intersecting point between the major axis and minor axis to the outer circumference of the ellipse that is in contact with rack gear 35 is shorter at and near the opposite ends of movement to the left and to the right.

As described above, rack gear 35 is formed to have a prescribed shape so that transmission shaft 33 moves on a line to the left and to the right without moving upward/downward in FIG. 46. Though an elliptical pinion gear 34 is used in rising and moving apparatus 1 of the present embodiment, it is not necessarily be elliptical.

Because of the configuration described above, the velocity of pivoting operation (pivoting operation with the angle β shown in FIG. 47) is small at and near the center of amplitude of the pivoting operation (pivoting operation with the angle α shown in FIG. 47) of actuator 2, while it is large at opposite ends of amplitude of the pivoting operation of actuator 2.

Figure 47:
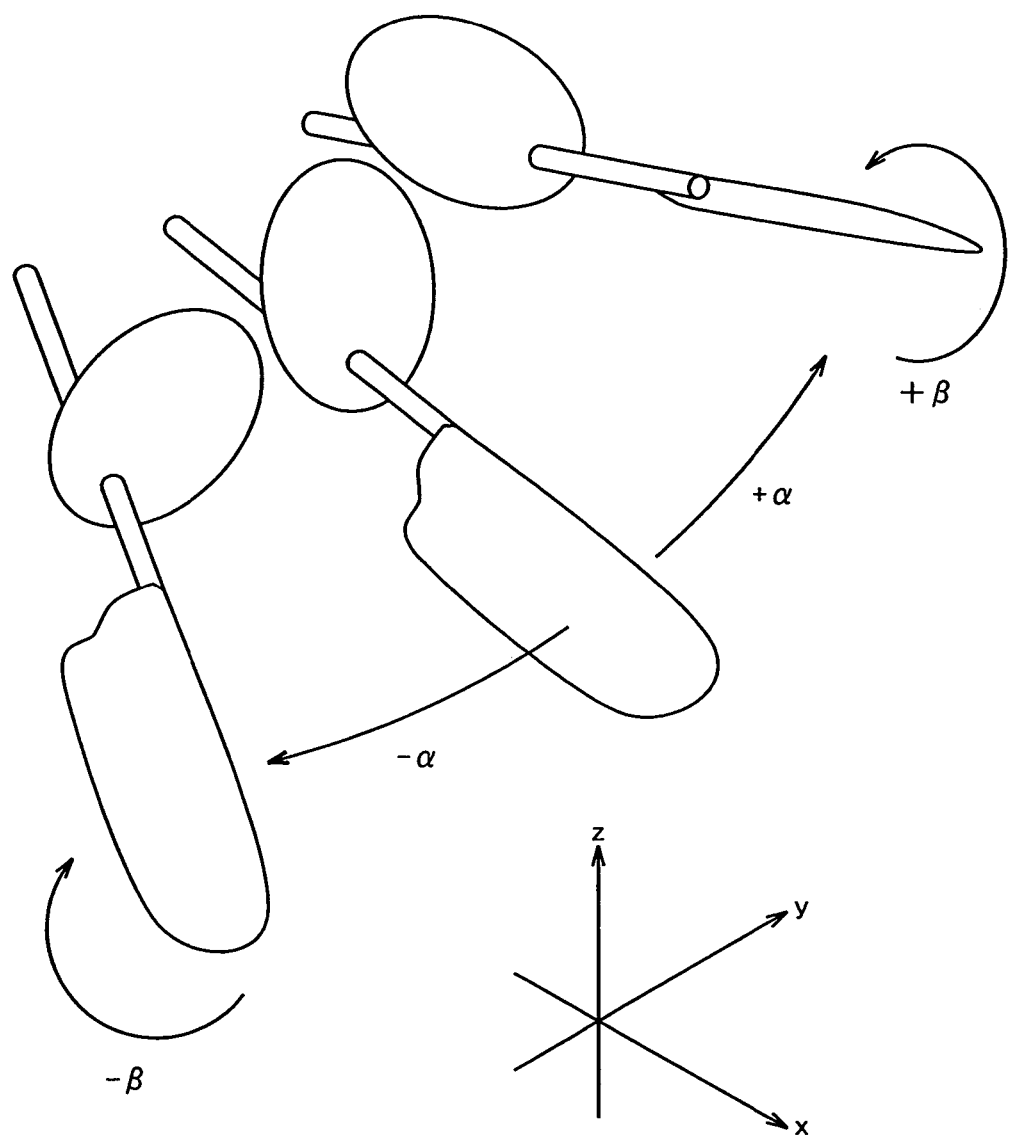
FIG. 47 is an illustration representing an operation of the wing of the rising and moving apparatus in accordance with the third embodiment.

From the principle described above, wing 4 makes an in-plane motion (pivoting operation with the angle α shown in FIG. 47) having an orbit similar to that of the sectoral orbit drawn by the in-plane motion of transmission shaft 33 caused by the pivoting operation of actuator 2, as shown in FIG. 47. Further, wing 4 pivots (pivoting operation with the angle β shown in FIG. 47) in the same direction as the pivoting motion of transmission shaft 33 as pinion gear 34 moves engaged with rack gear 35. The velocity of pivoting operation of wing 4 with the angle β shown in FIG. 47 is large at opposite ends of the amplitude of pivoting operation of actuator 2 and small near the center of the amplitude of pivoting operation of actuator 2, and therefore, wing 4 can attain higher rotational lift during stroke reversals.

In the rising and moving apparatus in accordance with the present embodiment, the angle of pivoting operation of actuator 2 (angle α shown in FIG. 47) is ±45°. The angle of pivoting operation of transmission shaft 33 caused by the pivoting operation of actuator 2 (angle β shown in FIG. 47) is set to ±30°.

(Rack Gear Moving Mechanism)

Next, rack gear moving mechanism 36 will be described with reference to FIG. 48.

Rack gear moving mechanism 36 is mounted on support structure 9, and has a function of moving the position of rack gear 35. By the function of rack gear moving mechanism 36, rack gear 35 reciprocates such that an arcuate orbit similar to the orbit of pivoting operation of a point on the outer circumference of actuator 2 is drawn when rising and moving apparatus 1 is viewed from above. The movement of the position of rack gear 35 corresponds to the movement of rack gear 35 in the horizontal direction (left and right) in FIG. 46.

When the center of amplitude of the pivoting operation of actuator 2 is shifted to the front or rear side of rising and moving apparatus 1 in correspondence to the movement in position of rack gear 35, change in flight direction and the like can easily be controlled.

Further, by rack gear moving mechanism 36, it is possible to control to some extent the range of in-plane motion of wing 4 (motion of angle α in FIG. 47). By way of example, when rack gear 35 is moved to follow the in-plane motion of transmission shaft 33 (motion of angle α in FIG. 47) by using rack gear moving mechanism 36 such that positional relation of engagement between transmission shaft 33 and rack gear 35 is maintained, pivoting operation of transmission shaft 33 (angle β of FIG. 47) does not occur. Therefore, it is possible to move the center of amplitude of the in-plane motion (motion of angle α in FIG. 47) of wing 4 to the front or rear side of rising and moving apparatus 1, while maintaining the angle (angle β of FIG. 47) of wing 4 constant.

Figure 48:
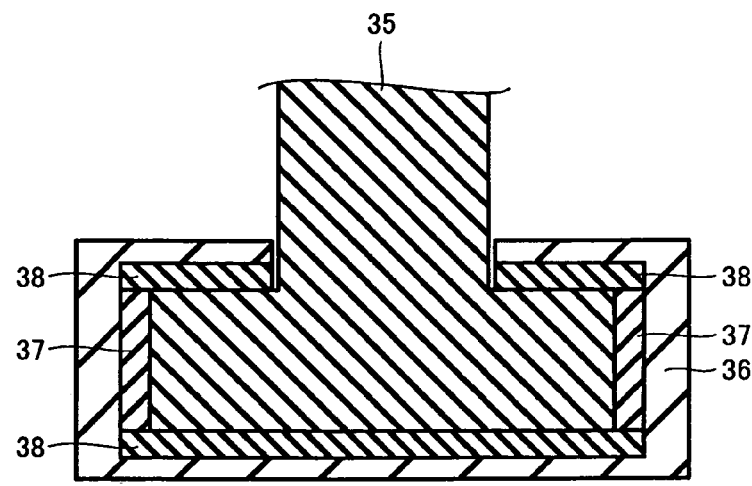
FIG. 48 is a cross section representing a structure of a rack gear moving mechanism of the rising and moving apparatus in accordance with the third embodiment.
Figure 49:
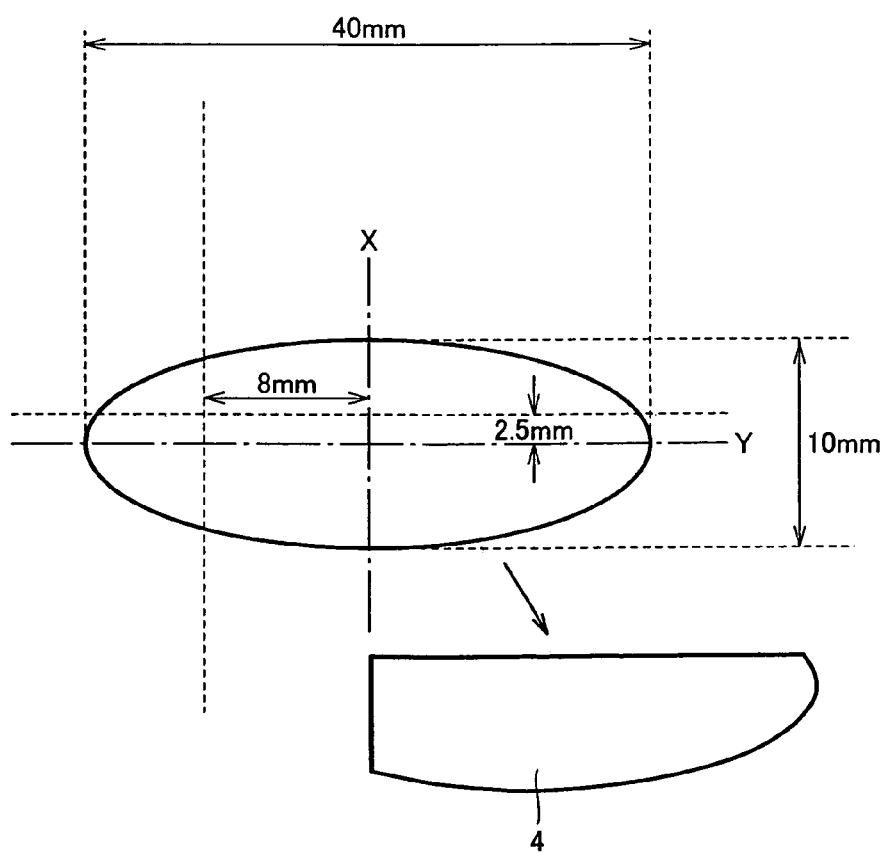
FIG. 49 represents a shape of the wing of the rising and-moving apparatus in accordance with the third embodiment.

In rack gear moving mechanism 36 of the rising and moving apparatus in accordance with the present embodiment, an ultrasonic linear actuator 37 having superior response is used, as shown in FIG. 48. FIG. 48 is a cross section of rack moving mechanism 36 and rack gear 35, when rack gear moving mechanism 36 is cut in a direction vertical to the sheet of the development of FIG. 46. Actually, the structure shown in FIG. 48 turned upside down is attached to rising and moving apparatus 1. To reduce weight, at a portion where rack gear moving mechanism 36 and rack gear 35 are in contact and the ultrasonic actuator does not exist, a highly lubricant Teflon (R) bearing 38 is used. Further, it is necessary to suppress influence of force exerted on ultrasonic linear actuator 37 derived from the reaction from the air to the wing 4. For this purpose, ultrasonic linear actuator 37 is provided extending parallel to a virtual plane of which normal line is in the direction of extension of transmission shaft 33.

(Wing Portion)

Next, wing 4 will be described with reference to FIGS. 49 to 56.

(Outline of Shape and Stiffness)

Wing 4 is formed of a flat plate having approximately uniform thickness and fixed directly on transmission shaft 33. In order to manufacture the wing 4, first, an elliptical flat plate having the major axis of about 40 mm and minor axis of about 10 mm is prepared. A line parallel to the major axis of the ellipse and at a position of about 2.5 mm from the major axis and a line parallel to the minor axis of the ellipse and at a position of about 8 mm from the minor axis are cut. The largest piece among four pieces resulting from this cutting is used as the wing 4.

Wing 4 is made of a hard, light weight resin. Further, wing 4 is formed by laser cutting. Therefore, there is a rim formed around the outline of wing 4. The rim improves the strength of wing 4.

Figure 50:
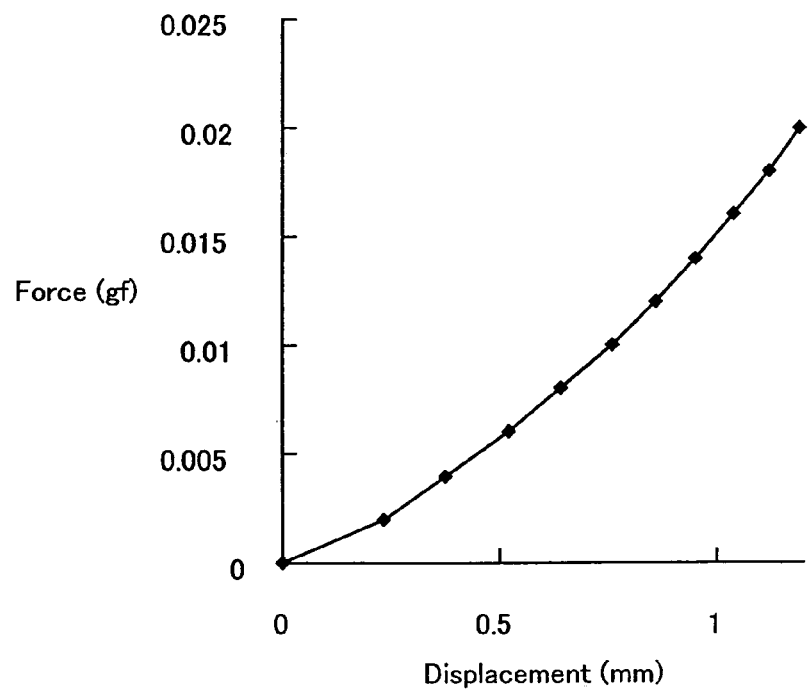
FIG. 50 is a graph representing stiffness of the wing of the rising and moving apparatus in accordance with the third embodiment, using amount of displacement with respect to load.

Further, a relation of load-displacement at a distance of 7.1 mm from transmission shaft 33 in a direction vertical to transmission shaft 33, with transmission shaft bound is shown in FIG. 50 as representing the stiffness of wing 4 used by the inventors.

(Wing Motion and Torsional Displacement Enlarging Mechanism)

The behavior of the wing in accordance with the present embodiment will be described with reference to FIGS. 51 to 56.

Figure 51:
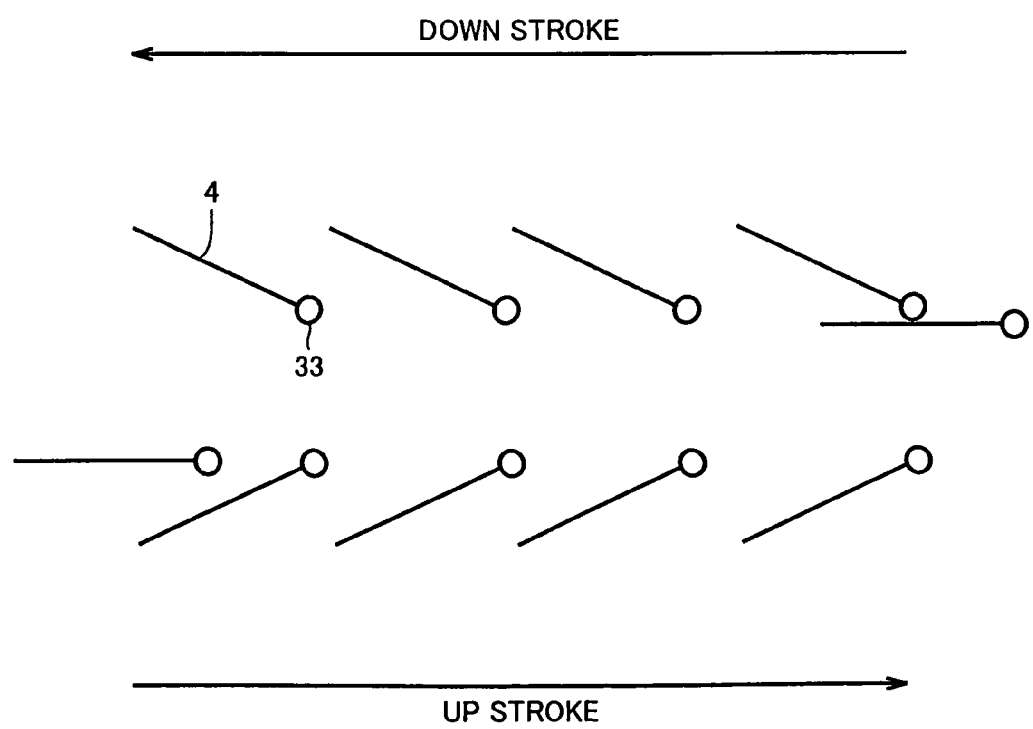
FIG. 51 is a schematic illustration representing a manner of motion of the wing used for the rising and moving of the rising and moving apparatus in accordance with the third embodiment.
Figure 52:
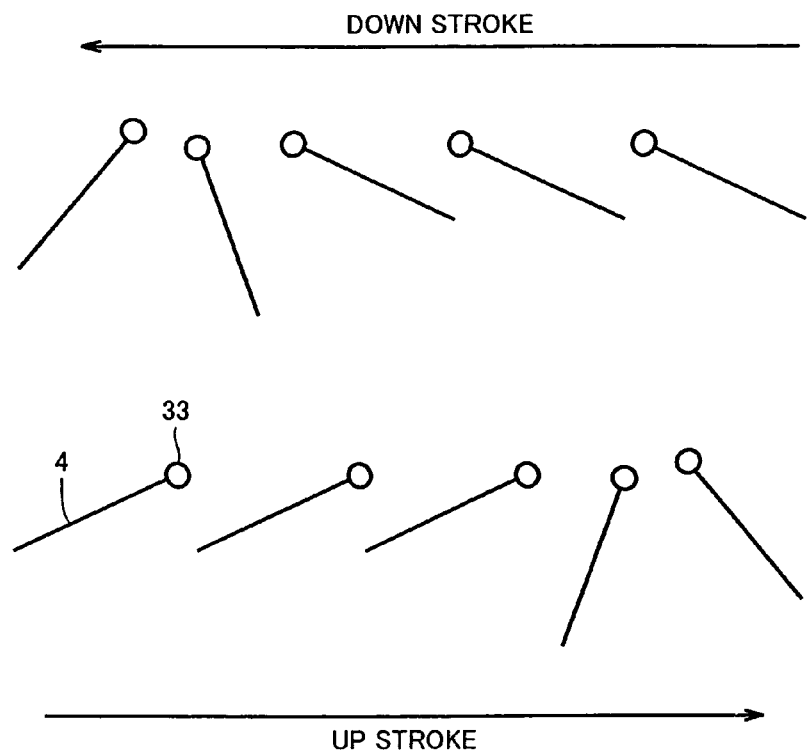
FIG. 52 is a schematic illustration representing another manner of motion of the wing used for the rising and moving of the rising and moving apparatus in accordance with the third embodiment.

There are two possible manners of flapping as shown in FIGS. 51 and 52, by which rising and moving apparatus 1 obtains lift force through the in-plane motion of wing 4. In the manner of flapping shown in FIG. 51, negative rotational lift is generated at opposite ends of the in-plane motion of wing 4. Therefore, in the rising and moving apparatus 1 in accordance with the present embodiment, the manner of flapping shown FIG. 52, by which positive rotational lift is generated at opposite ends of the in-plane motion of wing 4 is employed.

Here, for convenience, an operation in which wing 4 is moved from the front side to the rear side of movement of rising and moving apparatus 1 is referred to as an up-stroke, and the reverse operation is referred to as a down-stroke. The up-stroke and down-stroke of the wing refer to the reciprocating operation in a plane approximately horizontal to the ground, and hence, the up- and down-strokes of the wing do not mean operations in the direction approximately vertical to the ground.

Figure 56:
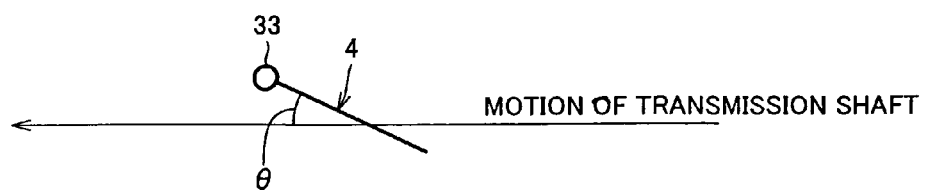
FIG. 56 is a schematic illustration representing the definition of the angle of attack of the wing of the rising and moving apparatus in accordance with the third embodiment.

The motion of wig 4 of rising and moving apparatus in accordance with the present embodiment is as shown in FIG. 52, and in order to attain lift force with high efficiency, it is necessary that the angle of attack shown in FIG. 56 is about 10°. Therefore, when wing 4 is almost free of any elastic deformation, it is necessary to pivot wing 4 about transmission shaft 33 by about 160° (pivoting operation represented by angle β in FIG. 47) during reversal between the up-stroke and the down-stroke.

When wing 4 having higher degree of elastic deformation is used, it becomes possible to make smaller the angle of pivoting operation (angle β of FIG. 47) of transmission shaft 33, while a state in which the angle of attack θ is maintained approximately at 10°. Therefore, in rising and moving apparatus 1 in accordance with the present embodiment, a method is employed in which wing 4 is passively deformed by the aerodynamic force, so that the angle of pivoting operation of the tip end of wing 4 in the direction vertical to transmission axis 33 (so called trailing edge) is made larger than the angle of pivoting operation (angle β of FIG. 47) of transmission shaft 33.

Figure 57:
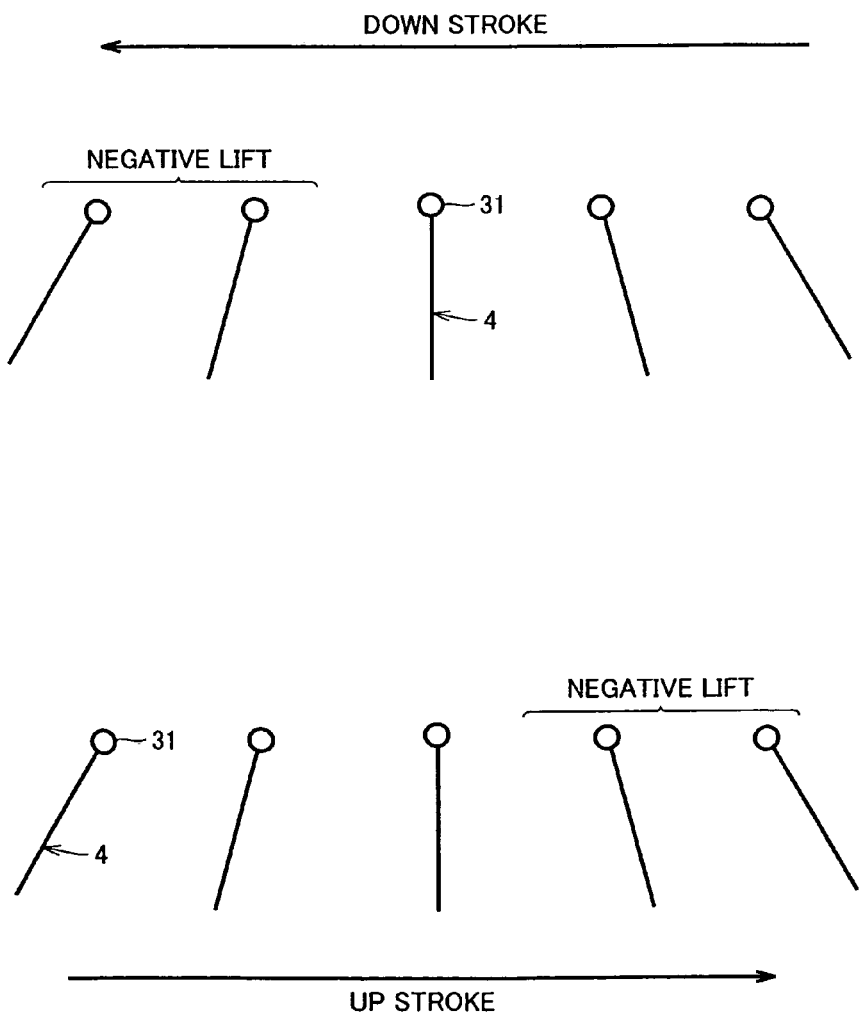
FIG. 57 is a schematic illustration representing wing behavior when a wing as a rigid body in accordance with the third embodiment pivots with one degree of freedom.

The wing as a rigid body shown in FIG. 57 leads to a problem that a negative lift force is generated. When wing 4 is passively deformed, however, the problem of negative lift force can be eliminated.

The inventors conducted an experiment in which transmission shaft 33 was pivoted by about ±30° (pivoting operation with angle β of FIG. 47) at opposite ends of the in-plane motion (pivoting operation represented by angle α in FIG. 47) of rising and moving apparatus in accordance with the present embodiment. Consequently, it was found that because of passive deformation of wing 4, at a position further from transmission shaft 33 than the central portion of wing 4, wing 4 is pivoted by about ±80°. Further, by the flapping motion of wing 4 of rising and moving apparatus 1 used in the experiment, it is possible to obtain the lift force equivalent to the motion of wing 4 shown in FIG. 52. The behavior of wing 4 at this time is shown in a cross section in FIG. 54.

Figure 53:
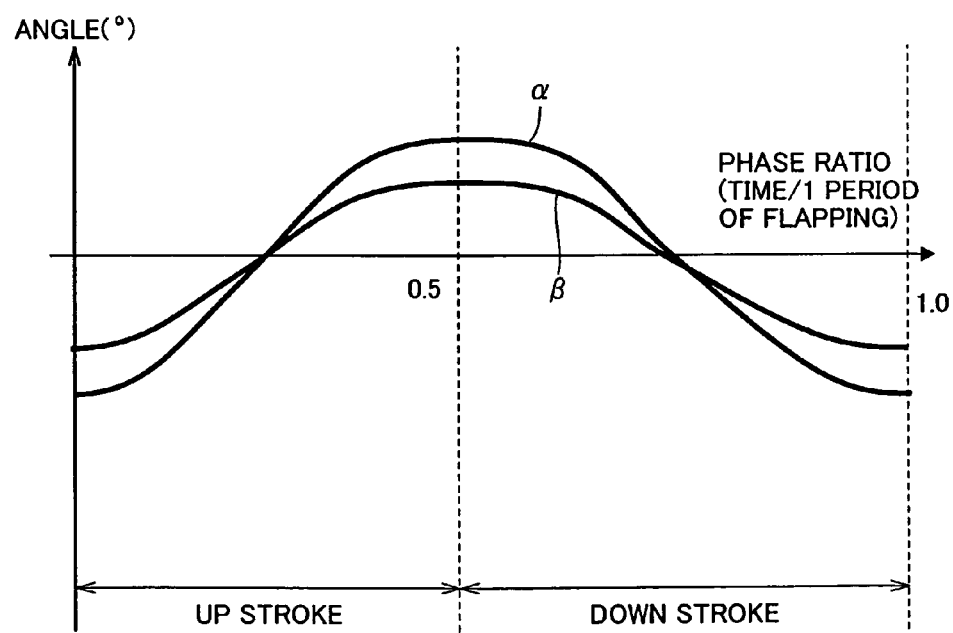
FIG. 53 is a graph representing relation between time and angle of the wing of the rising and moving apparatus in accordance with the third embodiment.

When the angle of pivoting operation of actuator 2 to cause the in-plane motion of transmission shaft 33 is represented by α and the angle of pivoting operation of wing obtained by the pivoting operation of transmission shaft 33 is represented by β, the relation between α and β is as shown in FIG. 53.

(Requirement for Rising)

Figure 54:
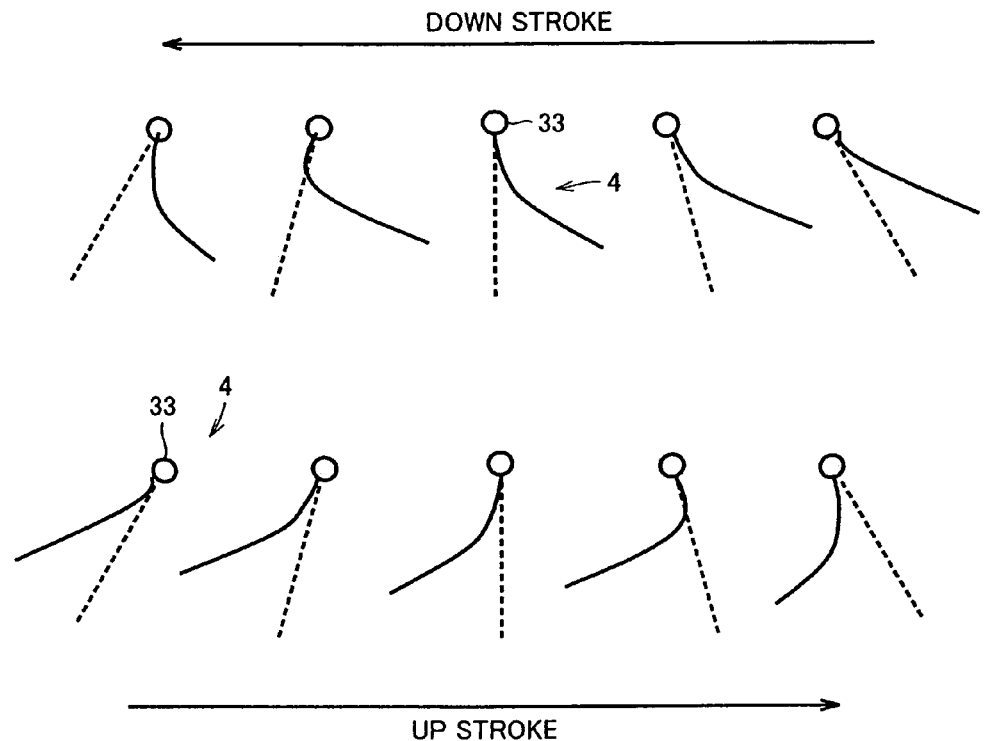
FIG. 54 is a schematic illustration representing wing behavior of the rising and moving apparatus in accordance with the third embodiment.

According to the experiment by the inventors, the maximum value of the lift force generated by the motion of wing 4 shown in FIG. 54 is about 0.13 gf per one wing. Further, driving torque of actuator 2 necessary to attain the lift force is about 1 gf·cm at most.

Wing 4 has a mass of about 5 mg. Transmission shaft 33 has a mass of about 3 mg. Pinion gear 34 has a mass of about 2 mg. Rack gear has a mass of about 6 mg. Actuator 2 has a mass of about 80 mg.

Rising and moving apparatus 1 can rise when the total weight of support structure 9, control apparatus 5 and power source 6 is 68 mg or smaller.

It is possible to attain 5 to 10 mg as a total of support structure 9 and control apparatus 5 of rising and moving apparatus 1, by adopting structures such as ① to ③ below. ① The power of power source 6 is transmitted by radio wave. ② Converter for the radio-transmitted power and the control apparatus 5 are integrated on one chip. ③ The one chip is packed on support structure 9.

Further, efficiency of actuator 2 can be improved through technical innovation. Therefore, rising and moving apparatus 1 in accordance with the present embodiment can be realized.

(Method of Flight Control)

Next, a method of controlling flight will be described. In order to move high and low in a three-dimensional space by flapping flight, it is necessary to realize three motion elements, that is, forward/backward movement, left/right turn, and upward/downward movement. In the following, a method of controlling flight that realizes each of the motion elements and hovering as a basic operation therefor will be described.

(Hovering)

The rising and moving apparatus in accordance with the present embodiment is capable of hovering by the manner of flapping shown in FIG. 53. Pinion gear 34 and rack gear 35 are designed to have such shapes that realize the motion shown in FIG. 53 when actuator 2 moves transmission shaft 33 by ±45° (pivoting operation with angle α in FIG. 47) in forward/backward direction, in the absence of any movement of rack gear 35 by the function of rack gear moving mechanism 36.

Therefore, when left and right transmission shafts 33 reciprocate with the amplitude of ±45° forward and backward of a center line that is a phantom line extending straight in the left/right direction (direction of extension of a line that connects central points of pivoting of left and right actuators 2) of rising and moving apparatus 1, hovering is realized.

(Forward and Backward Movement)

By the movement of ±45° in forward/backward direction (pivoting operation with angle α in FIG. 47) of wing 4 described above, at wing 4, a flow such as shown in FIG. 55 is generated that goes from the side of actuator 2 to the tip end of wing 4, in addition to the vertically downward flow. By utilizing this flow, it is possible to move the rising and moving apparatus 1 forward and backward.

By way of example, the central position of amplitude of the in-plane motion of the tip end of transmission shaft 33 in the forward/backward direction is shifted to the front or rear side while maintaining the relative relation of engagement between pinion gear 34 and rack gear 35 by rack gear moving mechanism 36 as describes above. Thus, the reciprocating motion of wing 4 in the forward/backward direction is biased to the front or rear side. As a result, the flow from the side of actuator 2 to the tip end of wing 4 can be directed to the front side or rear side of rising and moving apparatus 1. Therefore, rising and moving apparatus 1 can obtain a force to move backward or forward.

Figure 55:
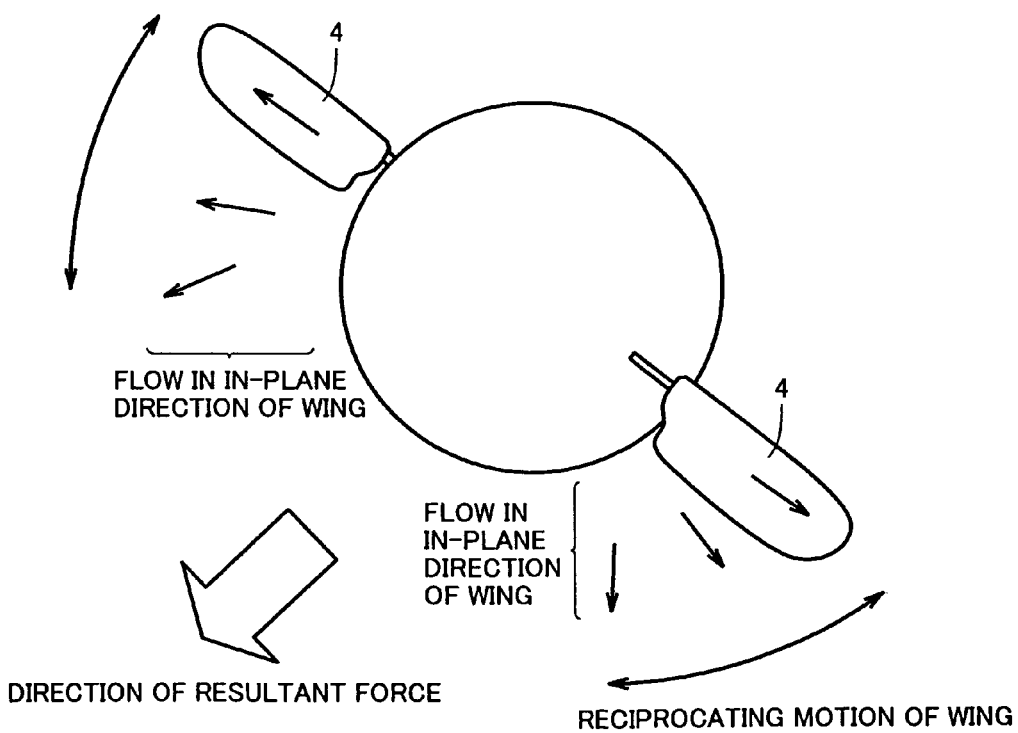
FIG. 55 is a schematic illustration representing a method of controlling direction of the rising and moving apparatus in accordance with the third embodiment.

Rising and moving apparatus 1 moves forward when it flaps such that the flow from the root to the tip end of wing 4 is directed to the rear side of rising and moving apparatus 1 equally at both left and right wings. Rising and moving apparatus 1 moves backward when it flaps such that the flow from the side of actuator 2 to the tip end of wing 4 is directed to the front side of rising and moving apparatus 1 equally at both left and right wings. The manner is as shown in FIG. 55.

(Left/Right Turn)

Further, by using the flow from the side of actuator 2 to the tip end side of wing 4 at the surface of wing 4, it is possible to turn the rising and moving apparatus 1 to the left or to the right.

By way of example, when the flow from the side of actuator 2 to the tip end of wing 4 is directed backward only at the left wing 4, rising and moving apparatus 1 turns to the right while moving forward. On the contrary, when the flow from the side of actuator 2 to the tip end of wing 4 is directed backward only at the right wing 4, rising and moving apparatus 1 turns to the left while moving forward.

Further, when the flow from the side of actuator 2 to the tip end of wing 4 is directed forward only at the left wing 4 and the flow from the side of actuator 2 to the tip end of wing 4 is directed backward at the right wing only, rising and moving apparatus can rotate at the site in counterclockwise direction when viewed from above.

(Upward/Downward Movement)

The simplest method of upward/downward movement is to increase or decrease flapping frequency by changing the manner of driving actuator 2.

Other than the method mentioned above, a method may be used as the method of upward movement in which the stroke (amplitude) of flapping, that is, the amplitude of in-plane motion of transmission shaft 33, is increased.

When the amplitude of in-plane motion of transmission shaft 33 (distance of movement represented by the angle α in FIG. 47) is increased by increasing the amplitude of pivoting operation of actuator 2, there arises a problem that pinion gear 34 moves exceeding the width of rack gear 35. In order to solve this problem, it is necessary to move rack gear 35 appropriately along with the movement of pinion gear 34 (movement represented by the angle α in FIG. 47).

Specifically, when the amplitude of pivoting operation of actuator 2 is enlarged, by the function of rack gear 36, rack gear 35 is moved in the same direction as the direction of in-plane motion of transmission shaft 33, by a distance corresponding to the increase in amplitude of the in-plane motion of transmission shaft 33. By way of example, assume that the angle of pivotal operation of actuator 2 is changed from ±45° to ±55°. Here, by the function of rack gear moving mechanism 36, rack gear 35 is moved by ±10° about the central axis of pivoting operation of actuator 2. Here, the angle of movement of rack gear 35 corresponds to the difference in the angle of pivoting operation of actuator 2 before and after the change.

Fourth Embodiment

A rising and moving apparatus in accordance with the fourth embodiment will be described with reference to FIGS. 58 to 80.

In the description of the rising and moving apparatus in accordance with the fourth embodiment, characteristics of wing 904 of rising and moving apparatus 90 described above will not be discussed. However, it is assumed that, actually, characteristics of wing 904 described above are incorporated in wings 31 and 32 in accordance with the present embodiment, as in the rising and moving apparatus in accordance with the third embodiment.

In the rising and moving apparatus in accordance with the fourth embodiment described in the following, a flapping operation different from the flapping operation of the rising and moving apparatus in accordance with the third embodiment will be described as an example. In the rising and moving apparatus in accordance with the fourth embodiment, an actuator with three degrees of freedom is provided, and hence, it is possible to realize the same flapping operation as the rising and moving apparatuses in accordance with the first and third embodiments. Specifically, in the rising and moving apparatus in accordance with the present embodiment, the wing shaft may be reciprocated (pivoted) in forward/backward direction and the wing shaft may be pivoted about a central axis of rotation along the direction of extension of the wing shaft. Therefore, the rising and moving apparatus of the present embodiment is capable of attaining rotational lift as in the rising and moving apparatuses in accordance with the first and third embodiments, capable of wake capture and capable of efficiently utilizing delayed stall.

(Main Configuration)

First, main configuration of the rising and moving apparatus in accordance with the fourth embodiment will be described. Referring to FIG. 58, a right actuator 21 and a left actuator 22 are fixed on an upper portion of a support structure 1. A right wing 31 is attached to right actuator 21, and a left wing 32 is attached to left actuator 22.

Actuators 21 and 22 allow wings 31 and 32 attached thereto to rotate with three degrees of freedom, approximately about the fulcrums of the actuators. Rotation of each of the actuators 21 and 22 is controlled by a control circuit 4 mounted on support structure 1.

Desirably, support structure i is sufficiently light weight, while assuring mechanical strength. For the support structure 1 of the rising and moving apparatus, polyethylene terephthalate (PET) mold to an approximately spherical shell is used.

An acceleration sensor 51 and an angular acceleration sensor 52 are mounted on support structure 1. Results of detection by sensors 51 and 52 are transmitted to control apparatus 4. Control apparatus 4 detects the state of flight of the rising and moving apparatus, based on the information transmitted from acceleration sensor 51 and angular acceleration sensor 52. Then, control apparatus 4 determines driving of left and right actuators 21 and 22, in accordance with the target position and attitude at that time.

The left and right actuators 21, 22, control apparatus 4, acceleration sensor 51 and angular acceleration sensor 52 are driven by a current supplied by a power source 6. The center of gravity of the rising and moving apparatus is positioned lower than the point of application of the force exerted by the fluid on the wing, to the actuator.

(Actuator)

As the actuators 21 and 22, one using a piezo-electric element is desired, as it has large activation torque, ensures reciprocating operation and has a simple structure. Such an actuator is referred to as an ultrasonic motor, and is driven by a progressive wave generated by the piezo-electric element.

Figure 59:
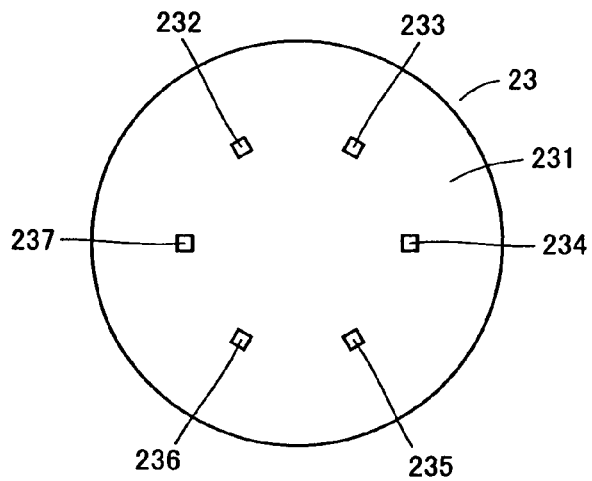
FIG. 59 is a plan view showing an ultrasonic motor of an actuator used for the flapping rise and movement in accordance with the fourth embodiment.
Figure 60:
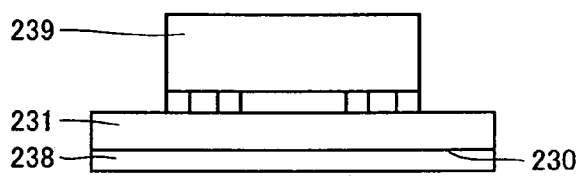
FIG. 60 is a side view showing the ultrasonic motor of the actuator used for the flapping rise and movement in accordance with the fourth embodiment.
Figure 61:
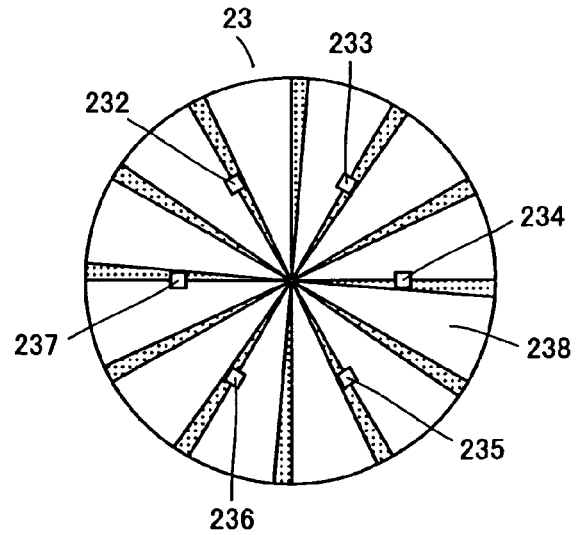
FIG. 61 is an illustration representing an operation of the ultrasonic motor shown in FIGS. 59 and 60, of the rising and moving apparatus in accordance with the fourth embodiment.

FIGS. 59 and 60 represent a commercially available ultrasonic motor 23. Referring to FIGS. 59 and 60, a piezo-electric element 230 is adhered on a lower surface of an aluminum disk 231. Further, a plurality of projections 232 to 237 are provided on an upper surface of disk 231. Projections 232 to 237 are arranged at positions of vertexes of a regular hexagon, of which center of gravity is the center of disk 231.

On the lower surface of piezo-electric element 230, electrodes 238 divided into 12 along the circumferential direction are arranged. Every other electrode 238 is electrically short-circuited. A voltage is applied, with the disk 231 being the reference, to each electrode 238. Therefore, voltages of two different phases are applied to the piezo-electric element 230, as represented by the hatched and non-hatched portions in FIG. 61.

By changing with time the voltage to be applied to each electrode 238, a progressive wave is generated on disk 231, so that tip end portions of projections 232 to 237 perform elliptic motion, which enables rotation of circular rotor 239 about the center of the circle. The stator 210 of the ultrasonic motor consists of disk 231, projections 232 to 237 and electrodes 238.

The ultrasonic motor 23 has the torque of 1.0 gf·cm, rotation speed with no-load of 800 rpm and maximum current consumption of 20 mA. The diameter of disk 231 is 8 mm. Projections 232 to 237 are arranged at an interval of 2 mm. The thickness of the disk 232 is 0.4 mm. The height of projections 232 to 237 is about 0.4 mm. Driving frequency of piezo-electric element 230 is 341 kHz.

Figure 62:
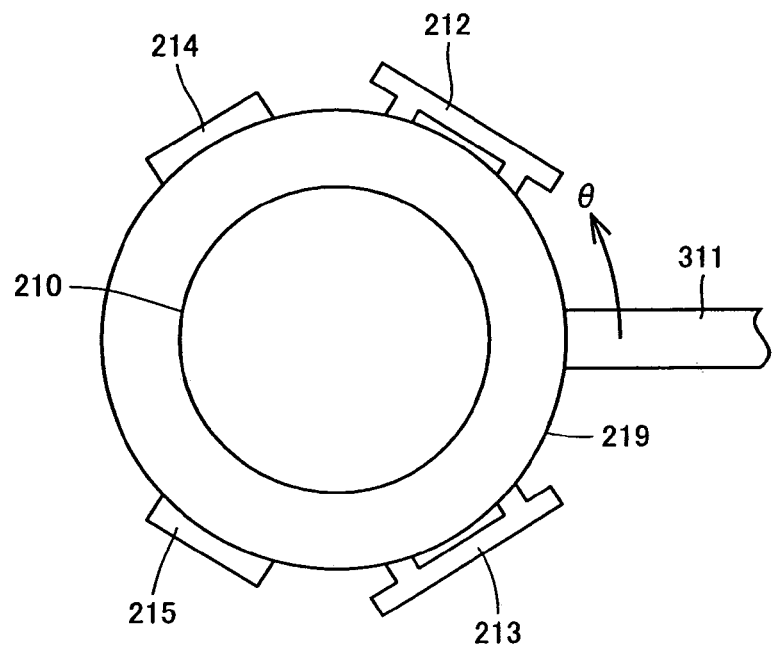
FIG. 62 is a first illustration representing an arrangement of an actuator used for the rising and moving apparatus in accordance with the fourth embodiment.
Figure 63:
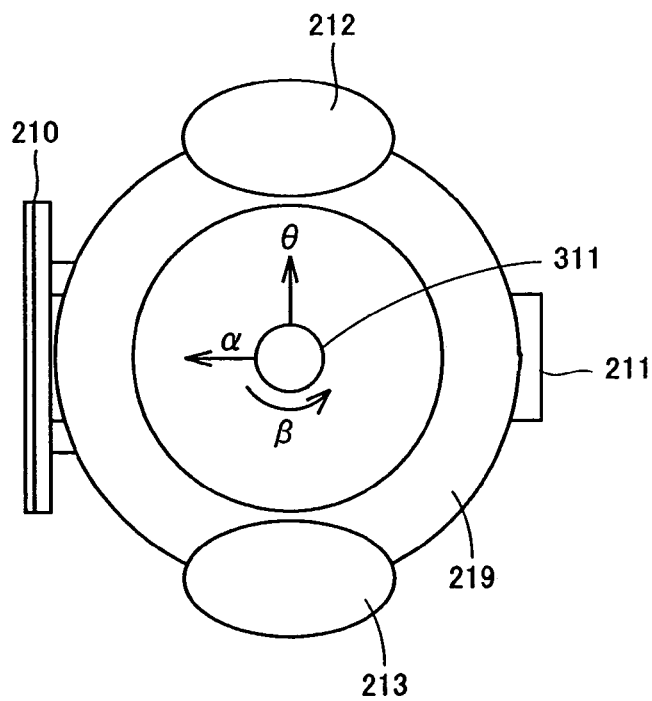
FIG. 63 is a second illustration representing an arrangement of an actuator used for the rising and moving apparatus in accordance with the fourth embodiment.

In the present rising and moving apparatus, an actuator is formed utilizing the ultrasonic motor. As shown in FIGS. 62 and 63, in the right actuator 21, for example, a spherical shell shaped rotor 219 is pinched and held by such a stator 210 and a bearing 211. That portion of stator 210 which is in contact with rotor 219 is processed to conform to the surface of rotor 219.

Rotor 219 is of a spherical shape having an outer diameter of 3.1 mm and an inner diameter of 2.9 mm. A right wing main shaft 311 is attached to a surface portion of rotor 219. When rotor 219 rotates clockwise to the surface of stator 210 having the projections thereon, the right wing main shaft 311 moves in the direction of θ shown in FIG. 63. Here, the rotation clockwise to the surface of stator 210 having projections is referred to as forward rotation, and counter-clockwise rotation will be referred to as backward rotation.

As shown in FIGS. 62 and 63, in order to drive rotor 219 with three degrees of freedom, an upper auxiliary stator 212, a lower auxiliary stator 213 and bearings 214 and 215 are further provided around rotor 219. The size of each of upper auxiliary stator 212 and lower auxiliary stator 213 is about 0.7 times that of stator 210.

Though stators 210, 212 and 213 are not arranged to be orthogonally crossing with each other with the rotor 219 therebetween, the stators 210, 212 and 213 can cause mutually independent rotation of rotor 219. By combining respective rotation motions, it is possible to drive rotor 219 with three degrees of freedom.

For example, by causing rotation in negative direction of rotor 219 by upper auxiliary stator 212 and generating rotation in negative direction by lower auxiliary stator 213, it is possible to rotate rotor 219 in the direction β. By causing rotation in the opposite direction of rotor 219 by upper auxiliary stator 212 and rotation in the opposite direction by lower auxiliary stator 213, it is possible to rotate rotor 219 in the direction α.

Actually, combining two rotations of different centers of rotation to be executed by rotor 219 will lower efficiency of the ultrasonic motor, because of friction between the rotor and the stator. Therefore, it is desirable to adopt such a manner of driving that the upper auxiliary stator 212 and the lower auxiliary stator 213 are operated alternately with a very short period. This prevents the projection of the stator that is not in operation from contacting rotor 219. Thus, decrease in efficiency of ultrasonic motor caused by the friction between the rotor and the stator can be prevented.

Decrease in efficiency of ultrasonic motor can be prevented without the necessity of adding any element, by applying a voltage to every electrode of the stator that is not in operation, in the direction of contraction of the piezo-electric element.

The driving frequency of the piezo-electric element is at least 300 kHz. By contrast, the flapping frequency of the rising and moving apparatus is 100 kHz, at the highest. Therefore, the driving frequency of the piezo-electric element is sufficiently higher than the flapping frequency of the rising and moving apparatus. Therefore, even when the actuators are operated alternately, the right wing main shaft 311 can move substantially smooth.

The stator of the actuator having three degrees of freedom described above has been implemented and available. Further, bearings and the like used for the actuator that are applicable to the rising and moving apparatus described above have already been practically implemented in the field of compact information equipments such as disk drives or in the field of space components.

As the amplitude of the progressive wave generated by the stator is in the order of submicrons, it is necessary that the rotor has the sphericity of this order. Processing accuracy of a paraboloidal mirror used in civil optical products is about one eighth of the optical wavelengths, that is, at most 70 nm in optical products used for visual range, and processing accuracy of optical components used for optical interferometer is about one hundredth of the optical wavelengths, that is, in the order of several nm. Therefore, it is possible to form a rotor having the sphericity of sub micron order by existing processing method.

In this manner, an actuator can be formed that has characteristics comparable to that of a commercially available ultrasonic motor and can realize motion (rotation) of three degrees of freedom.

It should be understood, however, that the one described with reference to FIGS. 59 to 63 is only an example of an actuator realizing motion with three degrees of freedom of the wing implemented by an ultrasonic motor. Arrangement, size, material and the method of driving various components of the rising and moving apparatus of the actuator are not limited to those described with reference to FIGS. 59 to 63, provided that physical function (such as torque) required of the flapping flight can be realized.

(Wing and Flapping Operation)

As described above, the wing and the flapping operation of the rising and moving apparatus in accordance with the present embodiment is different from the wing and the flapping operation of the rising and moving apparatus in accordance with the first embodiment. Here, the wing and its operation will be described as an example illustrating the flapping operation that is realized by the actuator with three degrees of freedom described above. Therefore, when the characteristics of the present embodiment is considered, it is necessary to appropriately replace the wing in accordance with the present embodiment with the wing in accordance with the first embodiment and to replace the flapping operation in accordance with the present embodiment with the flapping operation in accordance with the third embodiment.

Next, the wing and flapping operation will be described. For simplicity of description, a fixed coordinate system (x, y, z) is defined for the rising and moving apparatus as shown in FIG. 58. More specifically, approximately the center (spherical center) of the substantially spherical support structure 1 is regarded as the origin. Further, the direction of gravitational acceleration is regarded as the downward direction, and the opposite is regarded as the upward direction. The z axis is defined as extending from the origin to the upward direction.

Next, the direction coupling the center of the shape of right actuator 21 and the center of the shape of left actuator 22 is regarded as the left/right direction, and y axis is defined as extending from the origin to the left wing. Further, the x axis is defined as extending in the direction of vector product, in the right hand system of the y and z axes, from the origin. The positive direction along the x axis is referred to as forward, and the negative direction along the x axis is referred to as backward.

FIG. 58 shows the rising and moving apparatus, the center of gravity O of which is positioned on a line extended downward in the direction of gravitational acceleration from a midpoint A0 between the point of application A1 of right actuator 21 of right wing 31 and the point of application A2 of left actuator 22 of left wing 32.

In the rising and moving apparatus described above, the rotor 229 of left actuator 22 is substantially spherical, and the left wing 32 is arranged such that the spherical center of rotor 220 is positioned on a line extended from the main shaft 321. The point of application A2 of left actuator 22 and the fulcrum of rotating motion of main shaft 321 correspond to the spherical center. The same applies to right actuator 21.

In the following, it is assumed that the x, y and z axes described above constitute a unique coordinate system for the rising and moving apparatus fixed on the support structure 1.

Different from the coordinate system fixed for the rising and moving apparatus, x', y' and z' axes are defined as space coordinates fixed in the space and having an arbitrary point as the origin, as shown in FIG. 58. Thus, the coordinates of the space in which the rising and moving apparatus moves can be represented by the coordinates of x', y' and z' axes, respectively, while the coordinates unique to the rising and moving apparatus can be represented by the coordinates of x, y and z axes, respectively.

Figure 64:
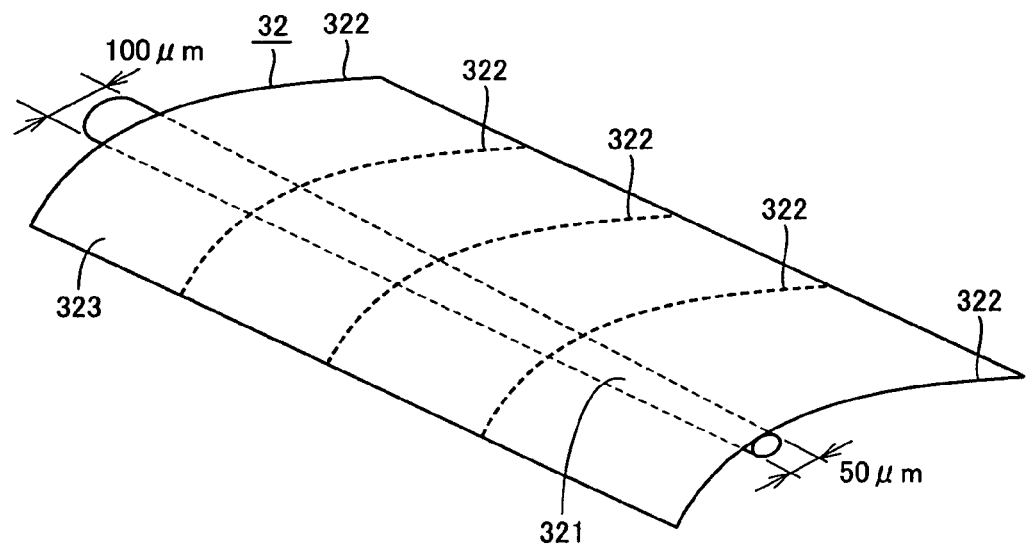
FIG. 64 is an enlarged perspective view representing a wing of the rising and moving apparatus in accordance with the fourth embodiment.

The wing structure will be described in the following. Referring to FIG. 64, left wing 32, for example, is formed by spreading a film 323 over a support member having a main shaft 321 and branches 322. Main shaft 321 is arranged at a position closer to the front of left wing 32 from approximately the center of left wing 32. Branches 322 are made thinner toward the tip end portions.

Left wing 32 has a convex cross sectional shape. Thus, at left wing 32, high stiffness is obtained against the force exerted by the fluid especially in a down stroke. In order to reduce weight, main shaft 321 and branches 322 have hollow structure, and main shaft 321 and branches 322 are formed of carbon graphite. Film 323 has initial stress in a direction of contraction in its plane, so as to enhance stiffness of the entire wing. This stress serves to enhance the stiffness of the wing as a whole.

The diameter of main shaft 321 of the wing used for the experiment by the inventors was 100 μm at the root supported by support structure 1 and 50 μm at the tip end. The main shaft 321 is tapered, that is, made thinner from the root to the tip end portion. Film 323 is of polyimide, of which size is about 1 cm in the forward/backward direction, about 4 cm in the left/right direction, and the thickness was about 2 μm.

In left wing 32 shown in FIG. 64, main shaft 321 is enlarged in its thickness, for easier description. The right wing 31, not shown, is attached to the support structure to be mirror-symmetry with the left wing 32, with the xz plane at the center.

The flapping operation of the wing will be described with reference to the left wing 32 as an example. Left actuator 22 is capable of rotating left wing 32 with three degrees of freedom. Namely, the state of driving (flapping state) of left wing 32 can be represented as the attitude of left wing 32. For the simplicity of description, in the following, the attitude of left wing 32 will be defined as follows, based on the state shown in FIG. 58.

Figure 65:
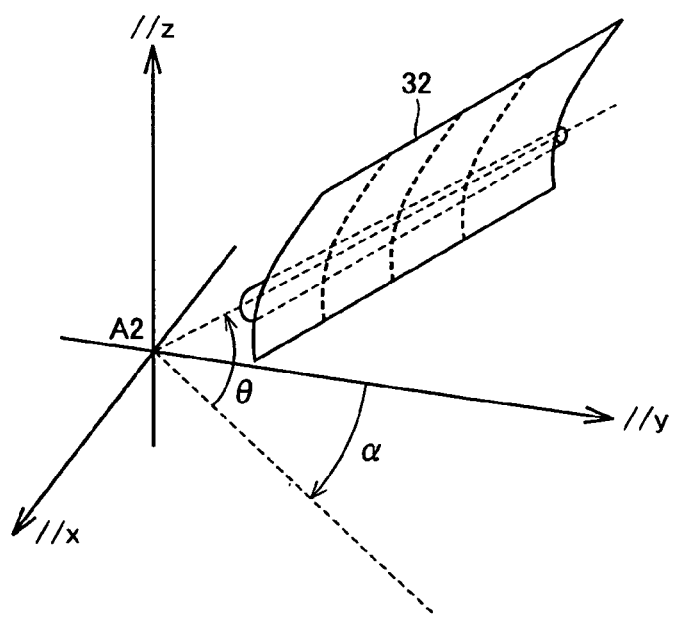
FIG. 65 represents stroke angle $\theta$ and declination $\alpha$ of the wing of the rising and moving apparatus in accordance with the fourth embodiment.

First, referring to FIG. 65, using a plane parallel to the xy plane and including a fulcrum of rotation motion of the main shaft (mechanical point of application A2) and axes (//x, //y) parallel to the x and y axes, respectively, as a reference, an angle formed by a line connecting the point A2 and the root of main shaft 321 of left wing 32 with that plane is referred to as a stroke angle θ of flapping. Further, using a plane parallel to the yz plane and including a fulcrum of the rotation motion of the main shaft (mechanical point of application A2) and axes (//y, //z) parallel to the y and z axes, respectively, as a reference, an angle formed by a line connecting the point A2 and the root of main shaft 321 of the left wing 32 and that plane is referred to as declination α.

At this time, the stroke angle θ is considered positive when it is above the plane parallel to the xy plane, and negative when it is below that plane. The declination α is considered positive when it is in front of the plane parallel to the yz plane and negative when it is behind.

Figure 66:
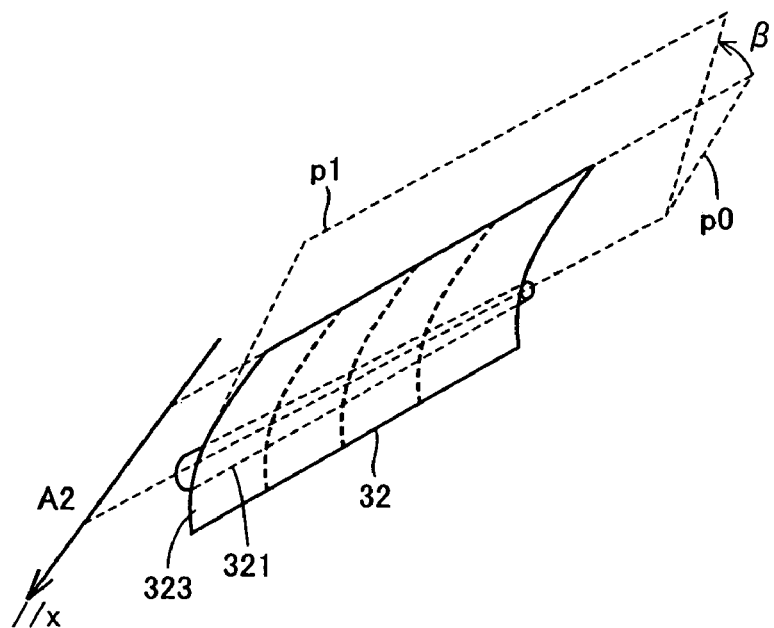
FIG. 66 represents torsion angle $\beta$ of the wing of the rising and moving apparatus in accordance with the fourth embodiment.

Referring to FIG. 66, an angle formed by a tangential plane p1 of film 323 at the root of main shaft 321 of left wing 32 forms with a plane p0 passing through the point A2 and including the axis (//x) parallel to the x axis and the main shaft 321 is referred to as torsion angle β. Here, the torsion angle β in the clockwise direction when viewed from the root to the tip end of main shaft 321 is considered positive.

(Method of Rising)

The method of rising of the rising and moving apparatus will be described in the following. For the simplicity of description, it is assumed that the external force acting on the rising and moving apparatus is only the force exerted by the fluid on the wing, that is, the fluid force, and the gravity (the product of mass of the rising and moving apparatus and gravitational acceleration) acting on the rising and moving apparatus. In this rising and moving apparatus also, for constant rising, the following relation must be satisfied in time average for one flapping operation:

(vertically upward fluid force acting on the wing)>
(gravity acting on the rising and moving apparatus).

Here, a method of increasing the fluid force for a down stroke to be larger than the fluid force for the up stroke, using the flapping method that is a simplification of flapping of an insect will be described. For simplicity of description, the behavior of the fluid and the force exerted thereby on the wing will be described, referring to the main components thereof. The magnitude of the lift force obtained by the flapping method and the gravity acting on the rising and moving apparatus will be described later.

As the fluid force in the direction opposite to the direction of movement of the wing acts on the wing, an upward fluid force acts on the wing in a down stroke, and a downward fluid force acts on the wing in an upstroke. Therefore, the flapping operation is controlled such that the fluid force for the down stroke is large and the fluid force in an upstroke is small. Thus, an upward fluid force is obtained by time average, in one flapping operation (a down stroke and an up stroke).

For this purpose, first, the wing should be moved downward such that the space in which the wing moves is maximized, in the down stroke, so that almost maximum fluid force acts on the wing. This is realized by the movement of the wing moved downward approximately vertical to the tangential plane of the wing. For the upstroke, the wing should be moved upward such that the volume of the space in which the wing moves is minimized, so that the fluid force acting on the wing is almost minimized. This is realized by the movement of the wing moved upward approximately along the curve of the wing cross section.

Figure 67:
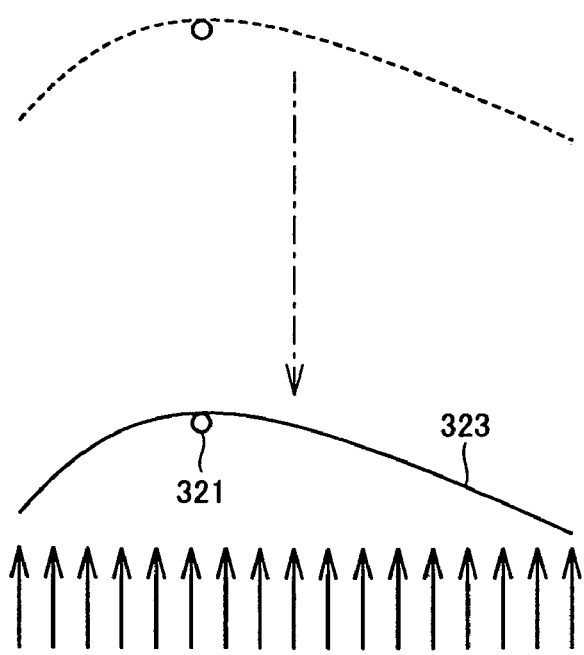
FIG. 67 represents a downstroke of the rising and moving apparatus in accordance with the fourth embodiment.

Such operation of the wing will be described with reference to a cross section vertical to the main shaft 321 of the wing. FIG. 67 shows a down stroke made to maximize the volume of the space in which the wing moves and FIG. 68 shows an up stroke made to minimize the volume of the space in which the wing moves.

Figure 68:
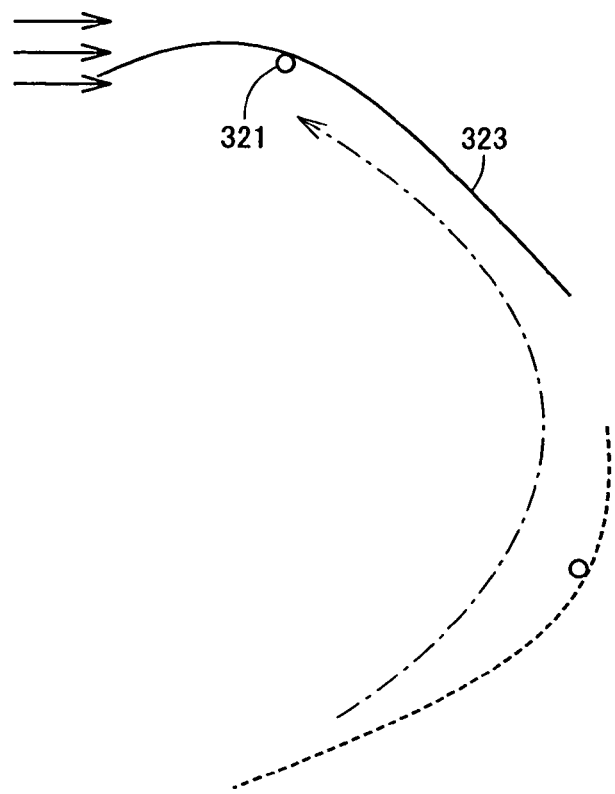
FIG. 68 represents an upstroke of the rising and moving apparatus of the fourth embodiment.

In FIGS. 67 and 68, the position of the wing before movement is represented by a dotted line, and the position of the wing after movement is represented by the solid line.

Further, the direction of movement of the wing is represented by a chain dotted arrow. Further, the direction of the fluid force acting on the wing is represented by solid arrows. As can be seen in FIGS. 67 and 68, the fluid force acts on the wing in the direction opposite to the direction of movement of the wing.

In this manner, the attitude of the wing is changed relative to the direction of movement of the wing such that the volume of the space in which the wing moves in the up stroke is made smaller than the volume of the space in which the wing moves in the down stroke, whereby the upward fluid force acting on the wing can be made larger than the gravity acting on the rising and moving apparatus, in time average of one flapping operation.

In the present rising and moving apparatus, the above described wing motion is realized by changing with time the torsion angle $\beta$ of the wing.

Figure 69:
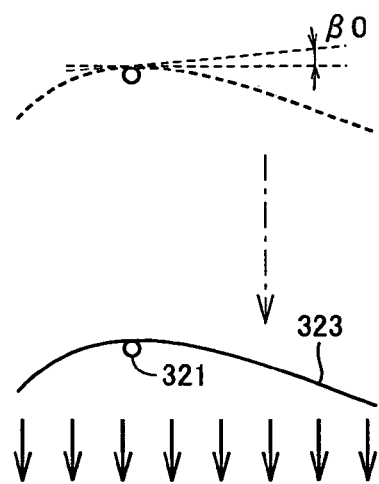
FIGS. 69 to 72 show the first to fourth states of the flapping operation of the rising and moving apparatus in accordance with the fourth embodiment.
Figure 70:
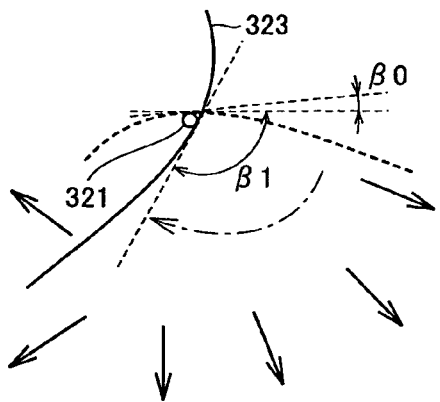
Figure 71:
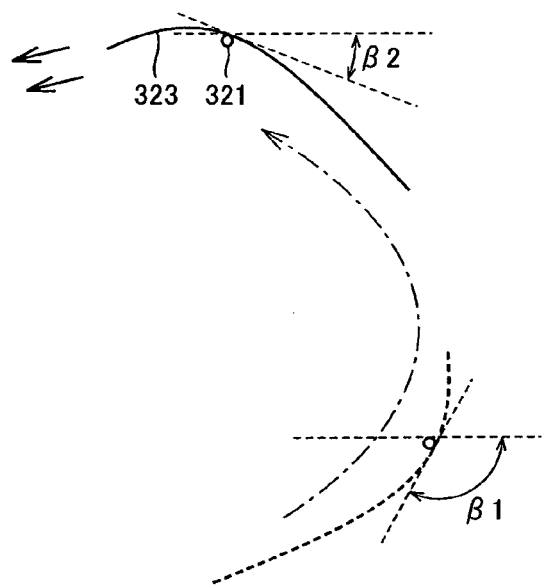

More specifically, the following steps S1 to S4 are repeated. First, in step S1, the wing is moved downward as shown in FIG. 69 (stroke angle $\theta=+\theta_0 \rightarrow -\theta_0$). In step S2, the wing rotation 1 operation (torsion angle $\beta$ of the wing=$\beta_0 \rightarrow \beta_1$) is performed as shown in FIG. 70. In step S3, the wing is moved upward as shown in FIG. 71 (stroke angle $\theta=-\theta_0 \rightarrow +\theta_0$, torsion angle $\beta=\beta_1 \rightarrow \beta_2$ (a motion along the curve of the wing cross section so as to maintain the fluid force minimum)). In step S4, wing rotation 2 operation (torsion angle $\beta$ of the wing=$\beta_2 \rightarrow \beta_0$) is performed as shown in FIG. 72.

When the fluid forces acting on the wing in steps S1 and S3 are time-averaged, upward fluid force is larger than the gravity acting on the rising and moving apparatus. It is desired that time average of the fluid forces acting on the wing in steps S2 and S4 is upward fluid force.

Figure 72:
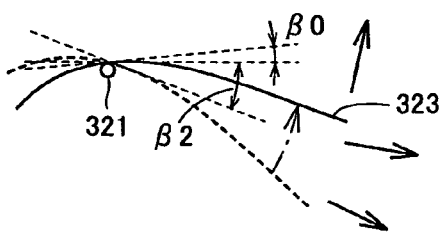

In the rising and moving apparatus, the center of rotation of the wing (the portion of main shaft 321) is positioned near a leading edge of the wing, as shown in FIGS. 69 to 72. More specifically, the length from main shaft 321 to the trailing edge of the wing is longer than the length from main shaft 321 to the front edge of the wing. Therefore, in the rotating operation of the wing, in addition to the flow of the fluid generated along the direction of rotation of the wing, a flow of the fluid is generated along the direction from the main shaft 321 to the trailing edge of the wing, as shown in FIGS. 70 and 72.

As a reaction of such flows of the fluid, forces opposite in direction to these flows act on the wing. As a result, in step S2 shown in FIG. 70, substantially upward fluid force is applied to the wing, and in step S4 shown in FIG. 72, mainly downward fluid force is applied to the wing.

In step S3 shown in FIG. 71, an up stroke is made with the torsion angle $\beta$ changed from $\beta_1$ to $\beta_2$ along the curve of the wing cross section. The angle of rotation of the wing in step S2 shown in FIG. 70 is larger than the angle of rotation of the wing in step S4 shown in FIG. 72. Therefore, in steps S2 and S4 also, the fluid force acting upward on the wing becomes stronger than the fluid force acting downward, and by time average, an upward fluid force acts on the wing.

In FIGS. 69 to 72, the attitude of the wing before movement in respective steps S1 to S4 is represented by the dotted line and the attitude after movement is represented by the solid line. The direction of movement of the wing in respective steps S1 to S4 is represented by the chain dotted arrow. The flow of fluid mainly generated in steps S1 to S4 is represented by solid arrows.

Figure 73:
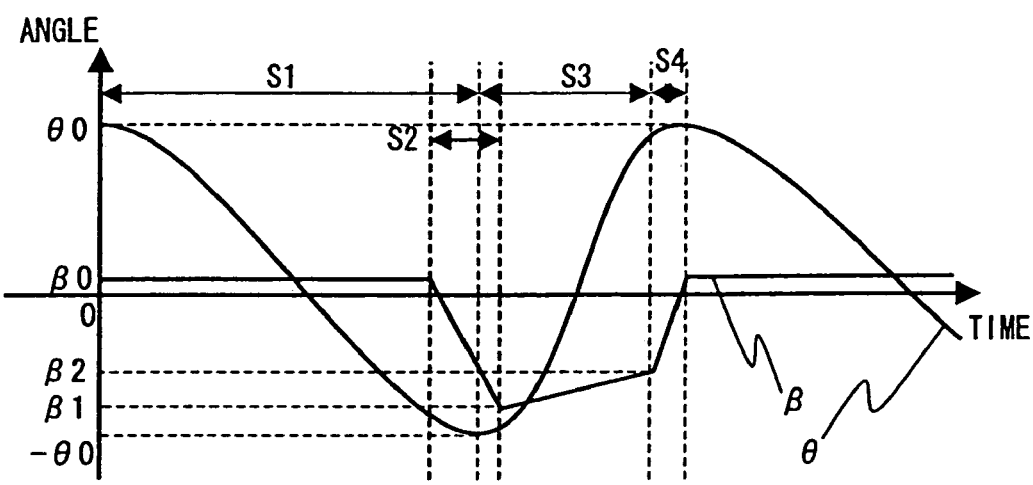
FIG. 73 is a first graph showing time dependency of stroke angle $\theta$ and torsion angle $\beta$ of the wing of rising and moving apparatus in accordance with the fourth embodiment.

FIG. 73 is a graph representing the values of stroke angle $\theta$ and torsion angle $\beta$ as functions of time. In FIG. 73, it is noted that the ratios of the ordinates for the stroke angle $\theta$ and torsion angle $\beta$ are different.

In the experiment performed by the inventors, $\theta_0$ is, for example, 60°. The value $\beta_0$ is, for example, 0°, $\beta_1$ is −120° and $\beta_2$ is −70°, for example.

In the description above, steps S1 to S4 are described as independent operations, for simplicity of description. An operation, however, is also possible in which the torsion angle of the wing is enlarged while the wing is moved downward in step S1.

Though description has been made with respect to the left wing, the same principle applies to the right wing. For the right wing, it is necessary to define the stroke angle $\theta$, declination $\alpha$ and torsion angle $\beta$ for the left hand system, which is in mirror-symmetry with respect to the xz plane. In the following, the upward fluid force acting on the wing is defined as lift force, and a forward fluid force acting on the wing is defined as propulsion.

(Method of Control)

The method of control enabling arbitrary motion of the rising and moving apparatus will be described next. Here, the stroke angle $\theta$, declination $\alpha$ and torsion angle $\beta$ based on the right hand system will be used for the left wing and the stroke angle $\theta$, declination $\alpha$ and torsion angle $\beta$ based on the left hand system are used for the right wing, to represent the attitude of the wings. Here, the left hand system and the right hand system are in mirror symmetry with respect to the xz plane.

(Control Flow)

The rise and movement by flapping is realized by the fluid force exerted on the wing. Therefore, what is directly controlled by the wing motion is acceleration and angular acceleration applied to the rising and moving apparatus.

Figure 78:
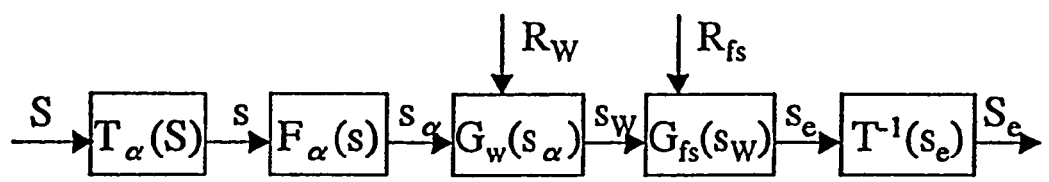
FIG. 78 is an illustration representing control functions for flapping rise control in accordance with the fourth embodiment.

First, it is assumed that S represents difference between the target state of rising and the present state of rising, T(S) is a function representing transform from the state of rising to acceleration and angular acceleration, s represents acceleration and angular acceleration, $F\alpha$ (s) represents a function of a control algorithm including sensor response of acceleration sensor 51 and angular acceleration sensor 53, s$\alpha$ represents actuator control amount, $G_W$ (s$\alpha$) is a function representing response of actuator and the wing, $s_w$ represents wing motion, $G_{fs}$ (sw) is a function representing acceleration or angular acceleration $s_e$ exerted on the rising and moving apparatus by the wing motion, and Se represents change in the state of rising attained by the series of processes. Here, the process through which an output Se is obtained from an input S is as shown in FIG. 78.

Actually, by the inertial force of the wing and the fluid, influences $R_W$ and $R_{fs}$ that depend on time history of the wing motion and the fluid motion so far are added to $G_W$ and $G_{fs}$, respectively.

(Division of Operation)

There is naturally a technique of accurately calculating all functions other than $F\alpha$ to calculate control algorithm $F\alpha$ which realizes S=Se. For this technique, time history of the fluid flow around the rising and moving apparatus and the wing motion is necessary, which means that a formidable amount of data and high speed of arithmetic operation are necessary. The behavior resulting from the link between the fluid and the structure is so complicated that in most cases, the response would be chaotic, and hence such a technique is impractical.

Therefore, a method in which basic operation patterns are prepared in advance, and the target flapping flight is realized by combining the basic operation patterns is desired, as it is simple.

A motion of an object includes three translational degrees of freedom in z, y and z directions, and three rotational degrees of freedom in $\theta_x$, $\theta_y$ and $\theta_z$ directions, that is, 6 degrees of freedom. Namely, object motion includes translational motions in forward/backward directions, left/right directions and upward/downward directions as well as rotations about x, y and z axes as central axes of rotation, respectively.

Among these, the translational motion in left/right direction can be realized by combining rotation in the $\theta_z$ direction and translational motion in the forward/backward direction. Therefore, here, the method of realizing translational motion in the forward/backward direction, that is, along the x axis, translational motion in the upward/downward direction, that is, along the z direction and rotational operations about the x, y and z axes will be described.

(Operation)

(1) Operation in the Upward/Downward Direction (Along the z Axis)

The force exerted by the fluid on the wing depends on the velocity of movement of the wing, and therefore, in order to increase (decrease) the upward fluid force acting on the wing, possible options include A: to increase (decrease) amplitude of stroke angle θ, and B: to increase (decrease) flapping frequency.

By such technique, the rising and moving apparatus may move upward (downward). Here, it is noted that the fluid force may have a negative value.

According to techniques A and B, the fluid force itself from the fluid to the wing increases. Therefore, as the fluid force is received by the wing from a direction other than the upward/downward direction, force for rising as well as force other than the force for rising act on the mechanical fulcrum of the wing. For example, when the apparatus is making a substantially uniform, forward linear motion and the flapping frequency is increased, the rising and moving apparatus moves upward as the velocity to the forward direction increased. In this manner, such a secondary motion occurs in the rising and moving apparatus depending on the manner of flapping at that time point.

Therefore, in the following, method of control in which manner of flapping is changed from the hovering state to other state will be described.

Further, the lift force changes when the volume of the space in which the wing moves is changed by changing the torsion angle β of the wing. For example, by setting an angle β such that the volume of the space in which the wing moves in an up stroke is larger or the volume of the space in which the wing moves in a down stroke is smaller, the time average of the upward fluid force acting on the wing becomes smaller.

Actually, the wing is not a rigid body and it deforms. Therefore, the volume of the space in which the wing moves differs even when the angle β is the same. The angle β, which is vertical to the direction of movement of the wing, provides the largest volume of the space in which the wing moves. Further, the angle β, which is parallel to the direction of movement of the wing, provides the smallest volume of the space in which the wing moves.

Here, secondary, the fluid force also acts in the direction vertical to the flapping. If the fluid force is of such a level that causes any problem in control, it becomes necessary to change wing motion to cancel such fluid force. It is realized, in the simplest manner, by changing the declination α.

It is also possible to perform the operation along the z axis by changing the rotational angular velocity of the wing in the above described step S2 or S4. For example, when the rotational angular velocity (−dβ/dt) of the wing is increased in step S2, downward fluid velocity of the fluid generated by the rotation increases, and the upward fluid force acting on the wing increases.

Here, the torque of which axis of rotation is the main shaft of the wing, which acts on the rising and moving apparatus, changes as a secondary result. Therefore, the change of the rotational angular velocity should desirably be performed within such a range in that the change of the torque does not affect control.

Further, here the force in the forward/backward direction acting on the rising and moving apparatus also changes as a secondary result. Therefore, if the change affects control, control of the force in the forward/backward direction that will be described later should desirably be performed simultaneously with the control for the change in rotational angular velocity.

(2) Operation in the Forward/Backward Direction (Along the x Axis)

In the above described method of flapping, the fluid force in the x direction acts on the wing mainly in steps S2 and S4. Therefore, by such a manner of flapping, the rising and moving apparatus rises while moving forward.

When the declination α is increased in a down stroke and the wing is moved forward, a backward fluid force will act on the wing. Therefore, when the backward fluid force acting on the wing in step S1, that is, in the down stroke, is made larger than the forward fluid force in the steps S2 and S4 by controlling declination α in step S1, the rising and moving apparatus moves backward, and when the backward fluid force is made smaller, the rising and moving apparatus moves forward. When these two forces are substantially balanced, the rising and moving apparatus can stand still in the forward/backward direction.

Especially when the rising and moving apparatus stands still in the forward/backward direction, the left and right wings perform substantially symmetrical motions and the gravity is balanced with the lift force acting on the rising and moving apparatus, hovering is possible.

The vertical component of the fluid force acting on the wing changes as a secondary result of the change in declination α. Therefore, it becomes necessary to add wing motion that cancels this fluid force, if the fluid force is of such a level that affects control of the rising and moving apparatus. This is mainly performed, in a simple manner, by the operation in the upward/downward direction described in item (1) above.

Further, when the angular velocity of rotational operation of the wing is increased in steps S2 and S4 described above, forward fluid force increases, and when it is decreased, the forward fluid force decreases. Thus, operation in the forward/backward direction of the rising and moving apparatus can be changed by this approach as well.

Further, it is possible to utilize the component in the x direction of the secondary fluid force associated with the change in torsion angle β of the wing described in item (1). More specifically, when β>0 in a down stroke, there is a forward force and when β<0, there is a backward force, that acts on the wing.

Though the relation between each of β, α and θ in an up stroke is limited to some extent, the above described fluid force control is also possible in step S3.

(3) Rotational Operation with z Axis being the Axis of Rotation

By performing the control in the forward/backward direction described in item (2) separately for the left wing and the right wing to be different from each other, a torque can be applied to the rising and moving apparatus.

More specifically, when the forward fluid force on the right wing is made higher than that of the left wing, the rising and moving apparatus turns to the left with respect to the positive direction along the x axis, and when it is made lower, the rising and moving apparatus turns to the right.

(4) Rotational Operation with x Axis being the Axis of Rotation

Similar to (3), when the upward fluid force of the right wing is increased to be larger than that of the left wing, the right side of the rising and moving apparatus is lifted and when it is made smaller, the left side is lifted. Thus, it is possible to have the rising and moving apparatus make a rotational operation about the x axis as the axis of rotation.

(5) Rotational Operation with y Axis being an Axis of Rotation

By changing the angular velocity of torsion angle $\beta$ of the wing described in (2), the torque about the y axis acting on the rising and moving apparatus can be changed. Thus, rotational operation about the y axis as the axis of rotation is possible. For example, when the rotational angular velocity of torsion angle $\beta$ in step S1 is increased, the nose of the rising and moving apparatus moves downward, and when it is decreased, the nose moves upward.

(6) Hovering

Figure 74:
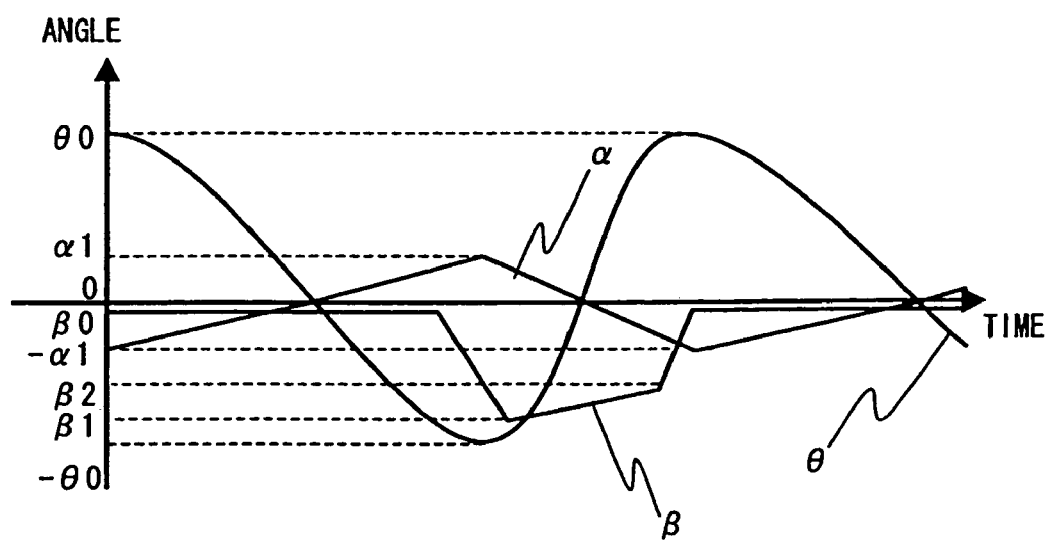
FIG. 74 is a second graph showing time dependency of stroke angle $\theta$ and torsion angle $\beta$ of the wing of rising and moving apparatus in accordance with the fourth embodiment.

FIG. 74 is a graph representing the values of the stroke angle $\theta$, declination $\alpha$ and torsion angle $\beta$ when the rising and moving apparatus is hovering, as functions of time. In FIG. 74, the ratio of coordinates of stroke angle $\theta$, declination $\alpha$ and torsion angle $\beta$ is different from each other.

In the experiment performed by the inventors, by way of example, $\theta_0$ is 60°, $\beta_0$ is −10°, $\alpha_1$ is 30°, $\beta_1$ is −100° and $\beta_2$ is −60°.

FIG. 79 represents motions of the left wing in respective steps and acceleration and angular acceleration generated by the motions at the mechanical fulcrum A2 of the left wing. It is noted, however, that rotational operation about the x and z axes as axes of rotation discussed in (3) and (4) above are not shown. These rotational operations are attained by asymmetrical motions of the left and right wings, as already described.

(Technique of Determining Control Method)

Figure 75:
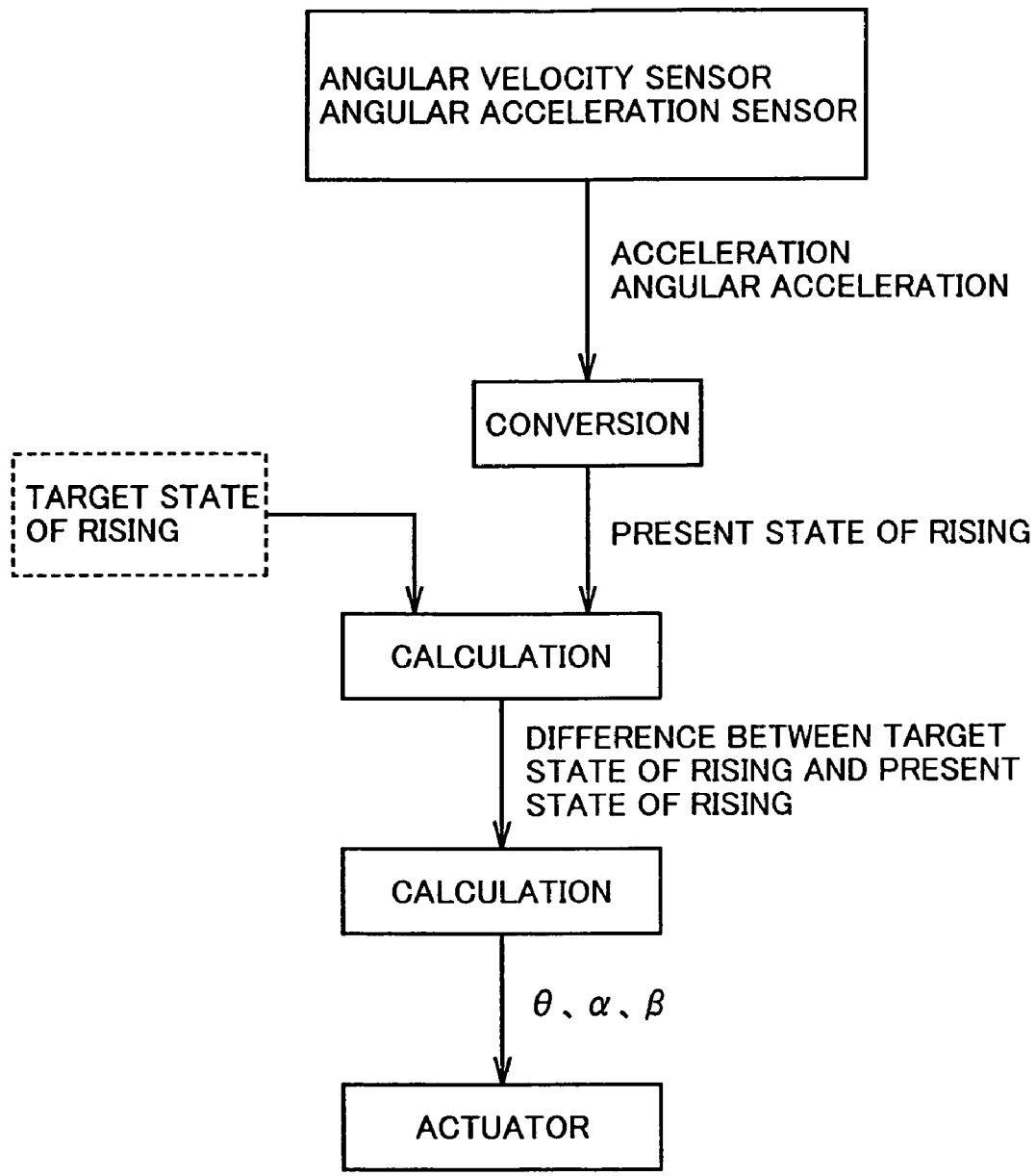
FIG. 75 is a flow chart representing data flow in the rising and moving apparatus in accordance with the fourth embodiment.
Figure 76:
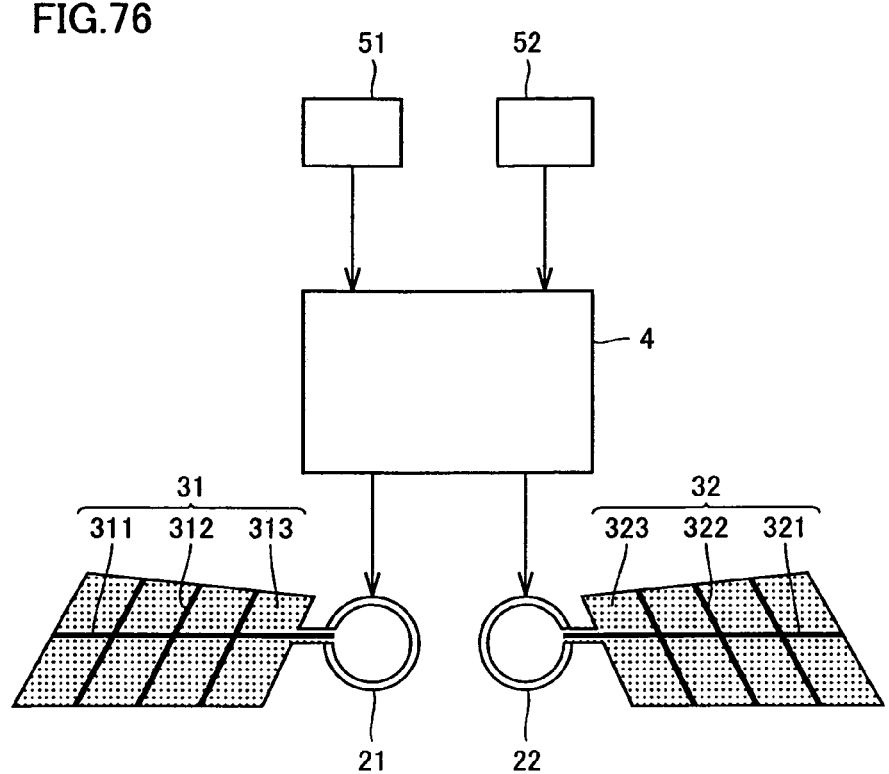
FIG. 76 is a block diagram representing main components of the rising and moving apparatus in accordance with the fourth embodiment.

The present state of rising is found by using values that are provided by appropriately changing the values obtained by acceleration sensor 51 and angular acceleration sensor 52 mounted on the rising and moving apparatus, as shown in FIGS. 75 and 76. For example, the velocity can be calculated by applying an initial value of velocity to a value obtained by time-integration of acceleration. The position can be calculated by applying an initial value of position to the value obtained by time-integration of velocity.

As shown in FIG. 75, control apparatus 4 determines the manner of flapping operation of the rising and moving apparatus based on the current state of rising obtained from acceleration sensor 51 and angular acceleration sensor 52 and the target state of rising. This control is in accordance with a conventional technique of control, except that the present control is in three dimensions.

The flapping operation of the rising and moving apparatus is converted by control apparatus 4 to driving of the actuators. This conversion may be realized at high speed when table reference is utilized or a table is used as complementation of data. For example, data representing basic operations of the rising and moving apparatus and data representing combinations of actuator driving manners that realize the operations should desirably be prepared in advance, as shown in FIG. 80.

In FIG. 80, the leftmost column represents target operation. In FIG. 80, A and B are listed in the column on flapping patterns, and A represents the pattern of flapping for forward movement and B represents the pattern of flapping for hovering. More specifically, FIG. 80 represents time-discrete time histories of $\alpha$, $\beta$ and $\theta$ represented in the graphs of FIGS. 73 and 74. Control apparatus 4 calculates which of the operations given in FIG. 80 is the target operation of the rising and moving apparatus.

Here, a technique in which the target operation of the rising and moving apparatus is once calculated and the target operation is converted to a manner of driving the actuator is used for convenience of description. It is also possible, however, to select the manner of driving of the actuator directly from the state of rising.

For static control of the rising and moving apparatus, for example, a technique is possible in which of any of the manners of driving the actuator described above or complementation thereof may directly be calculated.

Physical amount representing the state of rising of the rising and moving apparatus is not limited to the position, velocity, acceleration and the like mentioned above.

Further, the technique of determining the manner of driving actuator is not limited to those described above.

It is possible for the rising and moving apparatus to reach the target position while appropriate changes are made to the manner of driving the actuator, by the above described control method.

(Weight that can be Lifted)

In the rising and moving apparatus used by the inventors, stator 210 is comparable to ultrasonic motor 23. Therefore, the torque with respect to the motion in $\theta$ direction is 1.0 gf·cm. Therefore, the inventors calculated the fluid force when the apparatus flaps with the torque to the motion in $\theta$ direction, through simulation.

In the simulation, it is assumed that the size of the wing is a rectangular having longer side of 4 cm×shorter side of 1 cm. The longer side is in the direction away from the actuator. In the simulation, deformation of the wing was neglected. As the mass of wing of a dragonfly having the width of 8 mm and the length of 33 mm was about 2 mg, the mass of the wing is assumed to be 3 mg, based on the value.

The ultrasonic motor drives a rotor by a small elliptical motion at the tip end portion of the projections. Therefore, magnitude of rise and fall of the actual driving torque is in the order of the period of the elliptical motion, that is, the order of 100 kHz. However, because of limitation from calculation stability, it was assumed to be ±250 gf·cm/sec.

Figure 77:
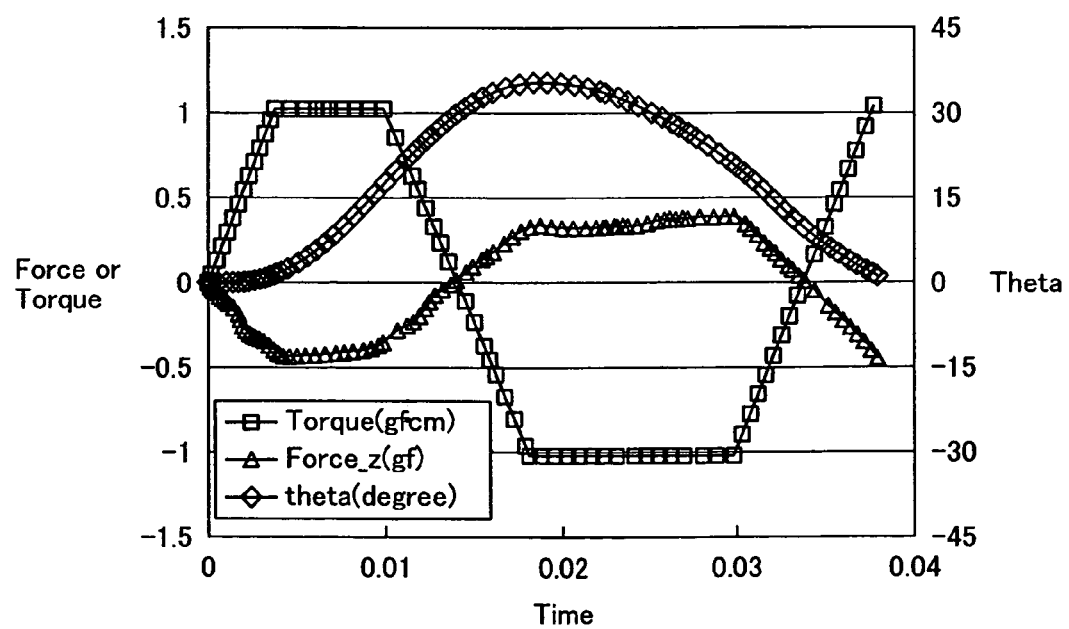
FIG. 77 is a graph showing change with time of flapping torque, wing movement (stroke angle $\theta$) and fulcrum reaction in accordance with the fourth embodiment.

One shorter side of the wing is fixed, leaving only the rotational degree of freedom, with this side being the axis of rotation, the torque is applied to the axis of rotation, and reaction on the axis of rotation was calculated. The result is as shown in FIG. 77. Here, declination $\alpha$ is 0° and torsion angle $\beta$ is also 0°.

Referring to FIG. 77, at time 0 sec, the wing is horizontal (stroke angle $\theta=0°$). The torque value is substantially linearly increased to 1 gf·cm from time 0 to 0.004 sec. From the time point 0.004 sec to 0.01 sec, the torque value is kept at 1 gf·cm. From 0.01 sec to 0.018 sec, the torque value is substantially linearly changed from 1 gf·cm to −1 gf·cm. From time point 0.018 sec to 0.03 sec, the torque value is kept at −1 gf·cm. From time 0.03 sec to 0.038 sec, the torque value is substantially linearly changed from −1 gf·cm to 1 gf·cm.

Time average of the fulcrum reaction during a down stroke obtained by the application of such a torque was about 0.29 gf. The period during the down stroke means that the time period in which the torque is negative, and more specifically, it is from the time point 0.014 sec to the time point 0.034 sec.

As the simulation provides the result of flapping motion with one degree of freedom, the action of the fluid force in an up stroke is unknown. It is noted, however that the downward fulcrum reaction acting in the up stroke is small, the time of action of the force is relatively short and that lift force can also be obtained by wing rotation or the like in addition to that down stroke. Therefore, it is considered possible to lift an object having the mass of about 0.29 g, by using an actuator having the torque of 1 gf·cm.

More specifically, when the mass of the entire rising and moving apparatus is made at most 0.58 g, the rising and moving apparatus can be lifted. The mass of the rising and moving apparatus will be considered in the following.

First, stator 210 is comparable to a disk having the specific gravity of 2.7, thickness of 0.4 mm and the radius of 4 mm, as the electrode and the piezo-electric elements are thin. Namely, the stator 210 has the mass of 0.054 g. The mass of the auxiliary stator 212, 213 is 0.019 g, as the diameter of the stator is 0.7 times the diameter of stator 210.

Three bearings are each a doughnut shaped ball bearing having the outer diameter of 4.2 mm, inner diameter of 3.8 mm and the thickness of 0.4 mm. The material of the bearing is titanium having the specific gravity of 4.8. As the bearing has an opening of about 30%, the mass of the bearing is about 0.013 g.

The material of rotor 219 is aluminum, and the rotor 219 has wall center radius of 3 mm and the thickness of 0.2 mm. Therefore, the mass of rotor 219 is about 0.061 g. When the mass of stator, mass of bearings and mass of rotor are totaled, the mass of actuator 21 is 0.192 g.

The mass of the wing is, as already mentioned, 0.003 g. As actuators 21 and 22 and wings 31 and 32 are provided respectively on the left and right portions of the rising and moving apparatus, the mass of these in the rising and moving apparatus as a whole will be 0.390 g.

Further, the support structure 1 of the rising and moving apparatus is a sphere having the diameter of 1 cm, specific gravity of 0.9 and the thickness of 0.1 mm. Therefore, the mass of support structure 1 is about 0.028 g.

Control apparatus 4, acceleration sensor 51 and angular acceleration sensor 52 are each formed by a semiconductor bare chip of 5 mm×5 mm, of which mass is about 0.01 g. Therefore, the total mass of control apparatus 4, acceleration sensor 51 and angular acceleration sensor 52 is about 0.03 g. The mass of the power source 6 mounted on the rising and moving apparatus is 0.13 g.

From the foregoing, the mass of the rising and moving apparatus is 0.578 g. The lift force obtained by one pair of wings is 0.58 gf. Therefore, the rising and moving apparatus can be lifted.

The weight power density as will be described below is required of the power source 6. First, the maximum power consumption by the left and right actuators of the rising and moving apparatus is, in total, 40 mA. Power supply voltage is 3V. As the weight of electrolyte is 0.1 g, the power source 6 must have the weight power density of 0.12 W/0.1 g, that is, 1200 W/kg.

A commercially available lithium ion polymer secondary battery, for example, has the weight power density of about 600 W/kg. This value is for a product having the weight of 10 g or heavier, used in an information equipment such as a portable telephone.

Generally, the ratio of electrode area with respect to the weight of electrolyte is in inverse proportion to the size of the power source. The power source 6 mounted on the rising and moving apparatus has the ratio of electrode area larger by ten times or more than the secondary battery used in an information equipment mentioned above. Therefore, power source 6 has about ten times the weight power density of such a secondary battery, and hence, can have the aforementioned weight power density. Assuming that the weight of electrolyte of power source 6 is about 0.1 g, the rising and moving apparatus is capable of a flight for about 7.5 minutes. Among fuel cells, some can attain higher weight power density than the lithium ion polymer secondary battery. Such cells may naturally be used, provided that the condition allowing flight such as mass is satisfied.

There is a concern of heat generated by the flapping operation of the wing. Assuming that the material for the actuator is aluminum and specific heat thereof is 0.215 cal/(g·° C.), the actuator has a mass of 0.192 g. Therefore, the increase in temperature is 0.35° C. when all the energy supplied to the actuator is converted to heat (energy conversion efficiency 0%), and 0.24° C. when 70% of the supplied energy is converted to heat.

Actually, the heat generated in the rising and moving apparatus will be radiated from the rising and moving apparatus. Consider an optical disc having the thickness of about 6 mm. When a surface of the optical disc is continuously irradiated with laser beam of about 6 mW, the temperature rises to about 100° C. in average in an elliptical area of about 1 μm×10 μm on the surface of the optical disc. At a position several μm deep from the surface, however, the temperature is almost as low as the ambient temperature of the optical disc.

Therefore, the energy of about 60 mW cannot even by 1° C. increase the temperature of an actuator in the order of millimeters.

(Others)

As shown in FIG. 58, polyethylene terephthalate (PET) formed substantially as a spherical shell has been described as an example of the support structure in the present embodiment. The material and shape of support structure 1, however, are not limited to these shown in FIG. 58. Further, the arrangement of actuators and shape of the wing are not limited to those shown in FIG. 58, provided that the performance of flapping flight is ensured.

Particularly, in the rising and moving apparatus, the center of gravity is positioned lower than the mechanical point of application of the wing so that the apparatus naturally assumes the attitude shown in FIG. 58, putting higher priority on stability. However, the difference in fluid force between the left and right wings necessary for attitude control becomes smaller when the position of the center of gravity matches the position of the mechanical point of application, and hence, the attitude of the rising and moving apparatus can be changed more easily.

In the rising and moving apparatus, sensors for detecting the position and attitude of the rising and moving apparatus are provided as an acceleration sensor and an angular acceleration sensor. The sensors are not limited to these, and any means may be used that can measure the position and attitude of the rising and moving apparatus.

For example, at least two acceleration sensors that can measure acceleration along three axial directions orthogonal to each other may be arranged at different positions of support structure 1, and based on two pieces of acceleration information provided by the two acceleration sensors, the attitude of the rising and moving apparatus may be calculated. Alternatively, a magnetic field distribution may be provided in the space in which the rising and moving apparatus moves, and the position and attitude of the rising and moving apparatus may be calculated by detecting the magnetic field distribution using a magnetic sensor.

Though sensors including acceleration sensor 51 and angular acceleration sensor 52 are shown as components separate from control apparatus 4, the sensors may be formed integrally with and on the same silicon substrate as control apparatus 4 by micromachining technique, in order to reduce weight.

Though the drive of the wing is open-loop controlled in the rising and moving apparatus, an angle sensor of the wing may be provided at the root of the wing, and closed loop control may be performed using the angle information obtained from the angle sensor.

Further, when the flow of the fluid in the space in which the apparatus rises is known and the rising is possible by a predetermined method of flapping, the sensors mentioned here are not essential.

Though the wing is directly driven by an ultrasonic element using progressive wave in the rising and moving apparatus, the structure for driving the wing and types of the actuator are not limited to those described above. For example, a rising and moving apparatus using a combination of an exoskeleton structure and a linear actuator such as disclosed in Japanese Patent Laying-Open No. 5-169567 may be possible.

Though electric power is used as the driving energy, it is possible to use internal combustion engine. Further, an actuator utilizing physiological oxidation-reduction reaction such as recognized in the muscle of insects may be used. The driving energy for the actuator may be externally obtained. For example, a thermister, electromagnetic wave or the like may be used for the electric power.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A flapping apparatus, comprising:
   a body;
   an elastically deformable wing portion associated with said body;
   a driving unit for driving said wing portion relative to said body;
   and a control unit controlling the manner of driving said wing portion by said driving unit, wherein
   (i) said control unit pivots said driving unit about a rotational axis such that during said pivoting of said drive unit a leading edge of said wing portion reciprocates in a forward and backward direction, and an angle of attack of said wing portion is reversed so as to generate rotational lift and wake capture,
   (ii) said leading edge has a greater rigidity than the remainder of said wing portion,
   (iii) said remainder of said wing portion can elastically deform when driven by said driving unit so as to generate a lift force to a degree that said flapping apparatus can hover,
   (iv) said angle of attack of said wing portion is smaller by virtue of said elastic deformation than an angle of attack of a similarly controlled rigid wing portion, and
   (v) said wing portion extends outwardly from said body in a wing span direction, and said leading edge includes a wave plate structure having at least one of ridge lines or valley lines extending along said wing span direction of said wing portion.

2. The flapping apparatus according to claim 1, wherein said wing portion has an upper side and a lower side, said upper side having a greater torsional rigidity or flexural rigidity than a torsional rigidity or flexural rigidity of said lower side.

3. The flapping apparatus according to claim 1, wherein said wing portion has a leading edge and a trailing edge, said leading edge having a greater torsional rigidity or flexural rigidity than a torsional rigidity or flexural rigidity of said trailing edge.

4. The flapping apparatus according to claim 1, wherein said wing portion has an upper surface and extends outwardly from said body in a wing span direction, said upper surface of said wing portion defining the wave plate structure comprising alternating ridge lines and valley lines extending along said wing span direction of said wing portion.

5. The flapping apparatus according to claim 1, wherein said leading edge extends outwardly from said body in a wing span direction, said leading edge portion defining the wave plate structure comprising alternating ridge lines and valley lines extending along said wing span direction of said wing portion.

6. The flapping apparatus according to claim 1, wherein said wing portion includes an upper side portion comprising a self-supporting member or a non-self-supporting member and an associated support structure, and a lower side portion comprising a self-supporting member or a non-self-supporting member and an associated support structure, and a thickness of said upper side portion of said wing portion is larger than a thickness of sad lower side portion of said wing portion.

7. The flapping apparatus according to claim 1, wherein said wing portion includes a front side portion comprising a self-supporting portion or a non-self-supporting portion and an associated support structure and a trailing side portion comprising a self-supporting portion or a non-self-supporting portion and an associated support structure, and a thickness of said front side portion of said wing portion is larger than a thickness of said trailing side portion of said wing portion.

8. The flapping apparatus according to claim 1, wherein said wing portion defines a first section adjacent to which a relative velocity of a surrounding fluid is high and a second section adjacent to which a relative velocity of said surrounding fluid is low, and an angle of attack of said first section of said wing portion to said surrounding fluid is smaller than an angle of attack to said surrounding fluid of said second section of said wing portion.

9. The flapping apparatus according to claim 1, wherein said wing portion defines a tip end furthest from said body and a root substantially abutting said body, and an angle of attack to a surrounding fluid at said tip end is smaller than an angle of attack to said surrounding fluid at said root.

10. The flapping apparatus according to claim 1, wherein said wing portion is rotatable about a prescribed center of rotation, and a flexural rigidity of a first section of said wing portion is greater than a flexural rigidity of a second section of said wing portion disposed further away from said prescribed center of rotation than said first section of said wing portion.

11. The flapping apparatus according to claim 1, wherein said wing portion is rotatable about a prescribed center of rotation, said wing portion comprises a self-supporting member or a non-self-supporting member and a support structure, and a thickness of said wing portion at a first section thereof is greater than a thickness of a second section of said wing portion disposed further from said prescribed center of rotation than said first section of said wing portion.

12. The flapping apparatus according to claim 1, wherein said wing portion is rotatable about a prescribed center of rotation and defines a first section and a second section, said second section being located further from said center of rotation than said first section, and a torsional rigidity of said first section is greater than a torsional rigidity of said second section.

13. The flapping apparatus according to claim 1, wherein said wing portion defines a trailing edge, a span direction extending outwardly from said body and an axis of rotation located along said span direction of the wing portion such that said axis of rotation-is positioned approximately midway between said leading edge and said trailing edge of said wing portion.

14. The flapping apparatus according to claim 1, wherein said wing portion has a lower surface, said control unit controls said driving unit such that said wing portion pivots upwardly and downwardly relative to said body in upward and downward strokes and during transitions between said upward and downward strokes said lower surface of said wing comes into contact with an upper portion of a vortex generated by the motion of said wing portion immediately before said transitions.

15. The flapping apparatus according to claim 1, wherein said wing portion defines a curved upper surface having a first center of curvature and a curved lower surface having a second center of curvature, and said control unit controls said driving unit such that said wing portion moves upwardly and downwardly relative to said body in upward and downward strokes such that elastic deformation of said wing portion occurs in a manner such that a direction of extension of an axis of rotation of a vortex generated during transitions between upward and downward strokes of said wing portion substantially matches a direction of extension of an axis connecting said centers of curvature of said upper and lower surfaces of said wing portion.

16. The flapping apparatus according to claim 1, wherein said wing portion defines a root portion substantially adjacent to said body, and when said wing portion is driven by said driving unit, said root portion moves upwardly and downwardly relative to said body periodically, and said wing portion elastically deforms such that said wing portion defines sections that move upwardly and downwardly relative to said body out of phase with the movement of said root portion.

17. The flapping apparatus according to claim 16, wherein said wing portion defines an outer tip and said wing portion elastically deforms such that a phase of motion of sections located closer to said outer tip than said body where a relatively large fluid force is exerted is delayed relative to a phase of motion of sections of said wing portion closer to said body where a relatively small fluid force is exerted.

18. The flapping apparatus according to claim 17, wherein said delay in phase is at most ½ of one period of said upward and downward motion of said section of said wing portion closer to said outer tip.

19. The flapping apparatus according to claim 16, wherein said wing portion elastically deforms such that a phase of the upward and downward motion of a tip end portion is delayed relative to a phase of the upward and downward motion of a root portion of said wing portion.

20. The flapping apparatus according to claim 19, wherein said delay in phase is at most ½ of one period of said upward and downward motion of said root of said wing portion.

21. The flapping apparatus according to claim 1, wherein a manner of control of said control unit controlling said driving unit and a manner of elastic deformation of said wing portion are related such that a prescribed parameter of movement of said wing portion is determined in accordance with a result of fluid-structure interactive analysis.

22. The flapping apparatus according to claim 21, wherein the prescribed parameter related to movement of said wing portion is a lift force generated by the upward and downward motion of said wing portion relative to said body.

23. The flapping apparatus according to claim 21, wherein the prescribed parameter related to movement of said wing portion is a value obtained by dividing a lift force generated by the motion of said wing portion by a torque necessary for driving said wing portion so as to generate a desired lift force.

24. The flapping apparatus according to claim 21, wherein the prescribed parameter related to movement of said wing portion is the highest frequency of said driving unit necessary for realizing said optimum upward and downward motion of said wing portion.

25. The flapping apparatus according to claim 21, wherein the prescribed parameter related to the movement of said wing portion is a value obtained by dividing the lift force generated by the upward and downward motion of said wing portion by an energy necessary for generating the desired lift force.

26. The flapping apparatus according to claim 1, wherein said wing portion satisfies the following relation, where f denotes flapping frequency, L denotes representative length, r denotes a distance from a portion having the highest stiffness, w denotes a load on a portion at a distance r from the portion having the highest stiffness, and d denotes a displacement generated at the portion that bears the load w exerted by the load w:

$0.36 \times 10^{-8} < r^3 \times w/d/(L \times f)^2 < 4.48 \times 10^{-8}$.

27. The flapping apparatus according to claim 1, wherein said wing portion has Young's modulus of $1.77 \times 10^8$ to $5.66 \times 10^9$.

28. The flapping apparatus according to claim 1, wherein said wing portion has Young's modulus of $2.5 \times 10^8$ to $2.0 \times 10^9$.

29. The flapping apparatus according to claim 1, wherein said wing portion has Young's modulus of $1.77 \times 10^8$ to $2.0 \times 10^9$.

30. The flapping apparatus according to claim 1, wherein said wing portion has an outer tip end portion and a root portion substantially adjacent to said body portion, and stiffness of a prescribed portion of said wing portion gradually increases from said outer tip end portion of said wing portion to said root portion of said wing portion, in proportion to a square of a distance from the tip end portion of said wing portion to said prescribed portion.

* * * * *